(12) United States Patent
Yang et al.

(10) Patent No.: US 8,103,435 B2
(45) Date of Patent: Jan. 24, 2012

(54) NEAR REAL-TIME TRAFFIC ROUTING

(75) Inventors: Chaowei Yang, Gaithersburg, MD (US);
Ying Cao, Fairfax, VA (US); Jibo Xie,
Fairfax, VA (US); Bin Zhou, Fairfax, VA
(US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 649 days.

(21) Appl. No.: 12/181,249

(22) Filed: Jul. 28, 2008

(65) Prior Publication Data
US 2009/0043486 A1   Feb. 12, 2009

Related U.S. Application Data

(60) Provisional application No. 60/952,373, filed on Jul. 27, 2007.

(51) Int. Cl.
*G06G 7/76* (2006.01)
(52) U.S. Cl. .................................................. 701/117
(58) Field of Classification Search .................. 701/117,
701/119, 210, 204; 340/7.48; 434/305
See application file for complete search history.

(56) References Cited

U.S. PATENT DOCUMENTS

| 2004/0236498 A1* | 11/2004 | Le et al. ................... 701/200 |
| 2006/0178807 A1* | 8/2006 | Kato et al. .................. 701/117 |
| 2011/0007629 A1* | 1/2011 | Atlas et al. ................. 370/225 |

* cited by examiner

*Primary Examiner* — Mark Beauchaine
(74) *Attorney, Agent, or Firm* — David Grossman

(57) ABSTRACT

A near real-time physical transportation network routing system comprising: a traffic simulation computing grid and a dynamic traffic routing service computing grid. The traffic simulator produces traffic network travel time predictions for a physical transportation network using a traffic simulation model and common input data. The physical transportation network is divided into a multiple sections. Each section has a primary zone and a buffer zone. The traffic simulation computing grid includes multiple of traffic simulation computing nodes. The common input data includes static network characteristics, an origin-destination data table, dynamic traffic information data and historical traffic data. The dynamic traffic routing service computing grid includes multiple dynamic traffic routing computing nodes and generates traffic route(s) using the traffic network travel time predictions.

22 Claims, 41 Drawing Sheets

Pseudo code of the Extended Dijkstra's algorithm

```
1   determinedVertecesSet.clear();
2   remainingVerticesQueue.clear();
3   // add source V with distance 0
4   remaingVerticesQueue.insert(sourceVertex, 0):
5   get start TimeIndex;
6   While( !remainingVerticesQueue.isEmpty()){
7     //select closet one
8     closet = remainingVerticesQueue.dequeueOneElement();
9     determinedVerticesSet.add(closet);
10    //update timeIndex
11    timeIndex +=graph.getEdgeWeight(source, timeIndex, closest)/timestep;
12    //relax
13    While (adjacentVertices.hasNext()){
14      adjV = adjacentVertices.next();
15      /only update V that is not determined
16      f(determinedVerticesSet.contains(adjV){
17        totalTime = pathFromSource(closest)
                      + getEdgeWeight(closest, timeIndex,adjV);
18        if(getShortestPathFromSource(adjV) > totalTime){
19          //update shortest path result map
20          setShortestPathFromStart(adjV, totalTime);
21          //update predecessor map result
22          thepredecessorMap.put(adjV, closest);
23          remainingVerticesQueue.insert(adjV, totalTime);
24        }
25      }
26    } //end while for relaxation
27  }
```

FIG. 5

| Percentile of collected travel time | Time Period | Travel Time Increase |
|---|---|---|
| 25% | peak time | 24% |
| | Of-peak time | 3.5% |
| 50% | peak time | 10.7% |
| | Of-peak time | 3.4% |

FIG. 10

| | Peak Hour | | Non Peak Hour | |
|---|---|---|---|---|
| Weather Condition | Speed Impact (mph) | Speed Ratio (%) | Speed Impact (mph) | Speed Ratio (%) |
| Fog | 2.43 | 90.82 | 4.09 | 92.06 |
| Light Rain | 2.43 | 90.82 | 4.09 | 92.06 |
| Rain | 2.43 | 90.82 | 4.09 | 92.06 |
| Heavy Rain | 2.43 | 90.82 | 4.09 | 92.06 |
| Light Snow | 2.43 | 90.82 | 4.09 | 92.06 |
| Snow | 2.43 | 90.82 | 4.09 | 92.06 |

FIG. 11

Network statistics of routes in the study area

| Name | Value |
|---|---|
| Total number of nodes | 69188 |
| Total number of road links | 172252 |
| Total number of road segments | 303796 |
| Total number of lanes | 627160 |
| Total number of divided sections | 25 |
| Total covered area | 1021 km$^2$ |

FIG. 26

Number of nodes, links, segments and lanes in each of the 5X5 sections

Grid Platforms Configuration with the CISC grid (checked servers participated in the platform on let column)

| Platform\Servers | A | B | C | D |
|---|---|---|---|---|
| 1 CPU | x | | | |
| 2 CPUs | x | | | |
| 4 CPUs | | | | x |
| 6 CPUs | x | | | x |
| 8 CPUs | | x | | |
| 2 CPUs | | x | | x |
| 16 CPUs | | x | x | |
| 22 CPUs | x | x | x | x |

FIG. 31

Speedup diagram of the Grid-enabled traffic simulation

US 8,103,435 B2

NEAR REAL-TIME TRAFFIC ROUTING

CROSS-REFERENCE TO RELATED APPLICATIONS

This application claims the benefit of U.S. Provisional Application No. APPLICATION No. 60/907,716, filed Jul. 27, 2007, entitled "Near Real-time Traffic Routing Supported by Grid Computing," which is hereby incorporated by reference in its entirety.

STATEMENT REGARDING FEDERALLY SPONSORED RESEARCH OR DEVELOPMENT

This invention was made with government support under NNX07AD99G awarded by NASA. The government has certain rights in the invention.

BRIEF DESCRIPTION OF THE SEVERAL VIEWS OF THE DRAWINGS

FIG. 5 is pseudo code of the Extended Dijkstra's algorithm.

FIG. 10 is a table showing how average travel time increases due to weather impacts in the Washington D.C. area.

FIG. 11 is a table showing how weather impacts on traffic speed for five roadways in Chicago, Seattle and Minneapolis

FIG. 26 is a table of network statistics of routes in a study area.

FIG. 31 is a table showing Grid Platforms configuration with the CISC grid.

DETAILED DESCRIPTION OF EMBODIMENTS

Section 1

Overview

Figures 1A, 1B:
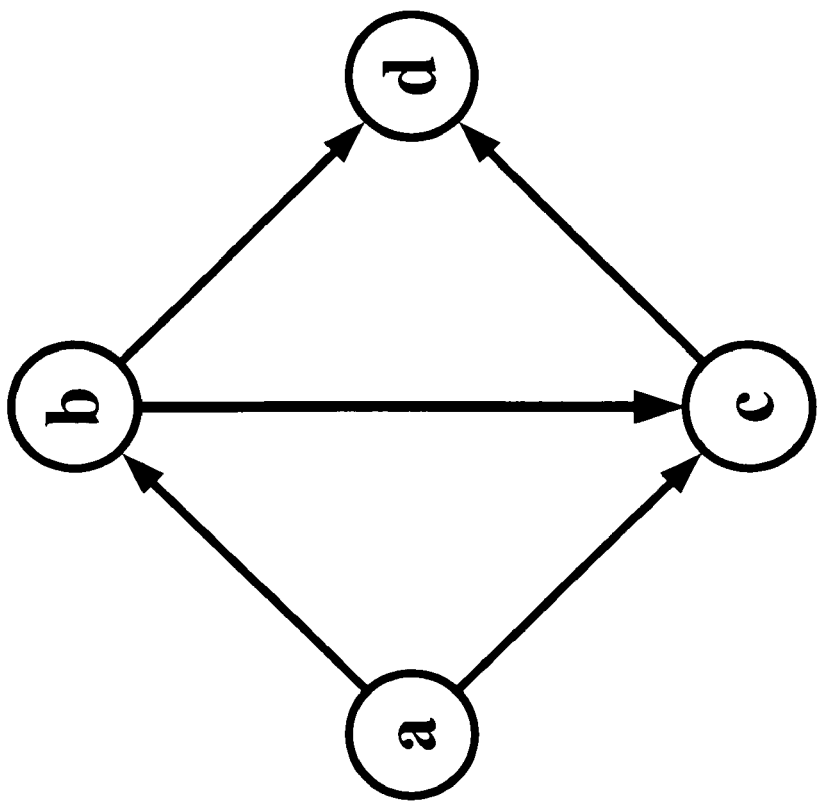
FIG. 1A is a diagram of a simple space-time network.
FIG. 1B is a matrix showing link travel times for the network shown in FIG. 1A at 10 different time intervals.

Topology and network analysis have been researched and advanced within various application contexts, such as social, biological, the Internet and transportation. Driving navigation, a popular application supported by topology and network analysis, plays an important role in transportation analysis.

Embodiments of the present invention address the near real-time driving navigation issues in three folds: 1) enabling near real-time routing by extending space-time network and routing algorithms, 2) enabling near real-time routing by integrating cutting-edge high performance computing, and 3) integrating various factors and disseminating navigation results through interoperable services.

The embodiments introduce an open framework leveraging: 1) microscopic transportation simulation for travel time estimation and prediction with real-time weather information incorporated; 2) extension of Dijkstra's algorithm for fast path routing against a space-time network; 3) Grid-based computing to enable both traffic simulation over large areas and routing for massive concurrent user requests; and 4) interoperability approaches for integrating web-based legacy GIServices.

Both Geographic Information Systems (GIS) and network analysis are burgeoning fields characterized by rapid methodological and scientific advances in recent years. Originated from Graph study, network analysis has been advanced within various application contexts, such as social context, biological context, Internet and transportation contexts. A transportation network is a traffic flow network representing the movement of people, vehicles or goods. Studies on modeling a transportation network originate from static network analyses and incorporate dynamic network optimization to address network flows, which can be multiperiod, multistage, time-phased, staircase, and sometimes acyclic.

The application of GIS in Transportation (GIS-T) is also being shaped by this static-to-dynamic trend. Map routing systems view represent the static network; the navigational view incorporating routing information; and the behavioral view considering the moving details of people, vehicles and goods. For example, the map views (such as detailed street representation), and the navigational views (such as shortest path from origin to destination) may be provided in many online map search engines (for example, Google Maps, Yahoo Maps or Mapquest). Within such a navigation view, users can obtain path travel time based on the address input of the origin and destination. Online mapping applications gradually cultivate large numbers of users to leverage the online routing engines for navigation and travel time estimation before each driving trip is calculated.

However, there is a common problem in all these online map routing engines: no matter when the search request is issued, the calculated travel time and route are always the same for a certain pair of origin and destination. This is because the calculation is based on static travel time for each road. In reality, travel time varies greatly due to road condition factors, such as accidents, road construction, heavy precipitation, and human behavioral issues. These dynamic factors add more dimensions and complexities to transportation applications, and extend the GIS-T from a navigational view to a behavioral view.

On the other hand, to represent dynamic road condition, the real-time traffic information of major highways has also been incorporated into some maps. For example, maps may be obtained that use color-coded real-time traffic information. The color green may be used to indicate no congestion (45 mph or above); yellow may be used to indicate minor jam in traffic flow (25-45 mph); and red may be used to indicate significant slowdowns (0-25 mph). Therefore, real-time traffic information may be available to produce near real-time routing. For example, one may get a different route for driving during heavy traffic hours than for driving during non-traffic hours to avoid congestions. Because routing is a planning activity based on future travel time and a complete traffic network, one may both 1) simulate travel time for all links based on limited traffic sensor observations, and 2) predict future travel time. Fortunately, traffic simulators provide these two functionalities.

Embodiments of the present invention leverage a grid platform (where map, navigational and behavioral views can be integrated in a high performance manner) and relevant models/algorithms for near real-time traffic simulation and routing. This work falls into the area of GIS-T, particularly topology and transportation network analysis for online GIS-T. The implemented system of this work could be part of Intelligent Transportation Systems (ITS), which are advanced systems for traffic information and control technologies. For example, implemented systems may be integrated into an Advanced Traveler Information System (ATIS) that provides travelers with real-time information before or during each trip. Ideas behind this research are the approaches to 1) represent and optimize dynamic road situations, where planning depends on traffic while traffic also depends on planning, and 2) Grid enable, (adjust an application for operating on a grid platform) near real-time routing by providing a powerful computing platform.

Recent advancements in transportation data collection, such as GPS services, have accumulated a massive amount of network component data (such as links and nodes) in different spatial scales and temporal scales. Real-time traffic data from a wide variety of sensors also become readily accessible, as seen in the online Microsoft live traffic map. In this context, existing standalone mathematical programming methods are not enough for the network analysis of dynamic characteristics and relationships. To address this problem, a unified framework may be required to integrate cutting-edge developments of high performance computing and interoperability.

To obtain more accurate outputs, extensive data collection may be needed and may result in a performance issue for a transportation simulation and routing system. Massive data input will increase data preparation time no matter which statistical method or traffic simulator is adopted. Most current traffic systems are focused on a specific area only and much effort will be needed to tune the system to account for a new and/or bigger area. The problem will be more serious if the current system will be extended to cover a large geographical area in real time.

Users of transportation systems require short response time (for example, at seconds level). Compared with message board and traffic radio news, online visualized and customized navigational views are desirable for the end user. Based on this need, an off-line transportation system may not be enough and it may be desirable that real-time dissemination be implemented using interoperable geospatial web services. Customized traffic service may also be desired: drivers would like to pay close attention only to factors for the routes they are going to or are currently driving on, while information in other areas (like most information repeated in traffic radio) is of much lower priority.

In recent years, simulation has become a tool commonly used to understand the characteristics of a traffic system and to select an appropriate system design. Traffic simulators can 1) mimic a real-world traffic system by using limited data observed by sensors and other traffic control input, 2) be used to evaluate candidate ad-hoc responses to unscheduled events, which is more valuable if provided in real-time and 3) be used to evaluate new signal control strategies. But because of internal iterative numerical modeling processes, the simulation approach is very computationally intensive.

However, the Grid-based cyber-infrastructure provides a potential platform to support a better performance by leveraging distributed computing resources. Embodiments disclosed utilize a framework with a grid environment to support the intensive computing needs needed to support near real-time traffic routing.

Embodiments target the following problems:

1. Real world applications are typically large-scale in order to cover a practical region, such as the Washington D.C. metropolitan area. Performance will bottleneck if one tries to simulate such a complex regional transportation network on a single machine. Take micro-simulation as an example where the computing time largely depends on the number of vehicles. Typical computational speeds of micro-simulations with a 1-second update for 100,000 vehicles will take one second. If such a simulation runs for Washington D.C. for 24 hours with 1 million travelers, the approximate computation time will be $$\frac{24 \times 60 \times 60 \times 10^6}{10^5} = 86400 \text{ (sec)} = 10 \text{ (days)}.$$

Although a machine with increased CPU cycles may implement the task in a shorter time, the computing demand may be too high to implement on a single machine for practical use.

2. When a near real-time routing system goes into operation, thousands of concurrent users may access the system and expect a second level response. It may become impossible for one machine to respond to the thousands of concurrent user requests within a timely fashion.

3. Static-based network routing algorithms may not be enough for best path discovery in real-time, because future link travel time will be important for predictive routing. Current routing algorithms can not handle the time dimension.

4. It is difficult to integrate heterogeneous data resources in a timely and flexible fashion.

The currently disclosed embodiments include a GIS-T framework, where a responsive traffic management system is able to handle these complexities and difficulties efficiently and disseminate information in an interoperable manner. Road weather information may be integrated for integrating comprehensive factors in a near real-time fashion. Also addressed are the computing needs of model and algorithms by testing the possibilities of grid approach in leveraging distributed computing resources.

Section 2

Dynamic Traffic Analysis, Cyberinfrastructure, Geospatial Applications, and Distributed Giservices For ground transportation, near real-time routing has become important when a limited transportation infrastructure is flooded by increased transportation demand and congestions in high-volume traffic hours. In order to provide routing tools to address this issue, new data structures in GIS-T are disclosed and basic GIS data models are enriched. However, new data structures or powerful data models only tackle part of the problem. A fundamental framework is required to address this issue in a systematic manner. The framework should be: 1) scalable enough to capture different dynamic factors in a transportation infrastructure, 2) expandable enough to incorporate a link-node incidence matrix, including a set of nodes, links and their characteristics (such as link length, link cost, and link capacity) and spatial relationship among the links and the nodes, and 3) flexible enough to integrate advanced traffic models to predict dynamic aspects of the transportation network. Such a framework brings up at least two topics: 1) a spatiotemporal model and temporal topology may be introduced to handle the temporal dimension, and 2) a flexible computing infrastructure and standardized geospatial web services may be integrated to address the computing challenges presented by the dynamic models and mass concurrent users. The following section discusses the sequence of traffic network simulation models, network routing, Grid-based cyberinfrastructure, and geospatial web services.

Traffic Network Models for Link Travel Time Calculation

Traffic flow models Traffic routing is based on links' travel time, which can be estimated simply if real-time speed V for a link 1 with a length of D1 is available, where the travel time T is:

$$T = \frac{D_1}{V} = \frac{60 \text{ (min/hr)} \times D_1 \text{ (mile)}}{V \text{ (mile/hr)}}$$

or if traffic volume for each link is available, link travel time can also be estimated by the Bureau of Public Roads (BPR) function (1964):

$$T_f = T_o * \left(1 + a * \left[\frac{V}{C}\right]^\beta\right)$$

where:
$T_f$=final link travel time;
$T_o$=original (free-flow) link travel time;
a=coefficient (often set at 0.15);
V=assigned traffic volume;
C=the link capacity; and
β=exponent (often set at 4.0)

However, these methods may be helpful only for dealing with networks in steady flow conditions or for calculating highly aggregated travel time values. In most cases, traffic conditions change dramatically over time and even permanent traffic sensors are not able to obtain an accurate travel time for some time intervals. More importantly, there may not be enough sensors to obtain either speed data or traffic volume data for each link in real-time, especially when non-recurring events happened en route. Historical travel time, therefore, may be adopted to provide additional information.

Statistical Estimation and Prediction

With historical travel time data and near real-time travel time input, statistical data analysis can improve travel time estimation and prediction. For example, in statistical estimation, the Kalman filtering method may be applied on a small sample of probe vehicles to dynamically estimate noise statistics of the system so that the model can be adjusted to produce a more accurate estimation. A modified nearest neighbor approach may be used to recover missing elements in the data sets of link travel time to increase the accuracy of estimates. For prediction, a linear relationship may exist between any future travel time and the current status travel time. So given a link travel time detected from sensors (such as single loop detectors), future travel time may be calculated by linear regression approaches. These methods are helpful to improve the completeness of time series data, even along the time dimension. But they largely rely on historical travel time and are not flexible enough to deal with non-recurrent incidents on the routes.

Network Simulation Model

Besides statistical approaches, traffic simulation is an extensively used approach for dynamic traffic management, estimation, and prediction. Based on the level of simulation details, there are three types of simulators: macroscopic, mesoscopic, and microscopic simulators. All of them can estimate/predict either link travel time or link flow speed. (1) Macroscopic simulation models divide transportation networks into several sections but do not consider individual vehicles. Their operations are based on a deterministic relationship of traffic flow, speed, demand and capacity. For example, the LWR model is based on the flow $Q(x, t)$, the density $K(x, t)$, and the flow speed $V(x, t)$. The model includes three equations:

The conservation equation:

$$\frac{\partial K(x, t)}{\partial t} + \frac{\partial Q(x, t)}{\partial x} = 0$$

The flow definition: $Q(x,t)=K(x,t)V(x,t)$

The equilibrium fundamental relation: $Q(x,t)=Q_E(K(x,t))$

These equations can be rewritten as a non-linear hyperbolic conservation equation:

$$\frac{\partial K(x, t)}{\partial t} + \frac{\partial Q_E(K(x, t))}{\partial x} = 0$$

(2) The level of a mesoscopic traffic model is between the macroscopic and microscopic models where individual vehicles are included as packets or cells with aggregated behaviors and roads are modeled as queuing or running parts.

(3) Microscopic simulations incorporate movements of individual vehicles, so the level of detail in each vehicle driven allows for the modeling of the stochastic nature of traffic flow and drivers' responses to route guidance. Microscopic models may be necessary for evaluating dynamic traffic management systems at the operational level.

Running these models maybe very time consuming and detailed data input required. Most existing model systems work off-line with a few near real-time systems that focus on a localized area.

Due to nonlinear traffic phenomena, traffic models may be based on different driver reactions to traffic, and their solutions influence results of network status updates. Therefore, if data details and computational power are not issues, microscopic simulations maybe much more accurate because individual vehicles are considered. This disclosure discusses using grid computing to address this problem.

The macroscopic to microscopic trend accompanies another shift from computational process modeling to agent-based modeling where each agent represents a unit, such as vehicle driver, within the network. In addition to flexibility and interaction, these agents may have many governing attributes such as age, gender, occupation, marital status, vehicle brand and so on. Agent-based modeling is especially helpful in traveler behavior studies like driving choice estimation. However, because the underlying framework in this disclosure is to provide route guidance without tailoring to each driver's preference, agent-based modeling may not be required in the embodiments.

Dynamic Route Guidance

Based on travel time estimations and predictions, a route guidance system is disclosed to provide road users with traffic conditions, such as link travel times, queue lengths and/or to suggest a path to follow from their current position to their ultimate destination. Route guidance can be both reactive and proactive. Being proactive, anticipatory route guidance may be generated intelligently from a set of predicted future link travel times. Thus the best path distributed as route guidance is based on assumptions about future congestion conditions of the network according to a user-optimal equilibrium condition.

An online survey by Tokyo Metropolitan Expressways (MEX) found that 78% of the drivers would change their route or departure time if there are time savings. So a near real-time navigational system should be useful, where navigation here is defined as the combination of routing, route traversal and tracking (ISO 2004). The tracking, routing and route traversal is defined as the followings.

Tracking is the process of following the position of a vehicle in a network, and associating it to steps in a route.

Routing is the process of finding optimal (minimal cost function) route between positions in a network.

Route traversal is the execution of a route, usually through the use of instructions at each node in the path, and a start and stop instruction, at the first and last position on the route.

These types of systems may be implemented in two ways: using autonomous traffic prediction in the vehicle or through traffic centers. An effective traffic center based approach may be preferable so overall monitoring and control can be applied. But the problem lies in the computing capability of a data center to provide dynamic route guidance and the computing issue becomes more severe if the system covers a large area. This disclosure explores the utilization of Grid computing (cyberinfrastructure) to address these issues.

Near Real-Time Routing Based on Traffic Estimation

The need for faster simulations has motivated the studies on online simulation tools on paralleled and distributed platforms. Some simulation tools have been extended to the Traffic Estimation and Prediction System (TrEPS) with route guidance functionalities. Following an initiative by the Federal Highway Administration (FHWA) in 1995, two prototypes of the TrEPS were developed, which are DynaMIT from Massachusetts Institute of Technology and DYNASMART-X from University of Texas at Austin and University of Maryland. Both systems provide predicted traffic information (speeds, densities, queues/flows and aggregated travel time) based on an assignment-simulation framework. To support real-time operations, these systems can be operated in a distributed computational mode; for example, the most current version of DYNASMART-X 0.930 allows for distribution in up to eight machines. However, this mode did not fully distribute time consuming tasks into smaller ones: The restriction is based on the design where network/vehicle data and the Origin Destination (OD) demand matrix are still processed by one component on one machine. For example, the Origin Destination Estimation module (ODE) needs to transfer the estimated OD demand matrix of a large dimension to the Origin Destination Prediction module (ODP) before every estimate, which requires ODE and ODP to be grouped on the same machine. Therefore, data processing of a very large network still forms a bottleneck or, sometimes, makes the simulation impossible.

Cyberinfrastructure and Geospatial Applications

How to improve the computing capability of microscopic simulators is a question that has been studied for a long time. The traffic simulation laboratory, MITSIMLab, includes a Parallel Virtual Machine (PVM) for a distributed implementation so that modules in the system communicate with each other via loosely coupled message passing, shared memory, and data files. PVM was first developed by the University of Tennessee, Oak Ridge National Laboratory and Emory University in 1989 for parallel computing. Its integration with MITSIMLab is an early attempt to utilize parallel and distributed computing for transportation simulations. The loosely coupled approach is not flexible enough to deal with expanding traffic networks, but Grid computing, on the other hand, provides a loosely coupled, flexible computing platform.

Grid Computing

Grid is a coordinated resource sharing and problem solving infrastructure in dynamic, multi-institutional virtual organizations. The emergence of Grid Computing provides a next-generation computing infrastructure by sharing loosely coupled distributed computing resources. Ideally, Grid Computing is equivalent to the world's largest computer, and the computing power can be just as ample as electrical power. Compared to Peer-to-Peer (P2P) technology, Grid Computing is suitable for critical applications and large-scale collaboration in scientific areas, while P2P is suitable for non-critical collaborations like file sharing or file streaming. Grid Computing requires the definition and proliferation of new communication protocols, middleware and socio-computational customs.

Many distributed computing issues, such as scheduling, become more complex in a Grid System than in tightly coupled distributed or paralleled systems because of the loosely coupled and unreliable connection of computing nodes, such as personal computers, workstations, and clusters of computers. In a Grid-based environment, a scheduler may reside within a Resource Management System (RMS), which sits above computing resources and data resources and aims to achieve high performance by balancing loads across the network. Scheduling could be either static or dynamic. In geospatial applications, proper scheduling approaches should reduce problem complexity.

As an extension to distributed computing, current Grid Computing mainly uses the approach named Service-Oriented Architecture (SOA). Upon this architecture, distributed systems deliver functionalities in standard ways. Developments in Grid Computing are closely related to Service techniques, and the Open Grid Service Architecture (OGSA) is widely adopted in presenting a Service-Oriented Architecture (SOA) for Grid-based development. Grid Computing is supported by middleware that handle the scheduling, dispatching, and integrating of computing tasks and coordinating computing resources. Two of the most popular middleware are the open source Globus Toolkit and Condor, both of which include software services and libraries for resource monitoring, discovery, management, and security and file management. Condor may used in the grid platform disclosed herein. CISC also develops its own middleware (named CISC middleware temporarily) for dealing with finer granule jobs.

Geospatial Applications

The geospatial community started research on Grid GIS at the beginning of this century. The Geoscience Network (GEON) is working to develop a cyberinfrastructure for Earth Sciences research. There is also research on standardized grid service interfaces development for accessing distributed geospatial. A geographical problem-solving environment (GeoPSE) addresses a spatial statistics problem by using Grid technologies.

Distributed GIServices

GIService

Geospatial information may be distributed by nature, and so geospatial services can be built locally and communicated with in a distributed fashion. This interaction fits naturally with current distributed and heterogeneous network environments. Therefore, the paradigm of GIS is shifting from traditional GISystems to distributed geographic information services (GIServices). The ISO19119 service description divides GIServices into the following categories based on the general Open System Environment model of information services:

Integration with GIServices

GIServices are mainly developed as web services, which are software systems identified by a URL, whose public interfaces and bindings are defined and described using XML (W3C 2002). Descriptions of each service can be used to discover the service by other software systems. Then these systems may interact with the Web service in a manner prescribed by its definition, using XML based messages conveyed by Internet protocols. Through the integration of these data and geospatial services, distributed GIServices provide reduced technology risk, better ability to leverage the value of legacy data and systems, and more efficient information sharing.

Specifications for GIServices Relevant to Transportation

The evolution of GIServices witnesses the development of various specifications and standards by many different organizations. The Federal Geographic Data Committee (FGDC) provides national requirements and organizes standards development for fundamental data sharing, such as the FGDC Data Content Standards for Cadastral, Digital Orthoimagery, Elevation, Geodetic Control, Governmental Units, Hydrography and Transportation. The OpenGeospatial Consortium (OGC) organizes, develops, and tests a set of specifications, such as WMS, Web Feature Service (WFS), and Web Coverage Service (WCS), and CS-W, for sharing geospatial information and processing. These services are adopted for sharing transportation and other datasets and services. The International Standards Organization (ISO) Technical Committee 211 (TC211) develops international standards based on requirements from its member organizations/countries.

For transportation, location based service may be very important. For example, ISO 19133 (2005a) describes the data, location based services, and web service views needed to support tracking and navigation applications for mobile clients. ISO 19134 (2005b) specifies the data types and associated operations for the implementation of multi-model location based services for routing and navigation. OGC addresses similar specifications, such as Open Location Services: core services (OGC 2005), which define access to the services and data types for the GeoMobility Server, an open location services platform.

Disclosed embodiment may leverage the WMS, WFS, and WCS. These services are utilized to interface the components within the framework. So the framework interface is open and can be easily plugged with other components with standardized interface.

Section 3

Travel Time Estimation, Prediction and Routing

To handle near real-time routing, the TrEPS, the core of ITS, is expected to provide accurate results covering a large region. The addition of a temporal dimension requires the static travel time network to be extended to support both current and future link travel time. Travel time estimation generates the most current link travel time and travel time prediction generates future travel times for pre-trip planning purposes. Ideally, such a system can generate a complete, time-dependent origin-destination matrix within a specific time span, so that the routing request can be read from the matrix without computing on the fly. However, the dynamic status of the traffic network may invalidate such a complete matrix with unexpected events, such as a traffic accident. Therefore, near real-time routing will require the integration of the components and computing in real-time.

Space-Time Network

The matrix described above introduces the concept of a space-time network, which provides a foundation for near real-time, shortest path applications. Given network R=(V, E), the vertex set V and the edge set E are defined as:

$$V = \{i_h : i \in N, 1 \leq h \leq q\},$$

$$E = t\{i_h, j_k) : (i,j) \in A, t_h + d_{ij}(t_h) = t_k, 1 \leq h \leq k \leq q\}$$

where for each time index h, the discrete set $T = \{t_1, t_2, \ldots, t_q\}$ and travel time on arc $(i_j, j_k)$ is represented by a delay function $d_{ij}(t_h)$. In this definition, waiting time at a node is not included, but can be regarded as part of the travel time in a time interval. The space-time network R can be viewed as a two-dimensional structure, where link travel time is recorded for each link at the beginning of each time interval.

As an illustration, FIG. 1A is a static map view of the four nodes, and the matrix in FIG. 1B records different link travel times for each of the ten time intervals.

Figure 2B:
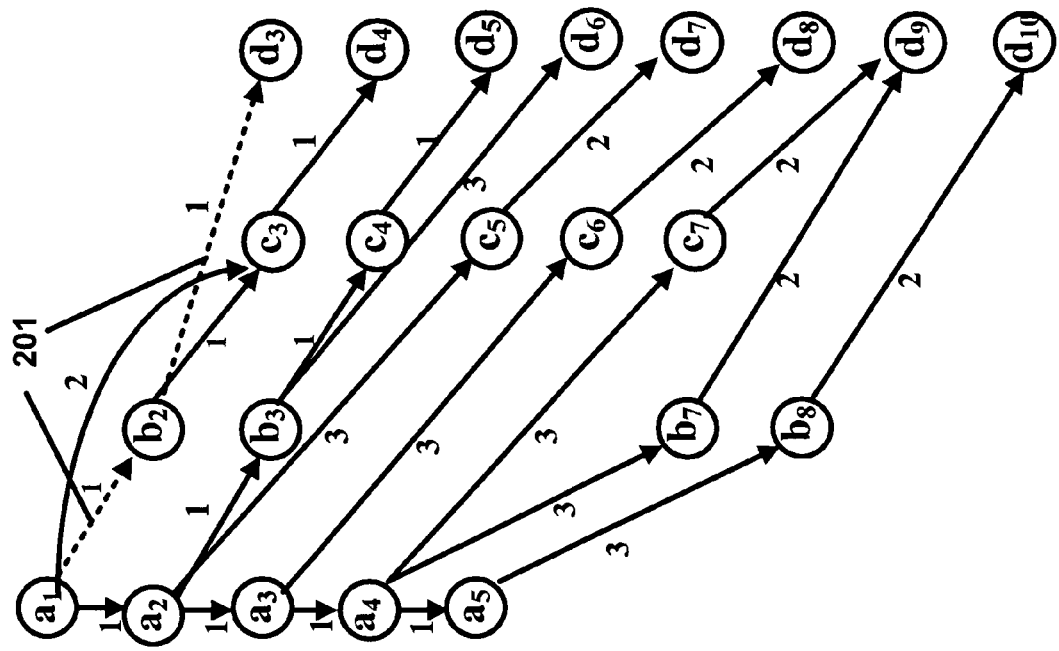
FIG. 2B is a link travel time diagram for non-redundant links from node a to node d on the link travel time diagram shown in FIG. 2A.
Figure 2A:
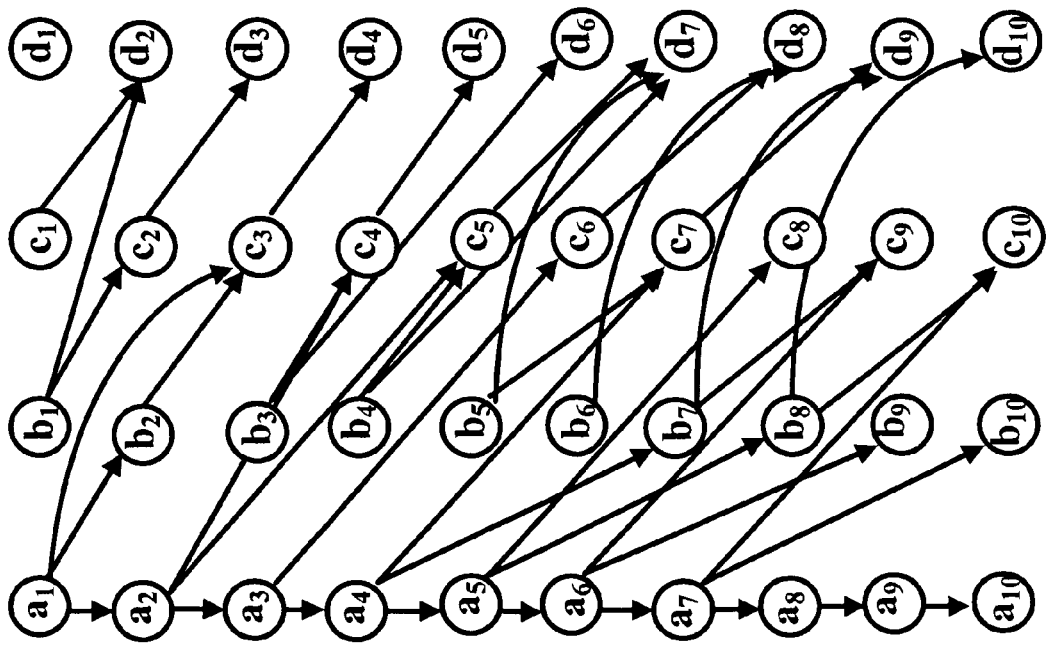
FIG. 2A is a link travel time diagram of a four-node simple network.

The overall matrix can be represented by FIG. 2A, where the subscript of each node represents the time index and the arrows illustrate all the possible link navigations within the time interval $(t_1, t_{10})$. FIG. 2B signifies the non-redundant links from node a to node d with link travel times on each hop. As a result, the fastest path from nodes a to d is shown as a dashed line in FIG. 2B, where path travel time is 2 time units.

The example illustrates that a space-time network may be time-stepped, where an overall time span is partitioned into discrete time intervals, and the values of estimated link travel times may also be discrete. For example, if the overall time span is from 6:30 am to 9:00 am and the time interval is set to 2 minutes, the discrete time number is calculated as (9−6.5) *60/2=75 times. And if link 1's travel time at 6:30 am is 3 minutes, there will be no travel time recorded at 6:33 am since the step size is 2 minutes in the matrix. This characteristic indicates that step size along the time dimension is preferred to be smaller than the average link travel time, otherwise, real path travel time errors may accumulate in each time step.

Apart from dense sampling, the routing application may require that a complete network of link travel times be available along the entire travel time period. This is difficult for data collection. On one side, common measurement tools like loop detectors, probes, and GPS devices are only available on limited road segments; on the other side, the reliability of each loop detector and accuracy of GPS varies highly due to detector connection conditions and the number of sensors.

3.2 Travel Time Estimation and Prediction

The network completeness and density of temporal sampling of a space-time network are beyond the capabilities of current travel time measurement tools, such as loop detectors and probe vehicles. Therefore, link travel times may need to be calculated using statistical data analysis or to be simulated by traffic simulators. Compared with statistical methods, traffic simulators can generate discrete travel time values, which fit naturally in a space-time network. In addition, the simulator is more flexible in modeling complex and stochastic traffic systems at different levels of details (i.e. macroscopic, mesoscopic and microscopic simulation models) with different input parameters. Microscopic simulators have gained the most popularity over the past decade since they can describe traffic conditions with practical and straightforward results. Since the model should simulate the overall environment of the transportation network, a multi-model simulation laboratory, instead of a standalone simulator, is needed.

Figure 3:
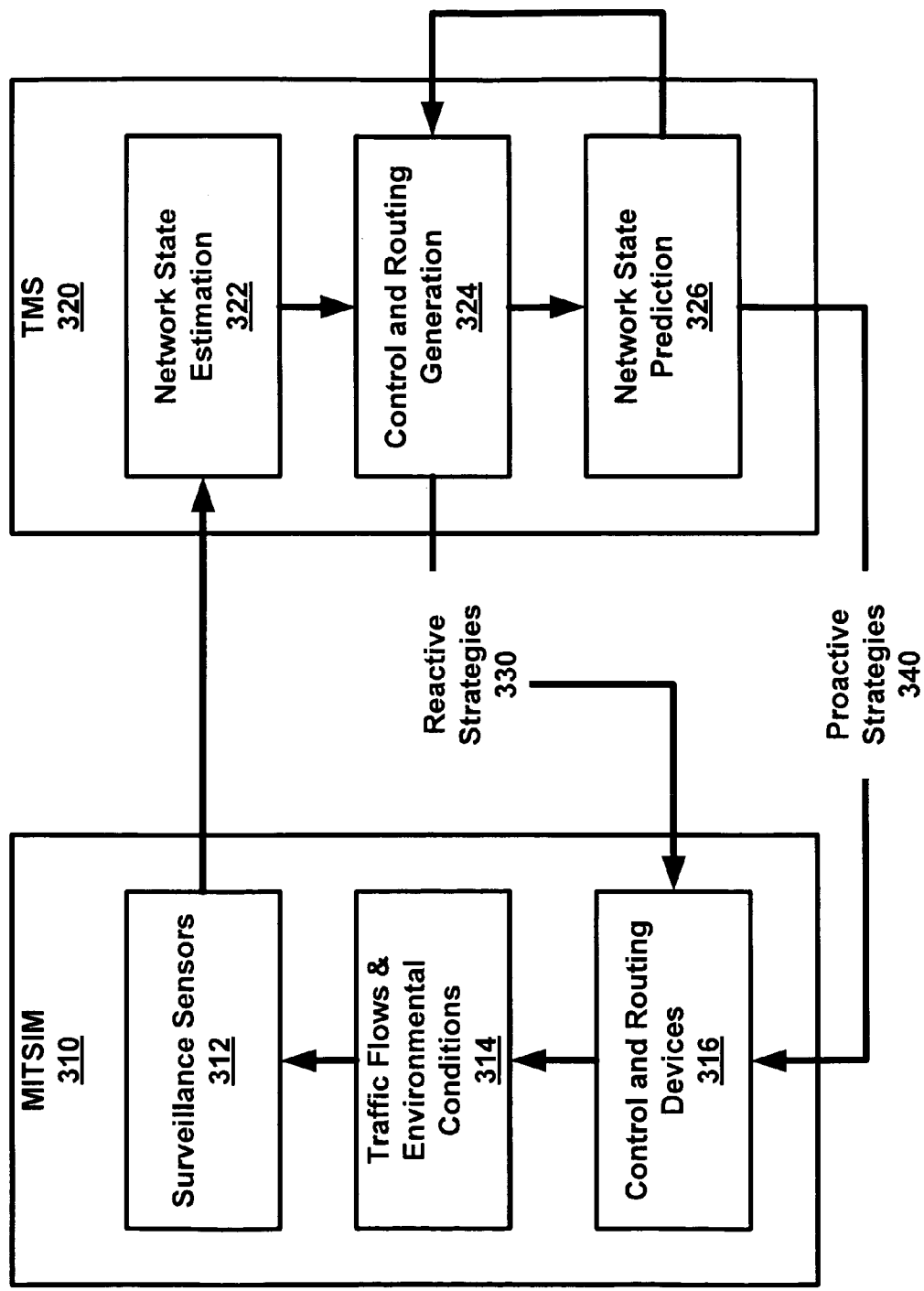
FIG. 3 is a block diagram showing major components and their interactions in MITSIMLab.

There are a few open source microscopic traffic simulators, such as MITSIMLab from MIT. It is a useful tool for testing and evaluating new concepts, algorithms and technologies in the research and development of ITS applications. MITSIMLab includes a traffic flow simulator, which provides a laboratory environment for coupling traffic control and routing logic. As depicted in FIG. 3, it provides reactive strategies 330 generating traffic status in one run and has proactive strategies 340 generating status based on predicted results. If the consistency threshold is not met in one run, the process of control and routing generation 324 will repeat until the predicted status and current status can result in a smooth transition.

Figure 4:
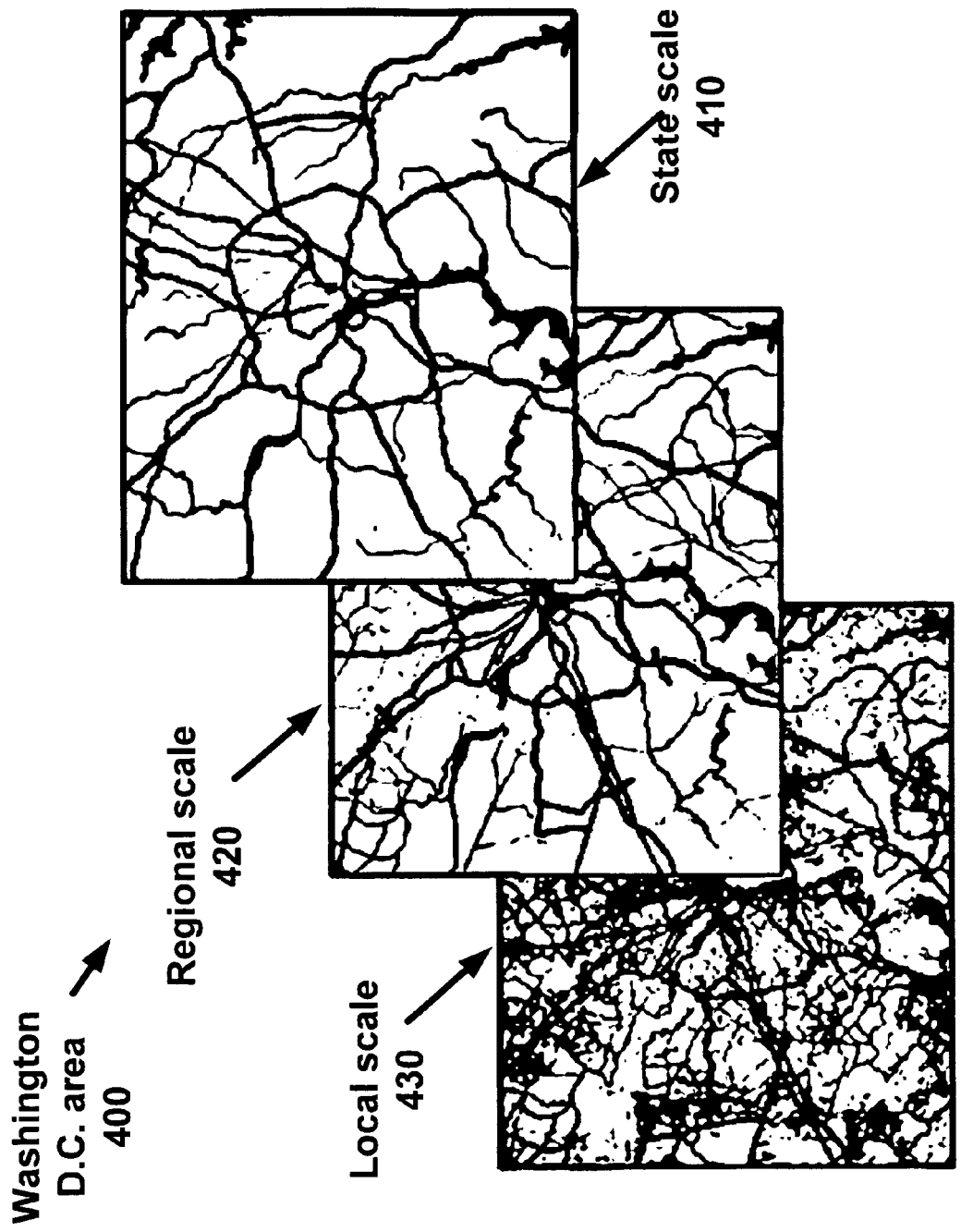
FIG. 4 is a map of Washington D.C. transportation infrastructure at different levels of detail.

As described previously, repeating runs to achieve traffic equilibrium is very time consuming, especially for a large area. One solution is to generalize the study area into different layers. For a target area, different layers may represent different levels of detail; therefore simulation complexity can be selected according to different purposes. For example, a statewide network can be simulated on a highway-only layer, while a network for a smaller regional area can be simulated on a detailed street layer if needed. Accordingly, lane connectivity tables maintain the correct connection between links or link segments for the specific layer so highways are not directly connected to minor roads without ramps. FIG. 4 illustrates the Washington D.C. area 400 in three different layers: the state scale layer 410 has freeways only, the regional scale layer 420 consists of freeways and highways, and the local scale layer 410 includes local streets in addition to previous roads.

However, performance on detailed transportation routing may still be a problem. In this disclosure, this problem is addressed using Grid computing and Grid enabling for the simulation. The MITSIMLab, especially its simulator MITSIM may be utilized for link travel time estimation and prediction.

3.3 Extended Dijkstra's Algorithm for Space-Time Network Routing

Network routing has been studied extensively in mathematics and computer science. There are several fundamental and efficient algorithms, such as the Bellman-Ford algorithm that scans every edge for each node to get the least costly route and the Floyd-Warshall algorithm that allows negative edge weights and solves all pairs shortest paths by multiplying an adjacency-matrix representation of the graph. One of the most famous algorithms was proposed by Dijkstra in 1959. Being a greedy algorithm that never rescans nodes once they are permanently labeled, Dijkstra's algorithm provides an optimal route where an edge with a positive value is contained in the network. Later, a modified version A* algorithm employs heuristic estimates to narrow the search extent.

For general road routings, the Dijkstra and A* algorithms are widely used because they are both efficient and link travel times are not negative. A* algorithm can narrow the search space to speed up the path finding process, but it is essential to set up an appropriate heuristic estimate so optimal results will not be missed. The A* algorithm performs the same or slower in these processes, therefore, Dijkstra' algorithm may be selected and extended for the space-time network.

The pseudo code of the Extended Dijkstra's algorithm is shown in FIG. 5. The algorithm is extended with a time dimension. Before searching for the shortest path, a three dimensional matrix is constructed for all adjacent vertices as adjacencyMatrix[stimeIndex][origin][destination]. It helps validate the network completeness before searching and improves the actual search process for neighbor vertices. Based on this matrix, a link travel time is not a static edge weight. Each link has a time series of edge weights and the value depends on its time index. Each time index update happens when a closest vertex is selected as the candidate. Since time step size is recorded beforehand, the updated time index h is the sum of the previous time index as well as the number of intervals according to this hop (line 11). Like Dijkstra's algorithm, after best vertex is selected, relaxation may be required to update total travel time to all its neighbors. The total travel time from the source may be calculated based on the selected vertex and its time index h (line 17). Therefore, the time index in this algorithm may be used to get time dependent edge weight, while the edge weight is used to update the new time index.

Based on Dijkstra's general algorithm, a priority queue is applied to improve the routing efficiency. With the data structure retaining the remaining vertices in order, the closest neighbor may always be selected easily in each step, and computing complexity of this algorithm becomes O (|E| log |V|), instead of O(|V|2+|E|) for linear search implementation of Dijkstra's algorithm The algorithm can accept time intervals as a discrete variable value. Although the space time network is time stepped, the step doesn't need to be a fixed value. The temporal topological property of a traffic network makes the model more efficient if the time interval is small at peak times so the residual error stays low, while at non-peak time (i.e. late night), the time interval is bigger so computing power and intermediate and results data storage can be conserved.

As described before, the search process is fast and it terminates whenever the destination node is selected and moved into a determined vertex queue. The overhead of this algorithm is the adjacency matrix set up in its memory, and since the matrix incorporates the time dimension, and many nodes may exist in this network, the matrix could be very large.

Section 4

Dynamic Routing with Weather Impact

Microscopic traffic simulators and routing algorithms enable responsive guidance generation as well as incorporating certain individual driver behavioral information. However, many more factors, such as weather, can impact traffic prediction and routing results. The National Research Council of the National Academies in 2004 estimated that adverse weather is associated with over 1.5 million vehicular accidents every year and drivers endure over 500 million hours of delay annually on the nation's highways and principle arterial roads because of fog, snow, and ice. This does not include considerable delays due to rain and wet pavement. Using weather as an example, the following sections investigate the mechanism for integrating other factors to adjust travel time predictions in a near real-time manner.

4.1 Road Weather Condition

By overlaying a transportation network onto a weather condition map, an integrated view can visually illustrate the impact weather has on traffic. The GIS platform may provide such overlay functions, where a traffic network layer, updated at each time interval, can be integrated with a weather layer, updated in near real-time. A variety of weather information can be obtained from observations from surface-based sensors, commercial aircraft, a nation-wide network of gauges, and satellite remote sensing. The Next Generation Radar Data (NEXRAD) system is one of the most utilized weather observing systems in operation. For example, NEXRAD map layer may indicate areas with bad weather such as severe rainfall using color overlays. Typically, these areas are also where traffic flow is much slower than route capacity.

4.2 Real-Time Weather Radar Data

Figure 6:
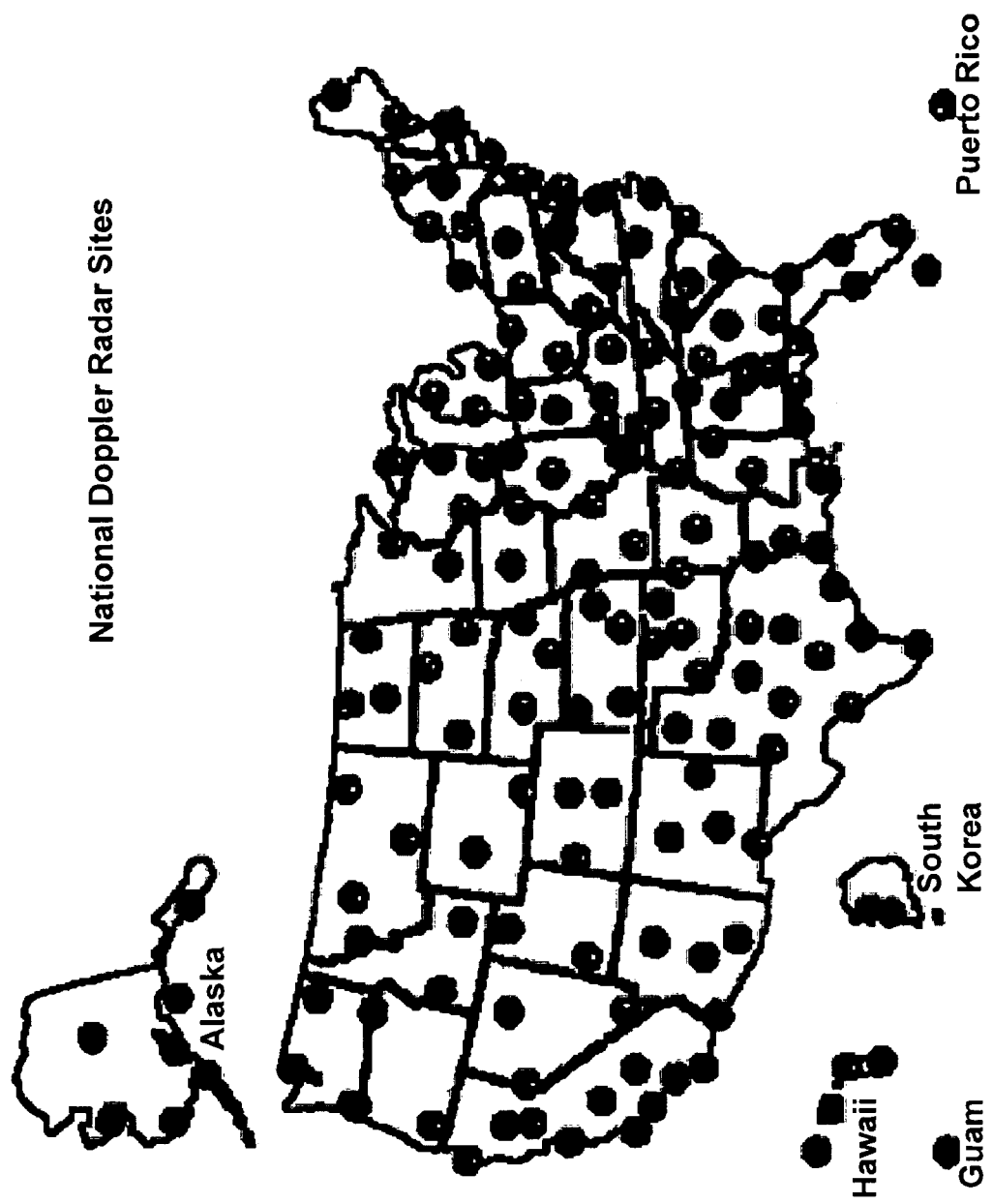
FIG. 6 is map showing National Doppler sites.

As an essential weather data source, the NEXRAD system is a joint effort between the National Weather Service (NWS) and the US Departments of Commerce (DOC), Defense (DOD), and Transportation (DOT) (OFCM 2006). The system is comprised of approximately 160 WSR-88D sites covering most regions of the United States and provides severe-weather information and flash flooding warnings. To better measure the parameters, these radar sites can operate in clear-air mode, precipitation mode, or severe weather mode depending on different weather conditions. NEXRAD data are suitable for road weather analysis for several reasons: (1) the observing network covers all of the United States, as illustrated in FIG. 6; (2) the data products are updated every 4 to 6 minutes and they are easily accessible in (near) real-time through web services as described in section 4.3; and (3) the data can track precipitation, wind directions, and other phenomena like blowing dust.

NEXRAD data are categorized into four levels according to the processing procedure: Level I data refer to the analog, time domain output from the radar receiver and include information about radar synchronization, calibration, antenna position, and operational mode; Level II (also known as base) data include radial wind, reflectivity, and spectrum width, along with the appropriate metadata; Level III data (also known as NEXRAD Information Dissemination Service, or NIDS) are a series of 24 products generated by the Radar Product Generator (RPG); Level IV data refer to any information or products that are available at the client side (OFCM 2006). The National Climatic Data Center (NCDC) in North Carolina archives all Level II and Level III data from both civilian and military WSR-88D systems. Among the different data types provided, reflectivity data are obtained in clear-air mode, which has the highest sensibility; therefore, they are suitable to feed into a road weather information system.

4.3 Real-Time NEXRAD Web Map Service

Figure 7:
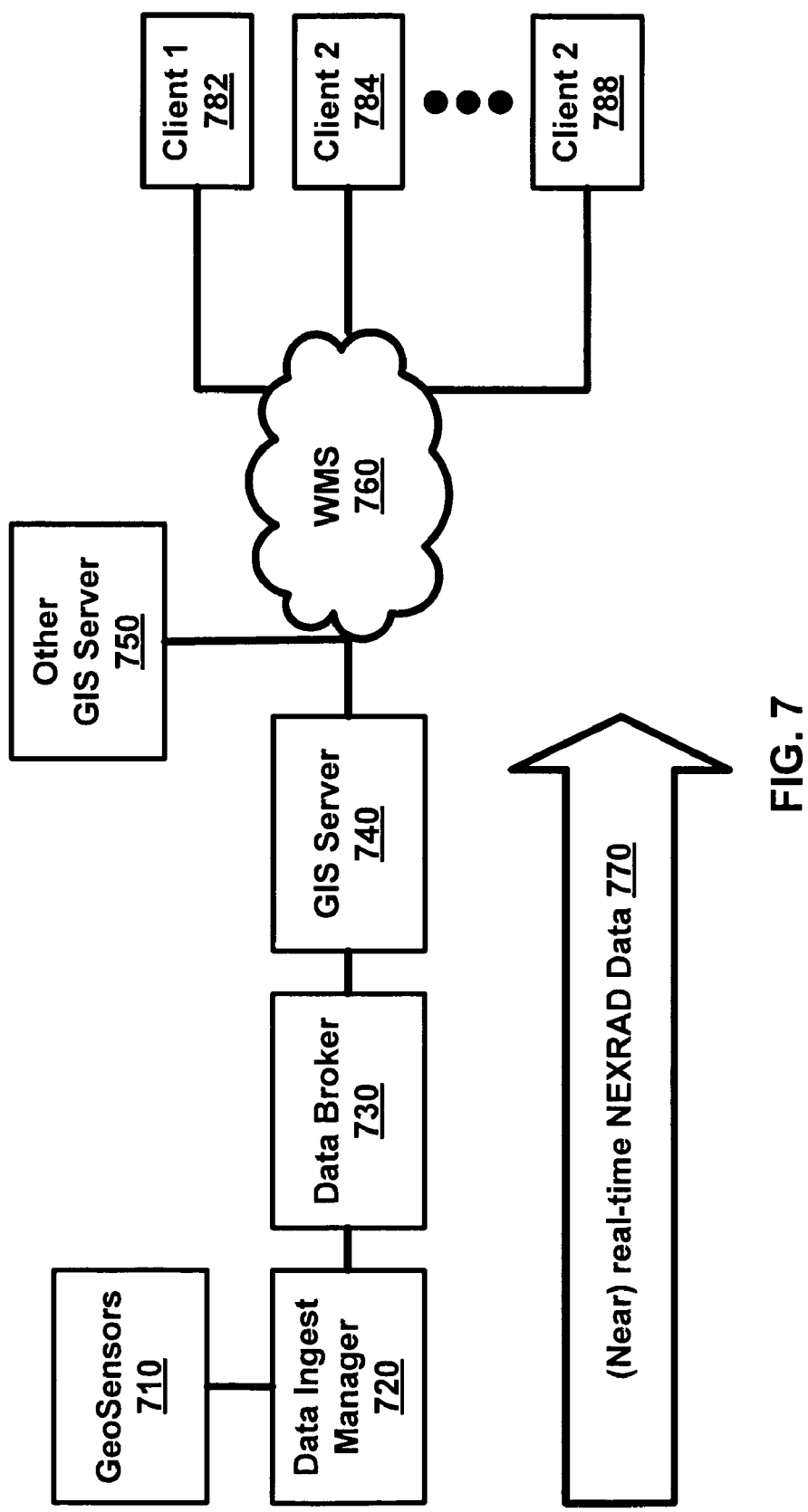
FIG. 7 is a block diagram showing a general framework of NEXRAD web map services.

As discussed before, in order to serve regional weather data efficiently, a NEXRAD data service is provided based on a receiving node of the Unidata Internet Data Distribution system, which offers event-driven NEXRAD data every 4-6 minutes. FIG. 7 shows major IDD components including the Data Ingest Manager (720), Data Broker (730), GIS server modules (740 . . . 750), and GIS client modules (782, 784 . . . 788). The general framework design is based on the following four major functions: (1) Local Data Manager (LDM) is adopted as Data Ingest Manager 720 to receive near real-time data products from Geosensors 710; (2) Data Broker 730 prepares newly received data products into geo-referenced images, and manages the products by considering the temporal dimension; (3) Metadata management on data types and temporal information; (4) The server pushes the GIS-ready data to distributed GIS components, which implement near real-time WMS, map animation and spatiotemporal analysis.

In the context of dynamic traffic analysis, a real-time or animated map can aid in final route representation and more importantly, an updated reflectivity map can be the input for road weather assessment, which is detailed in the following section.

Figure 8:
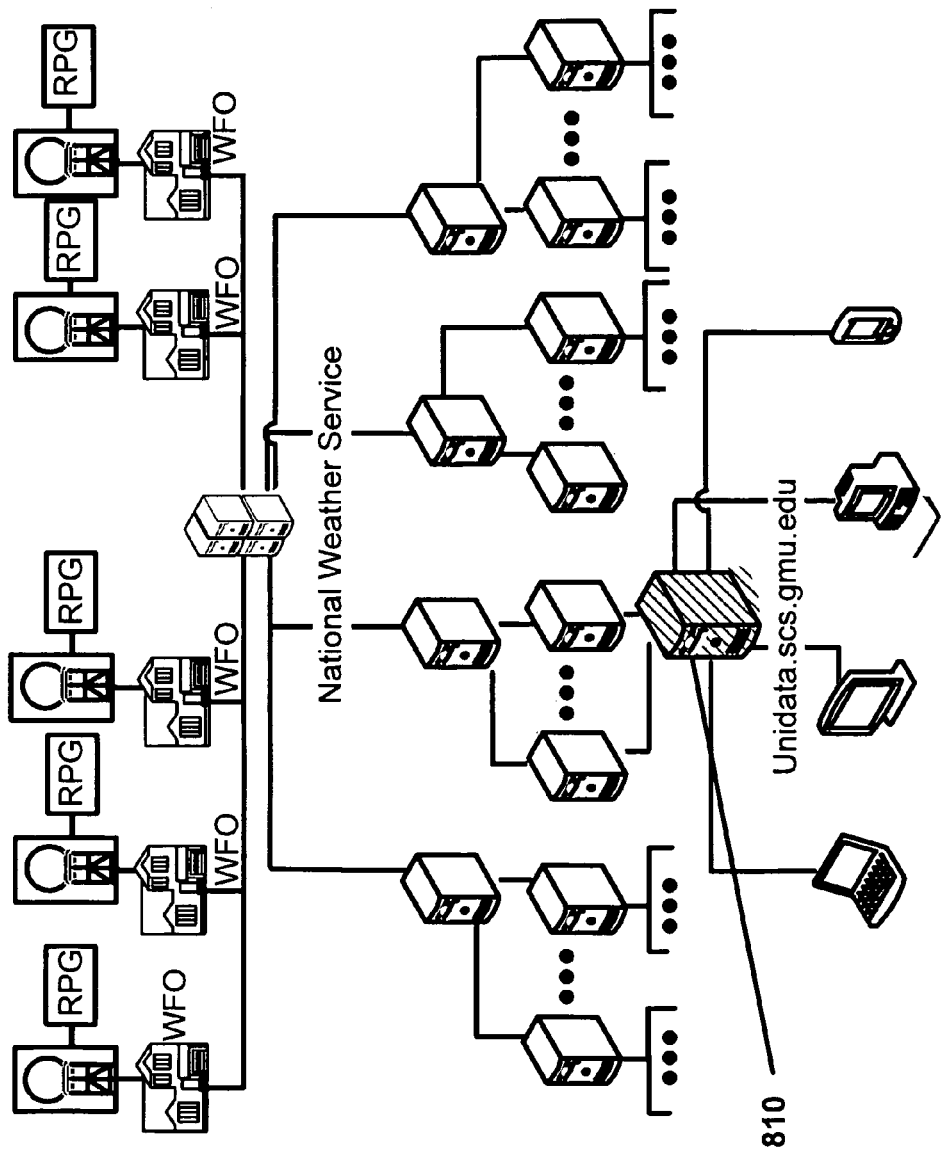
FIG. 8 is a block diagram showing an example of a NEXRAD data dissemination topology.

There are two major characteristics of this service: one is real-time data dissemination and the other is interoperable communication. As to data dissemination, the overall IDD system data relay may be designed in a tree-like structure (such as shown in FIG. 8: the Data Ingest Manager is located on a node of the IDD system and con FIG. d to receive NEXRAD data as soon as its upstream node has the updated data products. Then the Data Broker processes new data to be 'GIS ready' in real-time, and archives the data on the data server for temporal queries. As the new data continues to be updated, the new files remain as time-stamped snapshots in series. There is a tradeoff between saving data in their original data types or in commonly accepted image formats, such as PNG, GIF, and TIFF. Since the reflectivity value is stored as one value per pixel in resulting maps, the series of maps may also be utilized as input for further traffic analysis. Therefore, image formats may be preferred to original data types like GINI format. For mapping purposes, a PNG image may be used for this (Near) real-time NEXRAD Data service since there is no quality loss in this type of format transformation (raster to image) and transparency may be applied on resulting images for map overlays in the client-side viewers. All of the functions described here are located on the Unidata server 810. A typical server may have a configuration of 4 G RAM, Two 3.06 Ghz CPUs, 500 G hard drive, and be connected to the Internet through a 1 Gbps link.

4.4 Dynamic Traffic Weather Service 4.4.1 Design and Work Flow

Figure 9:
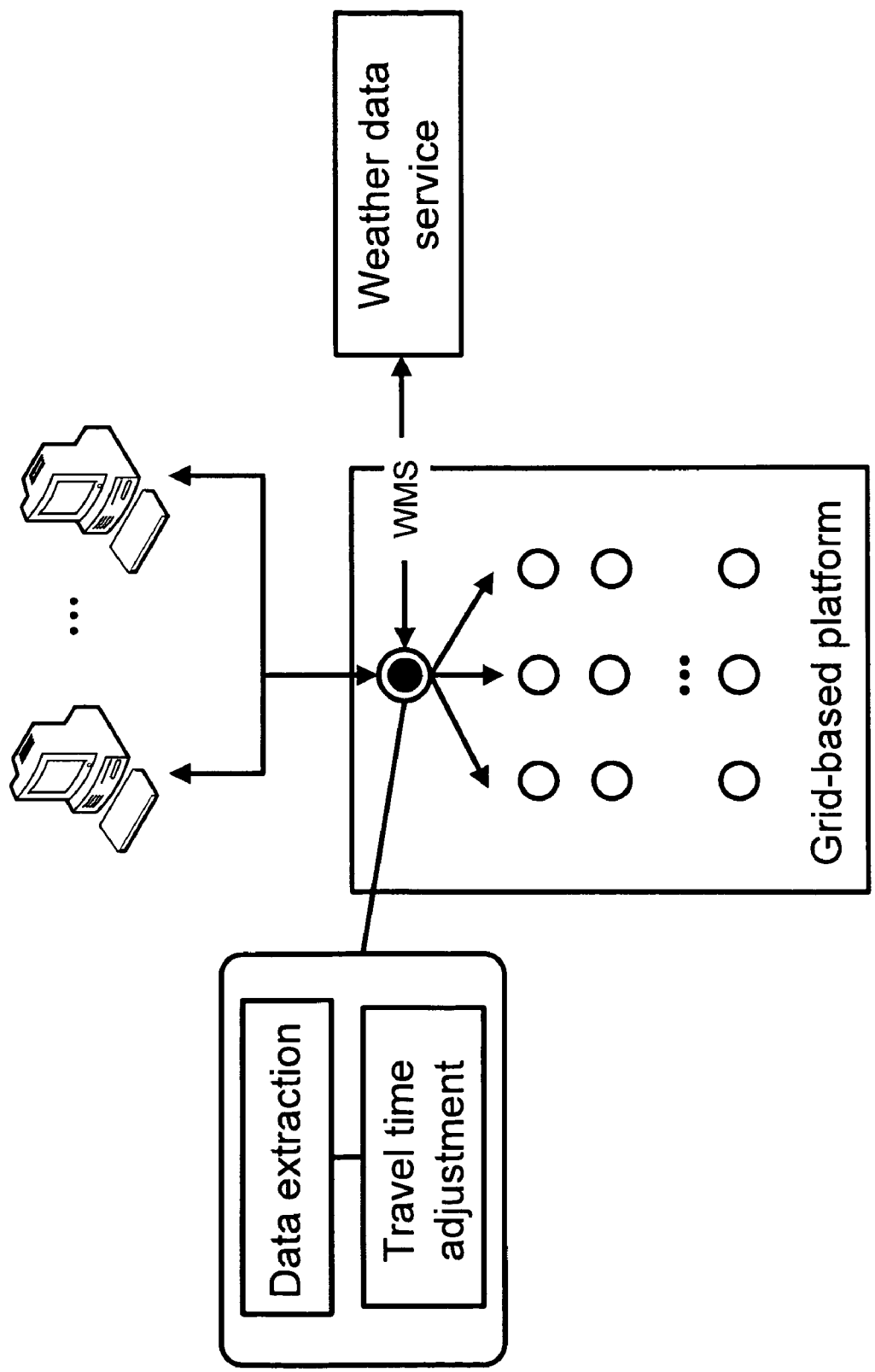
FIG. 9 is a block diagram showing an example design of a dynamic traffic weather service on GRID.

When receiving the updated weather layer provided by the real-time NEXRAD web map service, the dynamic traffic weather service may integrate that layer with the transportation layer. Based on the idea of service chaining, there are multiple approaches to leveraging the dynamic traffic weather service where the service can be an input provider or post processor of the traffic simulator. In a first approach, the traffic simulator may consider the weather layer as a special type of incident. In a second approach, the weather layer may be treated independently by updating the results from the traffic simulator. If a microscopic traffic simulator is utilized, the second approach might be more straightforward by updating the travel time only on the affected links and studies have previously been conducted on how to perform those updates. FIG. 9 illustrates an example design for link travel time updates according to road weather conditions. The weather data service may provide near real-time radar data complying with WMS standards every 4 to 10 minutes. From the map images, the Grid node identifies the (ID, travel time value) pairs for the links covered by high precipitation and makes the update. After the update is finished, the link travel time matrix is duplicated onto all grid nodes for routing.

4.4.2 Methodology

A 2003 study reported how precipitation impacts 33 major highways in Washington D.C. and found that when precipitation increases every 0.01 inches per hour, the travel time will increase at a ratio as illustrated in the table in FIG. 10.

The Table in FIG. 11 shows weather impacts on traffic speed for five roadways in Chicago, Seattle and Minneapolis. The impact under heavy snow is not shown in the table due to a lack of data. The table indicates that different weather conditions have different impacts on travel speed. For example, under heavy rain during peak hours, the average travel speed reduces by 7.74 mph and by 2.34 mph under light rain during peak hours.

These research results may be used to test the mechanism for integrating weather impacts in a near real-time fashion. According to weather radar data for a specific link at time t, the model first checks if it falls within peak hours or non-peak hours, and each speed ratio $S_{tl}$ is selected from one of the highlighted columns in Table 4.2. Since travel time is the reciprocal of travel speed, the travel time ratio is:

$$R_{tl} = \frac{1}{S_{tl}} \qquad (4.1)$$

On the other hand, the simulator may also generate a link travel time matrix without considering any road weather impacts. So the link travel time ratio can be used to update the travel time matrix, where t is time point, and 1 is link ID:

$$T_{tl}' = R_{tl} \times T_{tl}, t \in \{t_1, t_2, \ldots, t_m\}, l \in \{l_1, l_2, \ldots, l_n\} \qquad (4.2)$$

Figure 12:
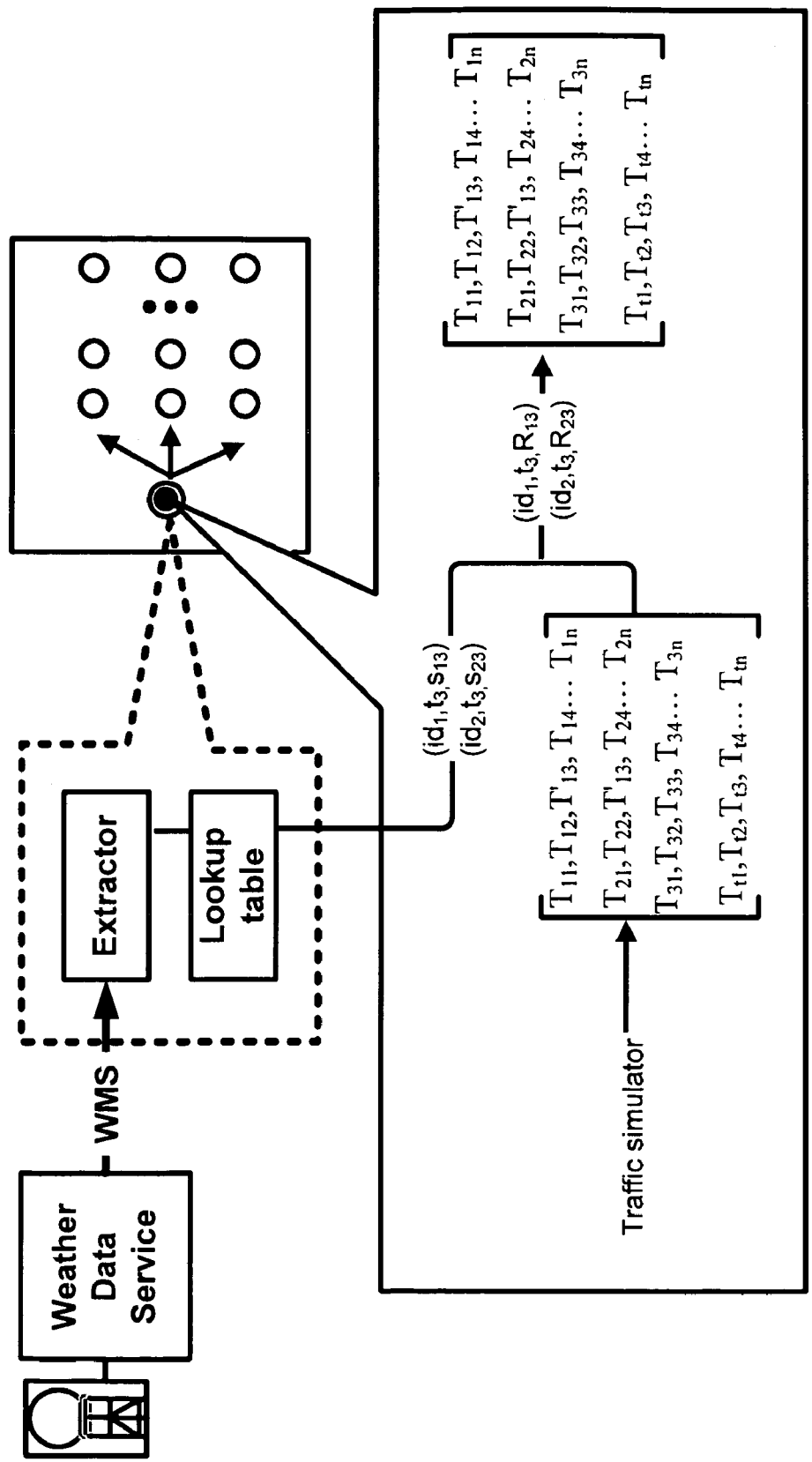
FIG. 12 is a diagram showing a link travel time adjustment on one grid node.
Figure 13:
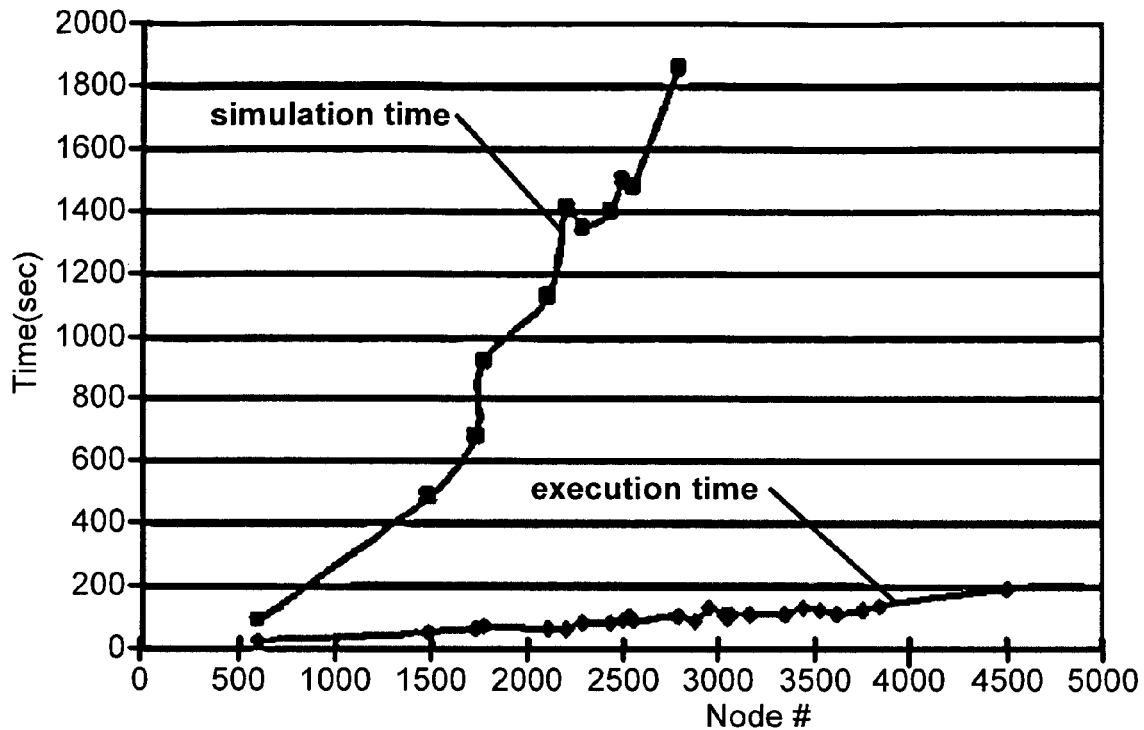
FIG. 13 is a graph showing simulation time and execution time with different numbers of nodes.
Figure 14:
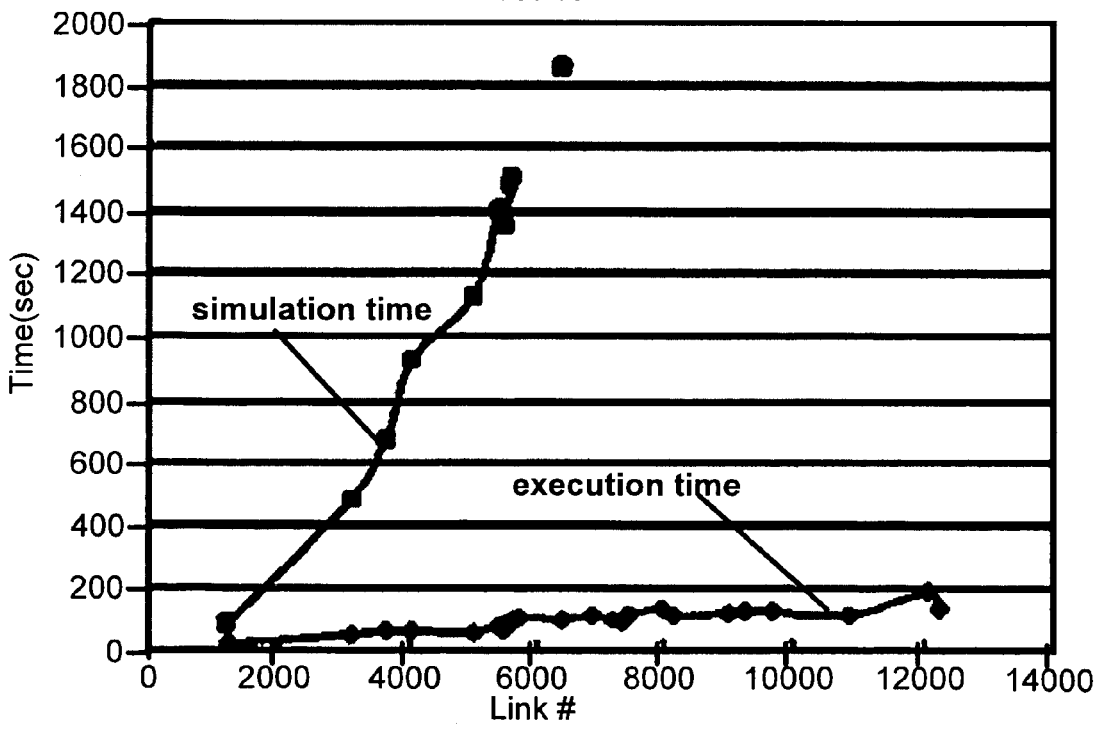
FIG. 14 is a graph showing simulation time and execution time with different numbers of links.
Figure 15:
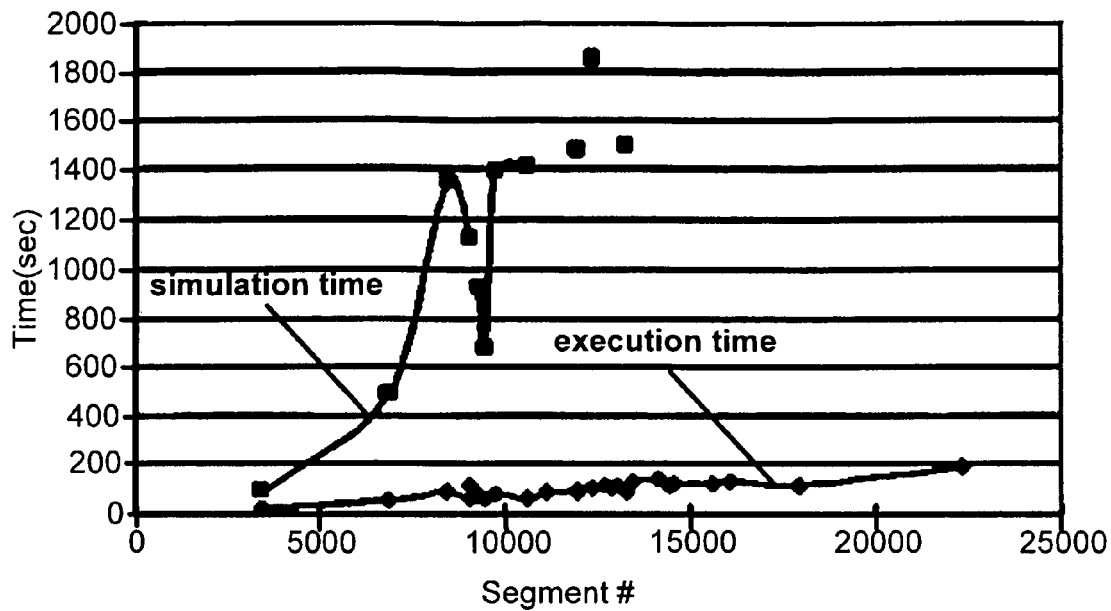
FIG. 15 is a graph showing simulation time and execution time with different numbers of segments.
Figure 16:
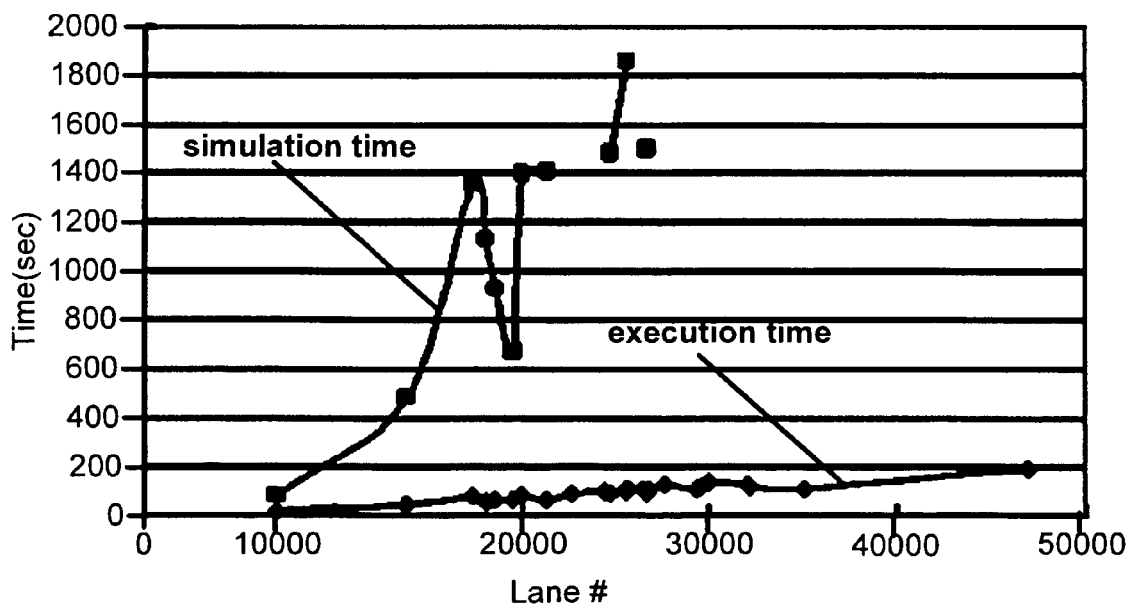
FIG. 16 is a graph showing simulation time and execution time with different numbers of lanes.

The travel time adjustment is described in FIG. 12. With weather information from the weather data service, the data extractor may select the locations that are currently under adverse weather conditions and passes weather information and the time index to a lookup table, where the speed ratio is selected. For example, the speed ratio $S_{13}$ on pixel 1 at time index 1, and $S_{23}$ on pixel 2 at time index 2 may be obtained from a lookup table based on the weather radar information on this link. $R_{13}$ and $R_{23}$ may be calculated based on equation (4.1) and travel time values $T'_{13}$ and $T'_{23}$ updated according to equation (4.2). With the impact ratios for all of the affected links, the travel time matrix may be updated by weather impacts on the affected links. The output of the service may be a matrix that includes updated travel times for each link at the current time interval. If integrating weather forecasting as well, the matrix may have the time dimension extended to the future.

Section 5

Dynamic Routing Supported by Grid Computing

Virtualized Grid infrastructure provides a collaborative environment for time consuming tasks, which can be divided into multiple jobs for multiple computing nodes on a Grid platform. Both traffic simulation and dynamic routing are such tasks. For traffic simulation, estimated and predicted link travel times may be produced after several runs on a target area so that traffic equilibrium can be achieved. The routing may be accessed frequently when the system becomes public and responds to thousands of concurrent user requests. To get a qualitative understanding of these performance challenges, the first section tests the running time on a single machine, while in the second section Grid computing approaches are studied on how to Grid-enable simulations by decomposing the study area. The simulation on a regional transportation network may be divided into different jobs according to geographical coverage, and each job will be accomplished by a Grid node as an independent job. For a routing module dealing with massive concurrent user requests, the division may be done against the set of user requests. Therefore each request may be handled separately by computing nodes on the Grid. The second and third parts in this section detail example approaches.

5.1 Performance Study 5.1.1 Traffic Simulation Performance on Single Machine

To illustrate the performance challenge for simulations, a performance test was carried out using a single machine with different numbers of transportation elements, such as links, nodes, paths, and segments. As illustrated in FIG. 13 through FIG. 16, the increase in number of road elements, such as node, link, segment and lane will increase the execution time and the simulation time, where simulation time is defined as the time for actual simulation after all data are prepared. Execution time, including the data input reading and simulation data structure preparation, reflects the simulation time plus preparation time because data may need to be prepared every time new observing input becomes available. When the elements number increased to a certain number (for example, 2700 in FIG. 13), the execution can may not be able to be done at once, that is to say, the computing resource may not be enough to prepare the data for simulation. Therefore, large study areas may be decomposed into a number of smaller study sections.

5.1.2 Path Routing Performance on Single Machine

Figure 17:
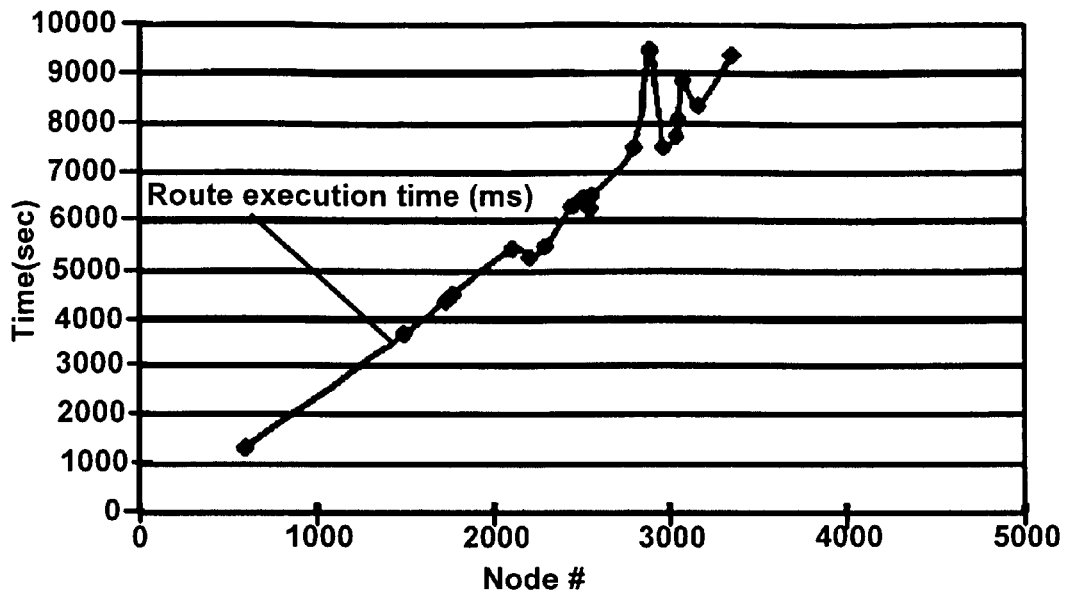
FIG. 17 is a graph showing routing execution time with different numbers of nodes.
Figure 18:
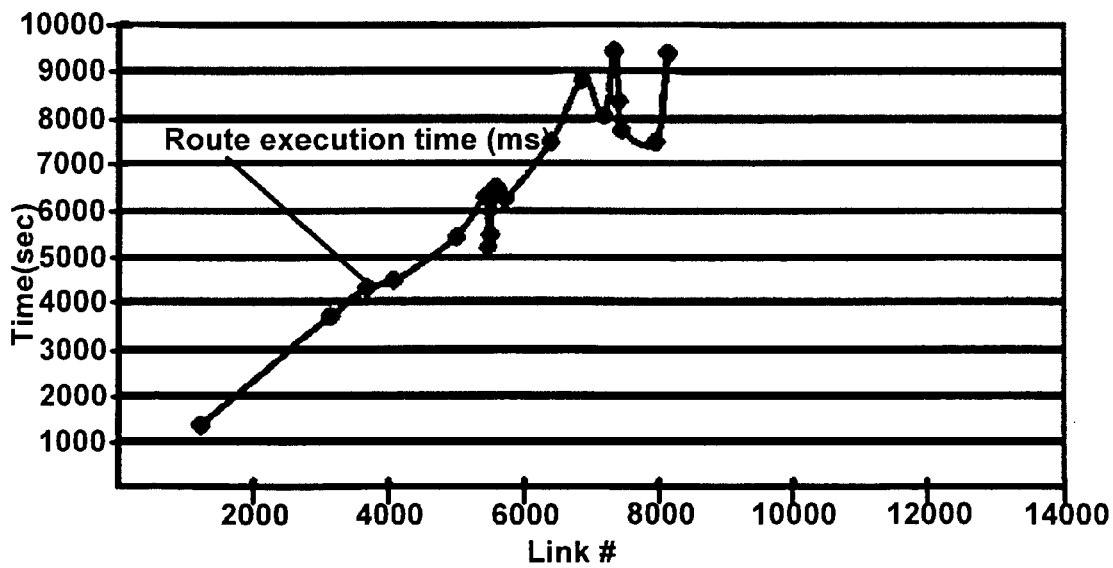
FIG. 18 is a graph showing routing execution time with different numbers of links.

To illustrate the performance challenge of massive concurrent user requests, a performance test was carried out using a single machine for different numbers of links and different numbers of concurrent user requests. As illustrated in FIG. 17-FIG. 18, the increase in node number and link number may increase the routing time. The response time includes data transformation and routing data structure preparation. When the element number increased to a certain number, the execution may not be done on one machine, i.e., the computing resource may not be enough to prepare the data for simulation. Therefore, the study area with elements under a certain number may need to be decomposed.

Figure 19:
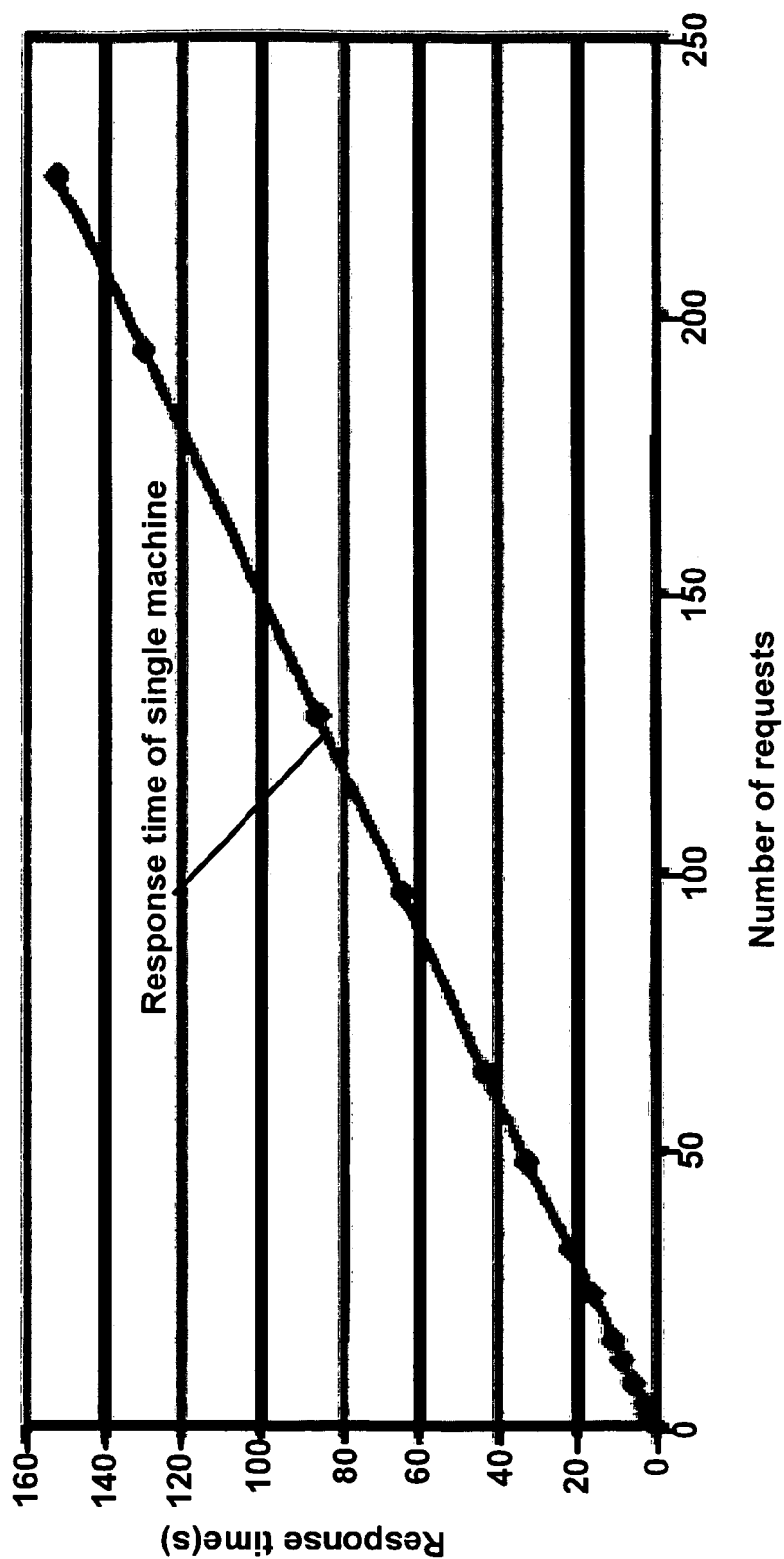
FIG. 19 is a graph showing routing execution time with different numbers of concurrent users.

Because routing is supposed to be accessed by massive concurrent users when gets into operation, the performance may become a concern. As illustrated in FIG. 19, for a routing network that has about 1300 travel links, when the request number increases to 10, the response time may increase to more than 10 seconds, therefore, exceeding the capability of a single machine within users' expectations. Thus, it may be important to dispatch the masses of concurrent users to different computers within a grid platform.

5.2 Grid-Enabled Traffic Simulation

Time-dependent link travel time may be generated by a microscopic traffic simulator. Early attempts attempted parallel implementation of micro-simulators were first developed as sequential simulators and then further developed into parallel simulators later. Links from the overall region are split using methods of geographic area decomposition, while limited message exchange is retained between running units of each decomposed area. Alternatively, MITSIMLab used PVM (Parallel Virtual Machine) to divide modules onto different machines, and in this case, the Traffic Management System and Traffic Flow Simulator may run on two machines and work collaboratively. Since the modules within a simulation are usually highly interactive in order to represent the real traffic situation, the speed increase of the latter through algorithm improvement is not as efficient as is geographical decomposition using grid computing.

On the other side, it is relatively easy to divide study area into sections. Tobler's first law of geography states that everything is related to everything else, but near things are more related than distant things. Geospatial based traffic simulation is one of such geographic phenomena. Therefore, special attention is required for keeping the strong relationship of "related" and "near" things during the decomposition.

5.2.1 Geographic Area Decomposition for the Transportation Network

An immediate question for grid enabling traffic simulation is how to divide the transportation network. Vector-based networks are different from raster maps in that each vector feature does not have a regulated position or dimension. Simply cutting the links into segments may result in topological disorders as well as incomplete/duplicate records. Another issue is that traffic situations on the borders or close to the borders in each section may not be simulated with significant accuracy because factors around these areas are not considered in such decompositions. Under the design of Cellular Automata (CA), Paralleled TRANSIMS cuts the links instead of intersections and retains the message exchange of five cells near each cut between CPUs which share the link. This five-cell selection is based on the assumption that all of these two-dimensional CAs have a five-cell neighborhood. Using this method, it is hard to control the area of each section. In a multi-organizational environment, individual organizations would like to share data and facilities with others but while also keeping the area integrated for their specific purpose. Therefore, flexible area division into irregular shapes may be preferred.

In this approach, divided sections from a large scale transportation area may have two characteristics:

Irregular shape in order to contain complete features and corresponding topologies.

A buffered area with overlapping threshold $\theta$.

Figure 20:
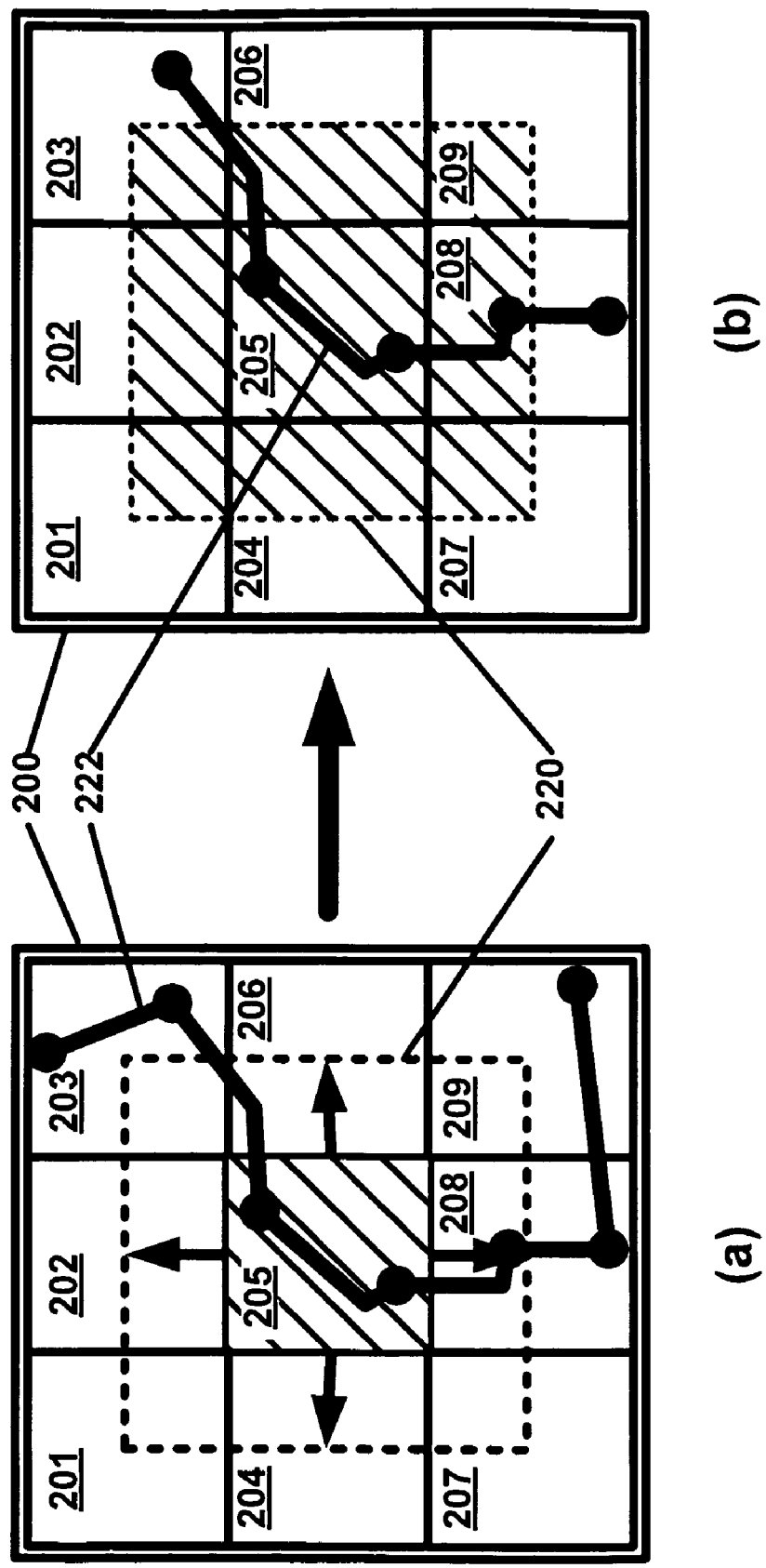
FIG. 20 is a diagram showing domain decomposition of a network area.
Figure 21:
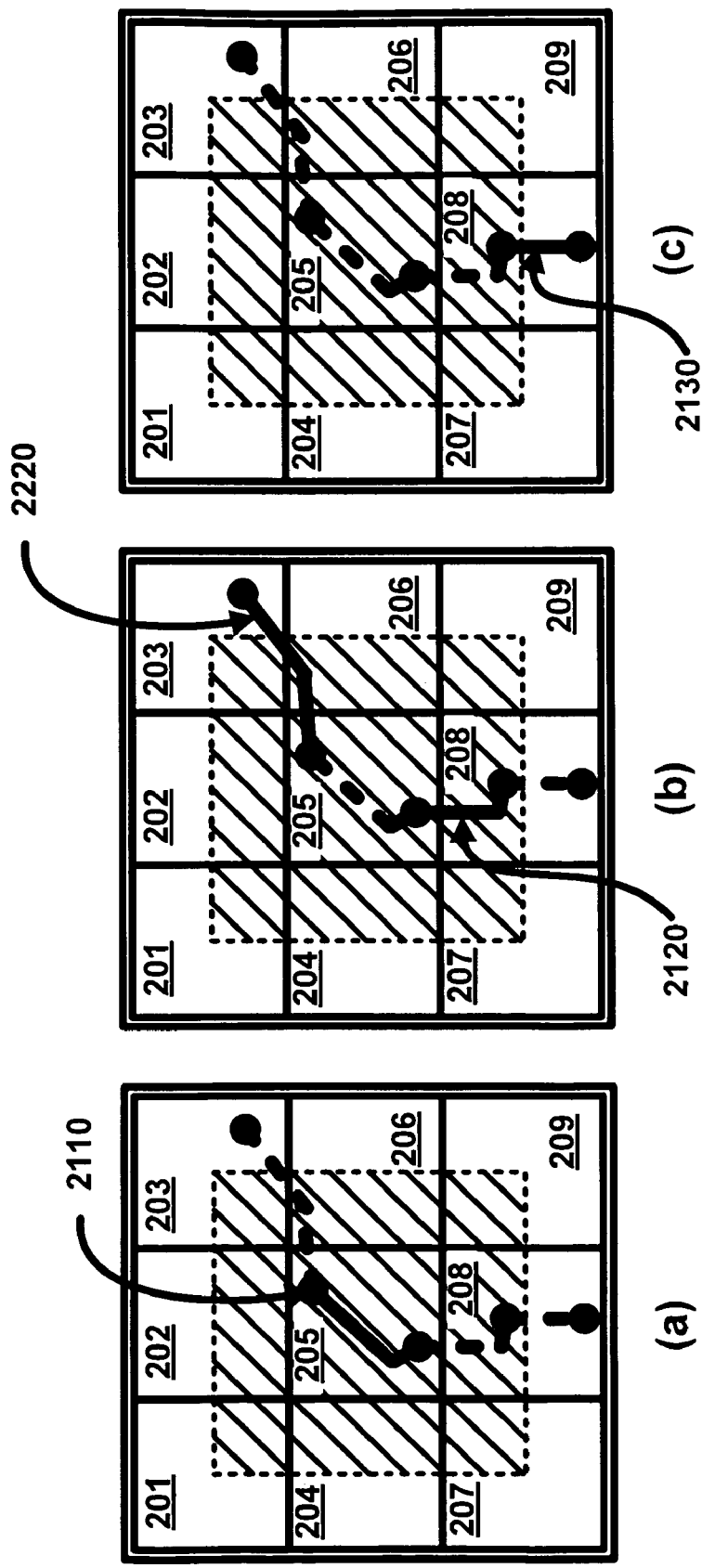
FIG. 21 is a diagram showing road link recognition in decomposed sections.

The area decomposition and link categorization are illustrated in FIG. 20 and FIG. 21. A network traffic area 200 is decomposed into a 3×3 matrix (201 through 209), and each cell is expanded with a threshold or buffer distance illustrated by the dashed rectangle 220. Take section 205 in FIG. 20, part (a) as an example; the study area is expanded as in FIG. 20, part (b) and links outside the expanded hatched area are not considered for section 5.

Due to different topological relationships between links, there are three types of links under discussion: the solid link 2110 in FIG. 21 (a) sits completely within section 5. The simulator for section 205 will generate estimated travel time on this link 2110; the links 2120 and 2122 in FIG. 21 (b) intersect with section 5 but sit partially or fully within the extended area, and these two links (2120 and 2122) will also be studied by neighbor simulators for section 203, 206 and 208; link 2130 in FIG. 21 (c) sits outside section 205 but intersects with its extended area. It will participate in the simulator as a reference-only input, and the simulated travel time will not be considered as a final result.

5.2.2 Network Decomposition and Section Result Aggregation

After each Grid node finishes its task, results will be returned to the job submitter and aggregated into a complete link travel time table. Taking section 205 in FIG. 20 as an example, travel time results of the solid link 222 in FIG. 20 (a) will be directly incorporated into the travel time table, while the link 222 in FIG. 20 (b) will have duplicated results from simulations on all its neighboring cells (such as cell 208 for the bottom one and cells 203 and 206 for the top one). So averaged travel time will be added into the travel time table. The highlighted links in FIG. 21 (c) are included in the simulation as the neighboring factors for those links on the borders of cell 205. These links are for reference only and simulated results will not be included in the travel time table from cell 205. However, since the cells are fully tiled, estimated link travel time from these links will be generated from other neighboring cells.

The travel time table may maintain updated link travel times from simulations on Grid nodes. The table contains complete time-dependent travel link times, which constitute a space-time network as introduced earlier. These results will be the input for Grid-enabled path routing.

5.3 Grid-Enabled Routing

Figure 22A:
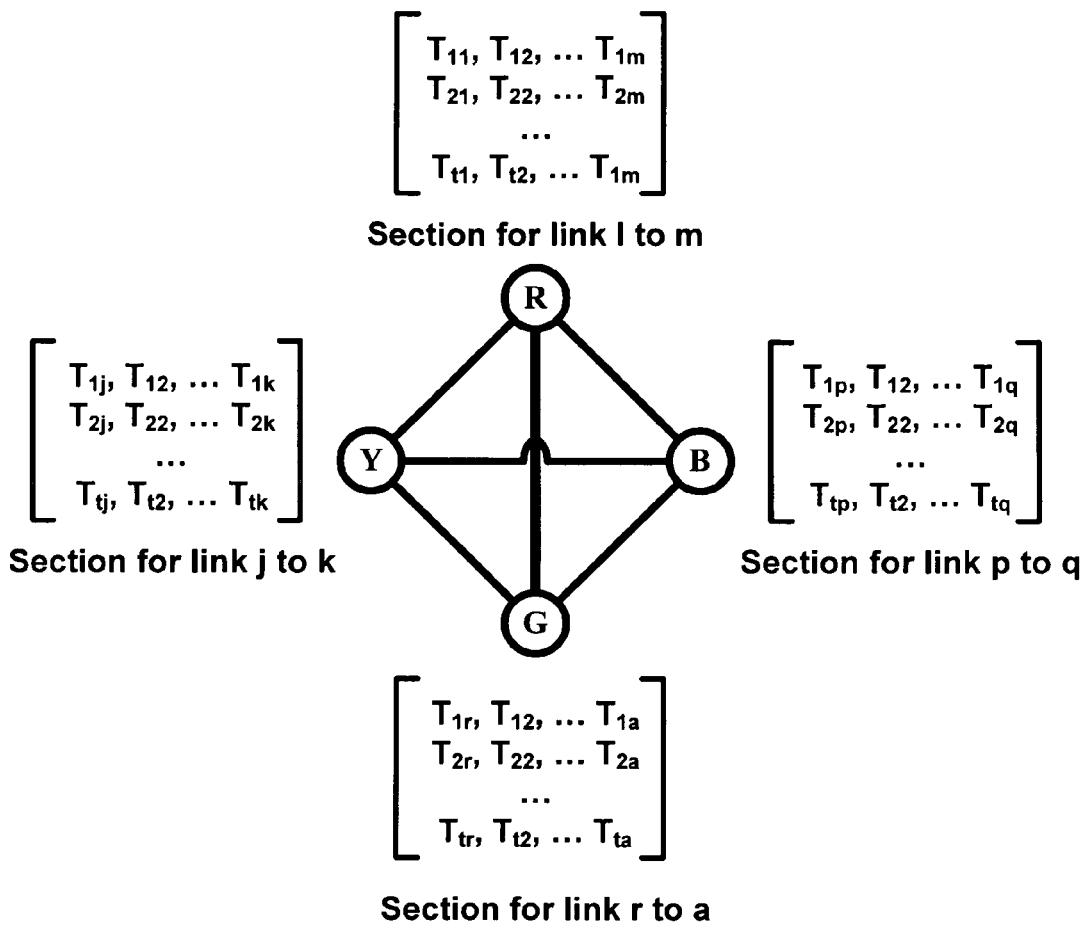
FIGS. 22A, 22B and 22C is a diagram showing routing input collection and dissemination on Grid platform.
Figure 22B:
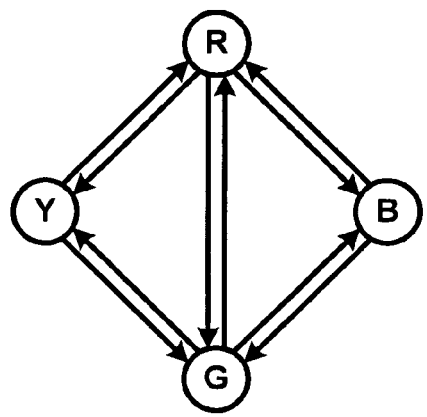
Figure 22C:
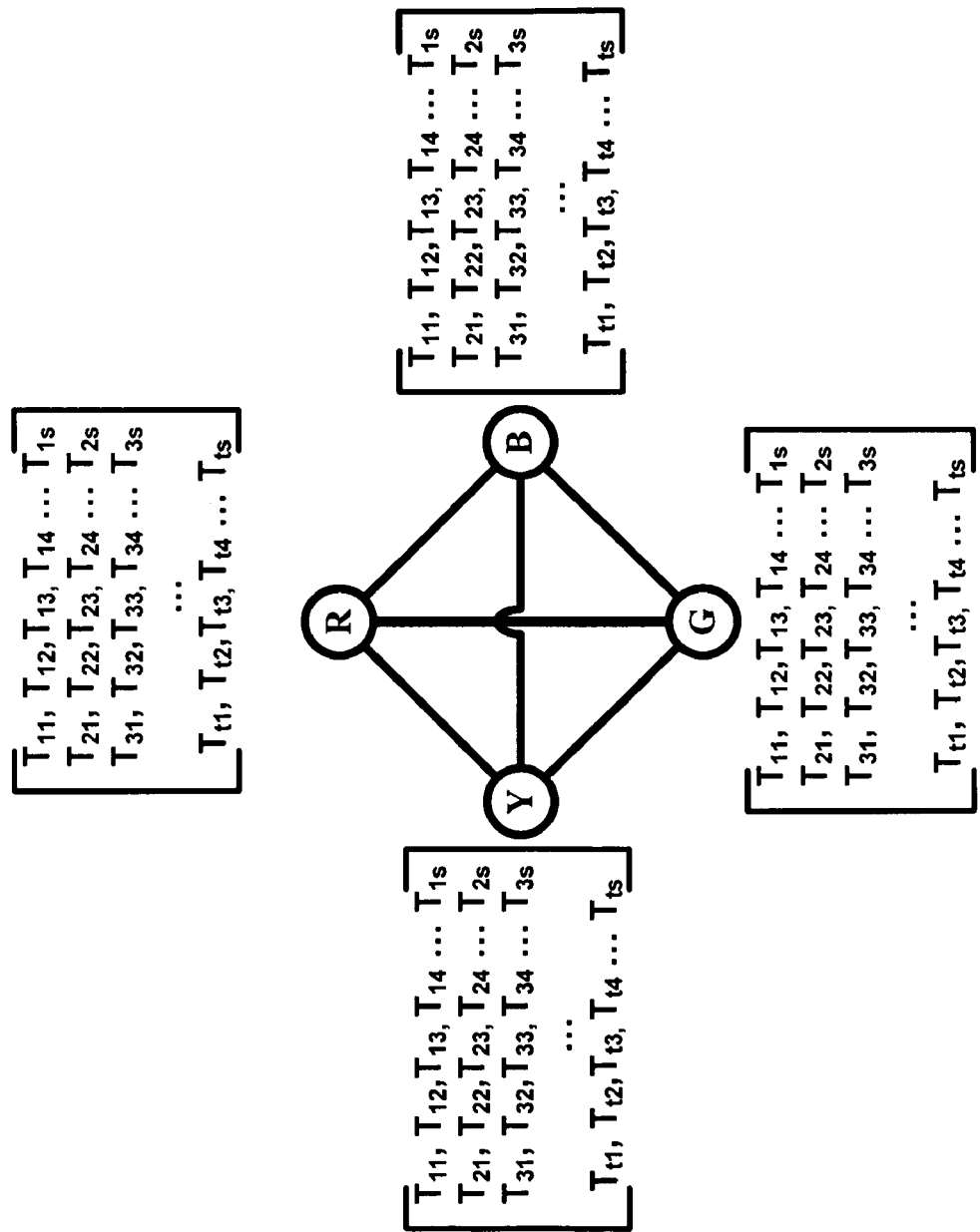

The approach for Grid-enabled routing is based on the routing mechanisms, which usually calculate shortest path from one origin to one destination or one origin to all the other nodes. Although the link travel times are maintained in a single table, these routing tasks are practically independent from each other according to different Origin-Destination (OD) pairs. For real time routing requests, it may not be possible to pre-compute a comprehensive all-to-all path table because most (origin, destination) pairs will get different routes against different times. Therefore, the routing may have to be done on-the-fly and may be very time-consuming for massive concurrent user requests. The issue can be addressed with Grid platform. As indicated in FIGS. 22A, 22B and 22C, each Grid node has its simulated link travel time when the current simulation is finished. Each of the nodes may submit its local simulation results to all the other nodes, and aggregation may be executed on each node, including averaging duplicate links (in buffered area) and discarding extra links (outside buffered area). After that, a global link travel time matrix may be generated on each node. When massive concurrent user requests come, the scheduler (or node coordinator) on the core node may communicate with all Grid nodes, check their availabilities, balance the request load, and send routing tasks to available nodes. The global link travel time table is no need to be sent with the task. In this manner, these tasks are able to be executed simultaneously and overall response time for routing requests can be reduced.

Section 6

Integration with Geospatialweb Services

The popularization of web infrastructure in the past decades has provided the mechanism to integrate distributed services in a real-time and flexible fashion. With more and more observational data available over large areas, an online routing system needs to be implemented in just such a real-time and flexible fashion. The online routing system includes dynamic traffic simulators, route guidance generators, and data/result disseminators in an interoperable environment. It is known that processing massive data sets requires much more computing capability than normal, such as powerful supercomputers and clusters at a significant cost, or flexible infrastructures as a cheap alternative. As discussed in previous sections, most traffic estimation, simulation, and routing modules are highly dependent on each other, e.g., a traffic prediction module requires frequent updates from a traffic simulation module. Therefore, decoupling these modules into different processing modules may be a grand or unachievable challenge. On the other hand, most traffic sensors are geographically distributed and processed at different processing centers. This naturally distributed data collection and processing scheme fit into the principles of distributed geospatial information processing, which focuses on web services for integration. Hence, this section studies how to integrate different components for near real-time routing using geospatial web services to loosely couple while leveraging the distributed geospatial and computing resources.

6.1 Geospatial Services and Transportation
6.1.1 Standard Web Services in Transportation A web service is a software system designed to support interoperable machine-to-machine interactions over a network (W3C 2003). Distinguished from the tightly coupled Common Object Model (COM) and Common Object Request Broker Architecture (CORBA), the communications of web services among "machines" are HTTP (and/or SOAP)-based, therefore loosely coupled. The light-weight message communication may be suitable for all travelers whose travel requests vary tremendously based on different geographical locations and temporal points. Its loosely coupled mechanism provides flexibility to accommodate the integration of different models ranging from traffic estimation/prediction, transportation planning, management models, land use models and population factor analysis. All of these model processes may be incorporated into web services to support a comprehensive study. Between transportation agencies, web services may also facilitate data sharing which has historically been hard due to translation difficulties among the vendor platforms.

The drawback of web services is that 1) the service-based design may add overhead, for example, when using XML for transmitting, transforming road data to and from XML may add to the computing load; 2) service interface wrapping of existing modules may also add overhead; and 3) service management in a secure environment with different agencies needs to be solved. Despite these limitations, the Service-based design provides a practical solution to enable the integration of distributed resources and modules with much flexibility. Therefore, how to integrate the disclosed routing system from different components using geospatial web services will be discussed.

6.1.2 Geospatial Web Services in Transportation

As mentioned earlier1, several geospatial web services are based on the specifications developed by the Open Geospatial Consortium (OGC), such as WMS, WFS and WCS. The development process of these specifications has been parallel to the standard web services development. WMS is mainly for sharing and transforming spatial data in image formats, such as .jpg and .gif, WFS is mainly for sharing and transforming vector data in XML formats, such as GML, and WCS allows for the exchange of interpreted or extrapolated data, rather than data portrayed in vector or raster formats. Selection of appropriate specifications depends on what content is communicated between components.

Figure 23:
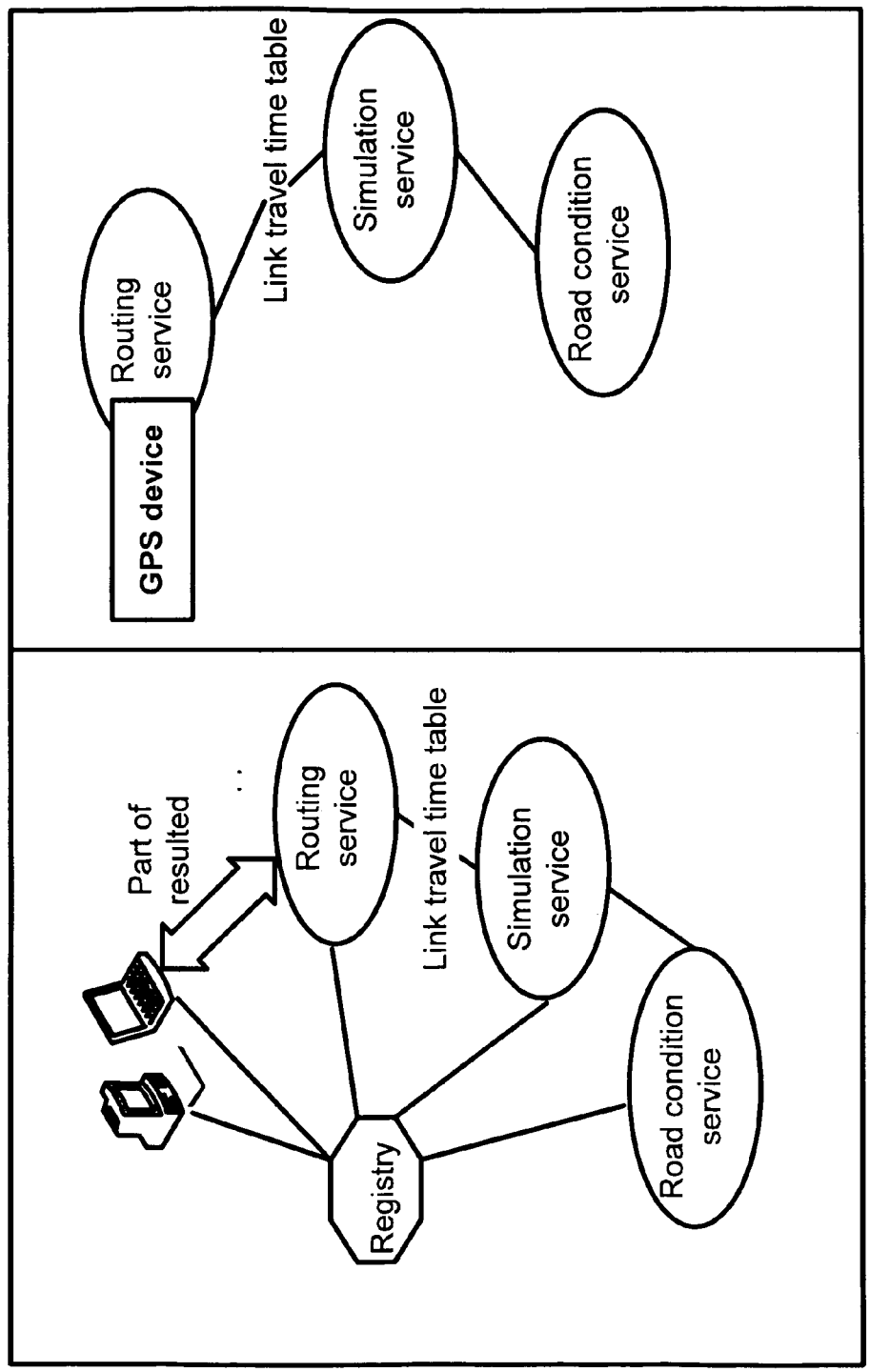
FIG. 23 is a diagram illustrating a web service for traffic network routing.

For transportation applications, communications may be intensive if all detailed road data are transferred from web service to web service. For example, as illustrated in FIG. 23, the routing service requires comprehensive link travel time covering all the possible routes, so users can get information on various route inquiries. Another possibility as illustrated in FIG. 23 (right) is to place routing service as a module on a GPS device which would then only extract link travel time pertinent to the current route. This design requires continuous input from simulators to en-route devices. The current system takes the approach from the right-side of FIG. 23 but by transmitting only routing results to the users.

Figure 24:
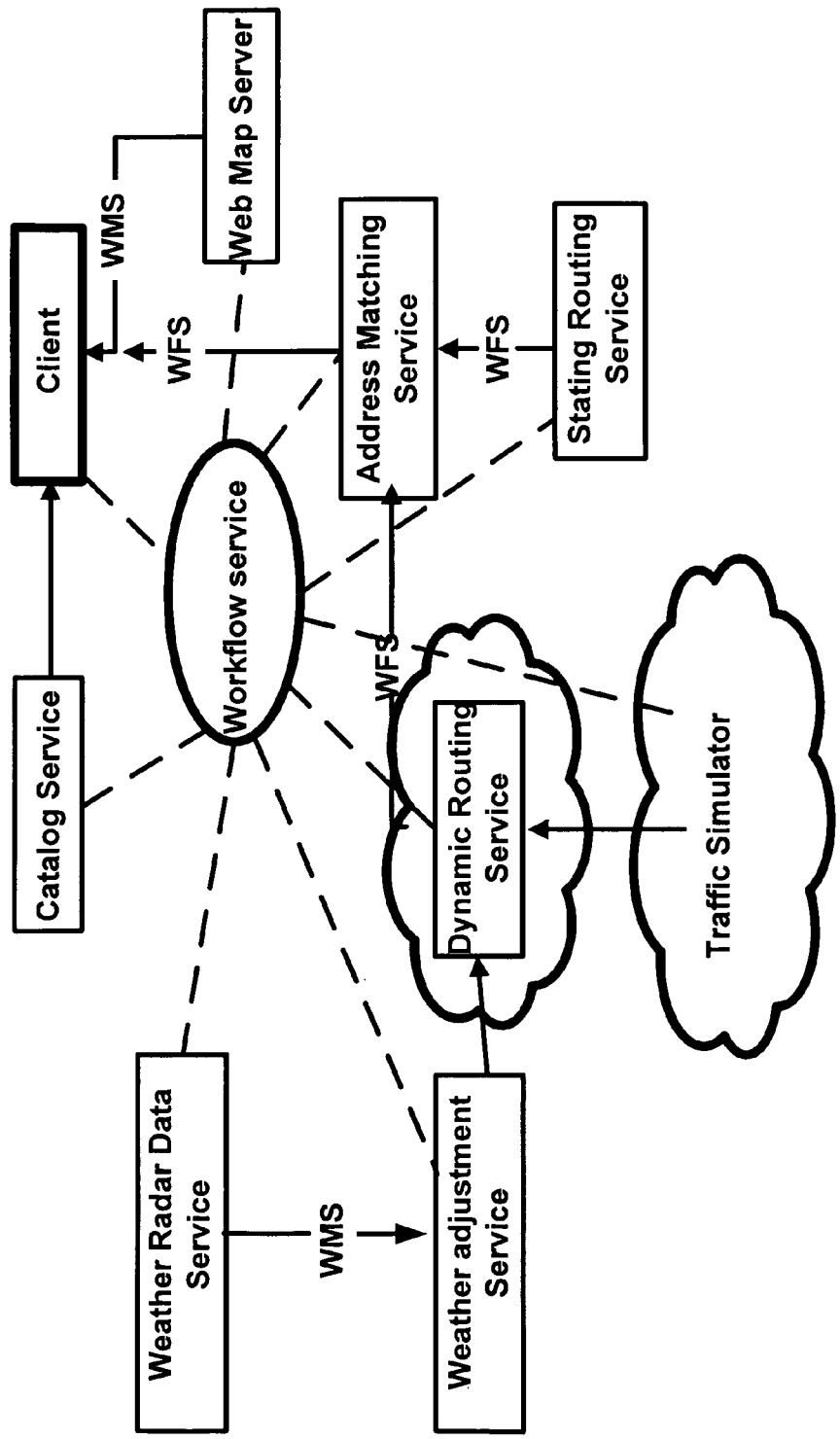
FIG. 24 is a diagram illustrating service chaining for online transportation routing with mediation service.

In a service-based design, the distributed integration and interoperability problem can be partitioned into two sub-problems: 1) the definition of service interfaces and the identification of the protocol(s) that can be used to invoke a particular interface; and 2) ideally, agreement on a standard set of such protocols. The first sub-problem is addressed by standards organizations, such as ISO, FGDC and OGC, as well as industry consortia and national communities. The second sub-problem is an invocation problem targeting the tasks of service registries or service chaining approaches. The proposed geospatial web service integrations deal with both aspects. The basic architecture of the integration is illustrated in FIG. 24 including the components of data acquisition, traffic modeling and web applications.

6.2.1 Data Acquisition

Because transportation involves human, environmental, and many other factors, data acquisition is a huge task. In this integration, acquired data are mainly the input data for traffic simulation service and road condition service. The following paragraphs explain interoperability among different components.

For traffic simulation services, network characteristics represent the static layout and topological relationship of the road network. The static network representation changes very rarely so its preparation for each section is implemented once for all beforehand. However, all of these characteristics can be fully represented using GML. If road reconstruction occurs in a particular area, the changes can be conveyed in GML from WFS services and updates will be made for the simulation correspondingly. Dynamic traffic information, such as traffic accidents, can also be transformed through GML in similar ways as the static network characteristics.

For road weather condition services, the data are provided from weather radar data services complying with WMS specifications. The most recent radar data map is provided by default, while the service is also able to make historical maps available. If a request from the client side consists of a discrete time series, several WMS getMap requests may be fired, and each of them has a moment in time as an attribute value. According to the series of getMap requests, the weather data service should respond with a series of time-stamped radar maps. With these maps, WMS based animations can be realized on the client side. Being interoperable with other standards compliant client applications, this service may be added into other related frameworks and facilitate collaboration within communities.

6.2.2 Simulation and Routing Services

With the mediation service in charge of the workflow control, routing services may be requested separately or coupled with simulation support. The service description in the Web Service Definition Language (WSDL) specifies each service in XML format. If the client side request is not time sensitive (i.e. no time input is provided), the workflow service may direct the request to a static routing service. Otherwise, a dynamic routing service with simulation support may be called. With network characteristics, signal control status, and event input, travel simulators generate updated network conditions for target sections for a specified time period. The simulation service is running on the Grid platform, so the overall system should benefit from decomposed sections. According to client side request, both static and dynamic routing services respond with shortest path results in GML. By complying with other requirements for WFS, these routing services may communicate with all WFS client applications, and provide routing information to their viewers.

6.2.3 Client Application

Figure 25:
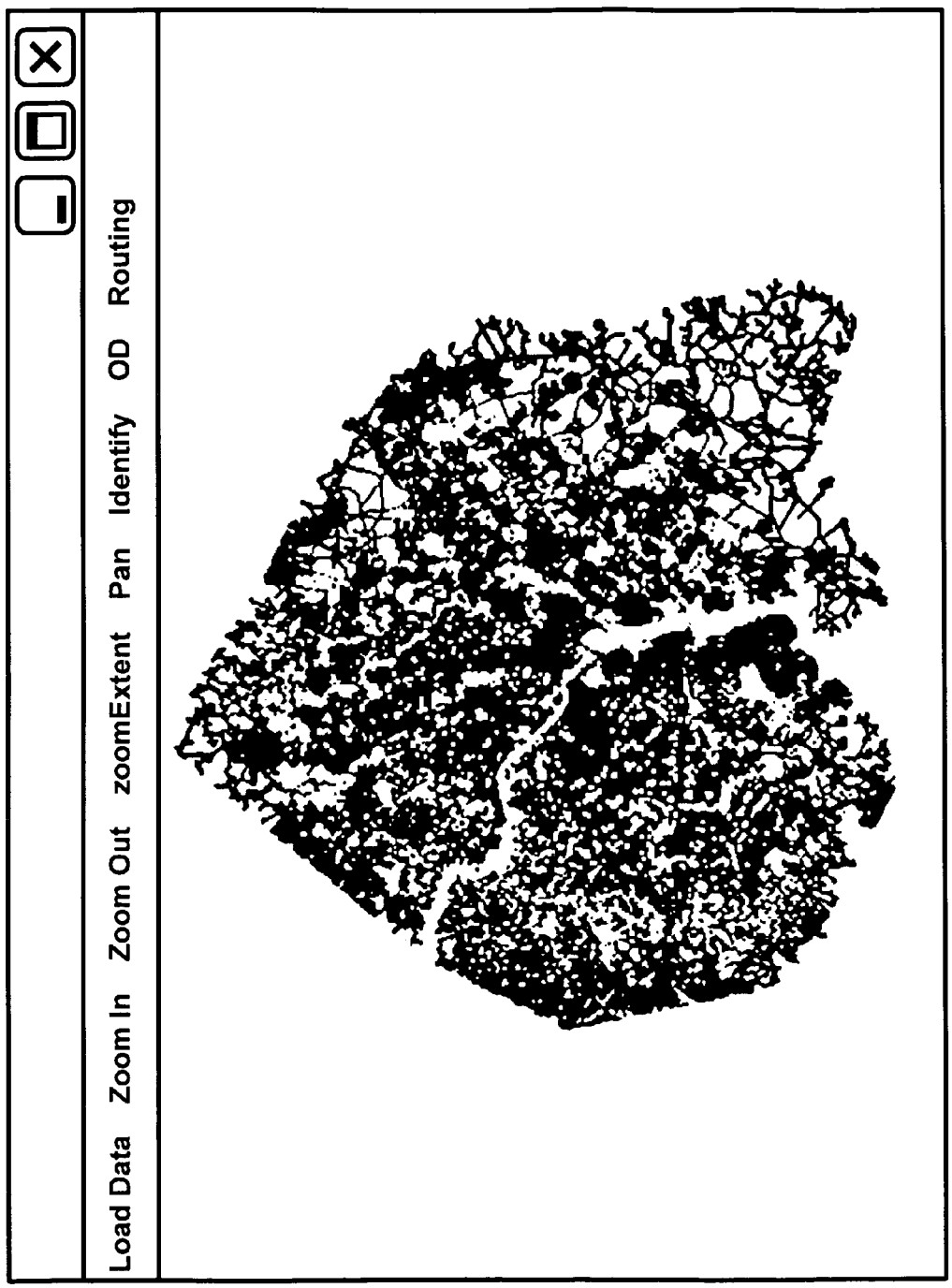
FIG. 25 is a diagram illustrating an example of a graphical user interface for a client application.

The client side application may handle layers of information from different GIServices. The application can either be a robust or simple client viewer based on different requirements. A viewer complying with interoperable standards like WMS, WFS can freely communicate with the standards-based routing service. FIG. 25 illustrates a Java applet map viewer. Data loading comprises of accepting geospatial data from various data sources, in standard data format, such as image formats of PNG, JPG, and GIF, or shape files specified by ESRI, or vector-based interoperable format GML. Similar to most popular mapping tools, GIS functions are also provided, including:

"Load data" for loading local data or data provided by geographic web services.
"Zoom in" for zooming into a box drawn on the map
"Zoom out" for zooming out according to a box drawn on the map
"Zoom extent" for zooming to have all data displayed in the largest possible scale
"Pan" to move the map around
"Identify" for bringing up attributes information of identified features
"Origin destination pair" for selecting start and destination points
"Routing" for executing the routing process Each GIS function with a new map extension may send a request to linked GIServices, and the services may provide updated layers accordingly.

Section 7

System Embodiments and an Example for the Southwest Washington D.C. Region

A Texas Transportation Institute study shows an average commuter in the Washington D.C metropolitan area spends 67 hours in congestion annually. The situation calls for not only an efficient long-term planning strategy but also real-time alternative guidance for travelers. In addition, the D.C. area is expected to be covered comprehensively with space-time network for routing so results can be obtained consistently. To this end, a near real-time routing system is needed to provide short-term alternative route guidance for drivers and to archive statistical congestion areas for long-term plans. For an example of at large-scale coverage, embodiments of the system use the southwest Washington D.C. area for a study.

The study area includes all traffic characteristics of the southwest D.C. region. For example, it includes the easily congested sections of I-495, I-66 in downtown D.C., Alexandria, Arlington, and parts of Fairfax County. Network statistics for this area are summarized in the table in FIG. 26.

In order to run the simulation on the Grid platform, the study area is decomposed into 5×5 geographical sections with fixed widths and heights. The sections have overlapping thresholds of 10% of the section width (the overlapping threshold is mentioned in section)

Figure 27:
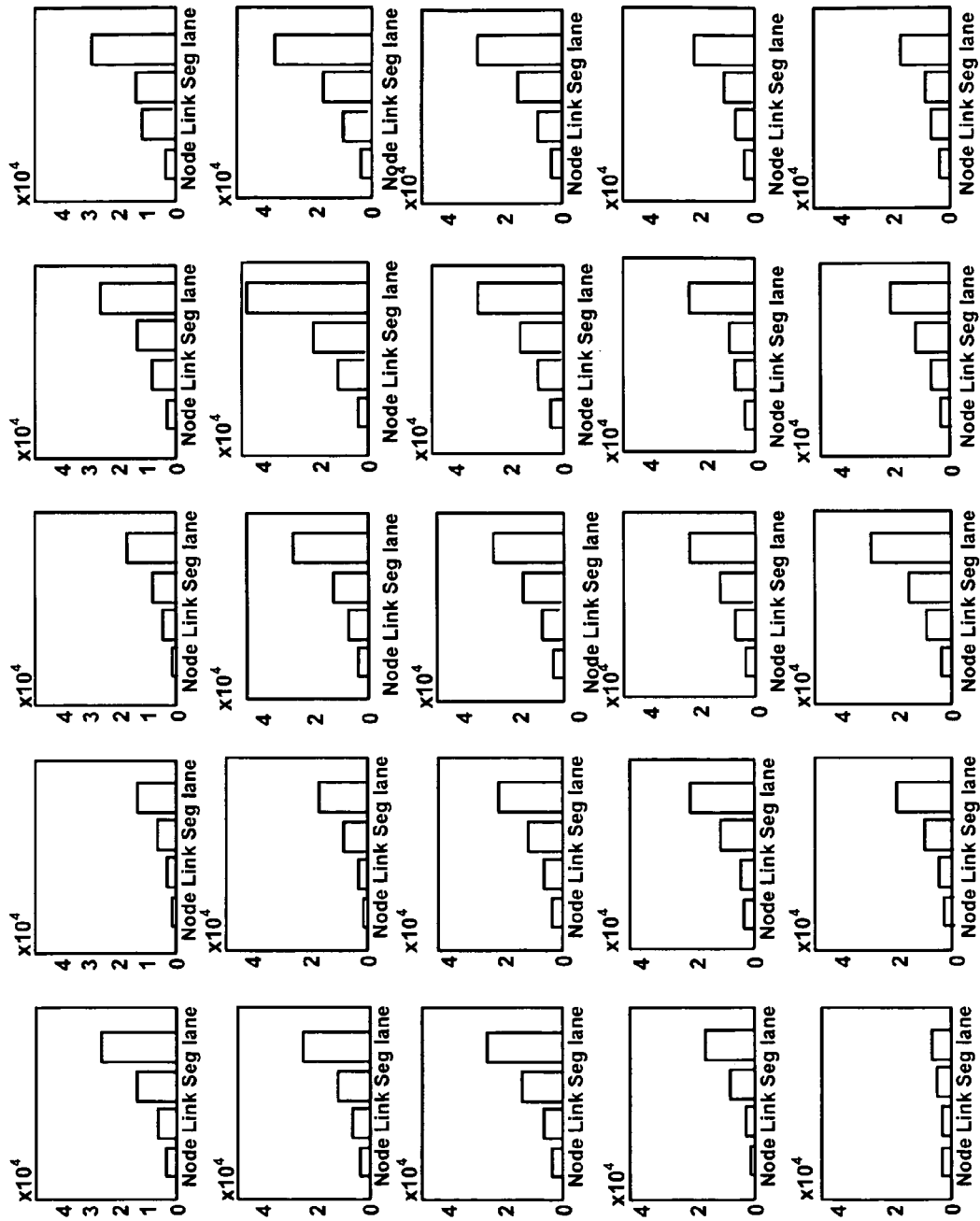
FIG. 27 is a series of graphs showing the number nodes, links, segments and lanes in each of 5×5 segments.

Because the density of the network varies from area to area, the node and link numbers are different in these sections. FIG. 27 records the element numbers for each of the 25 sections.

Figure 28:
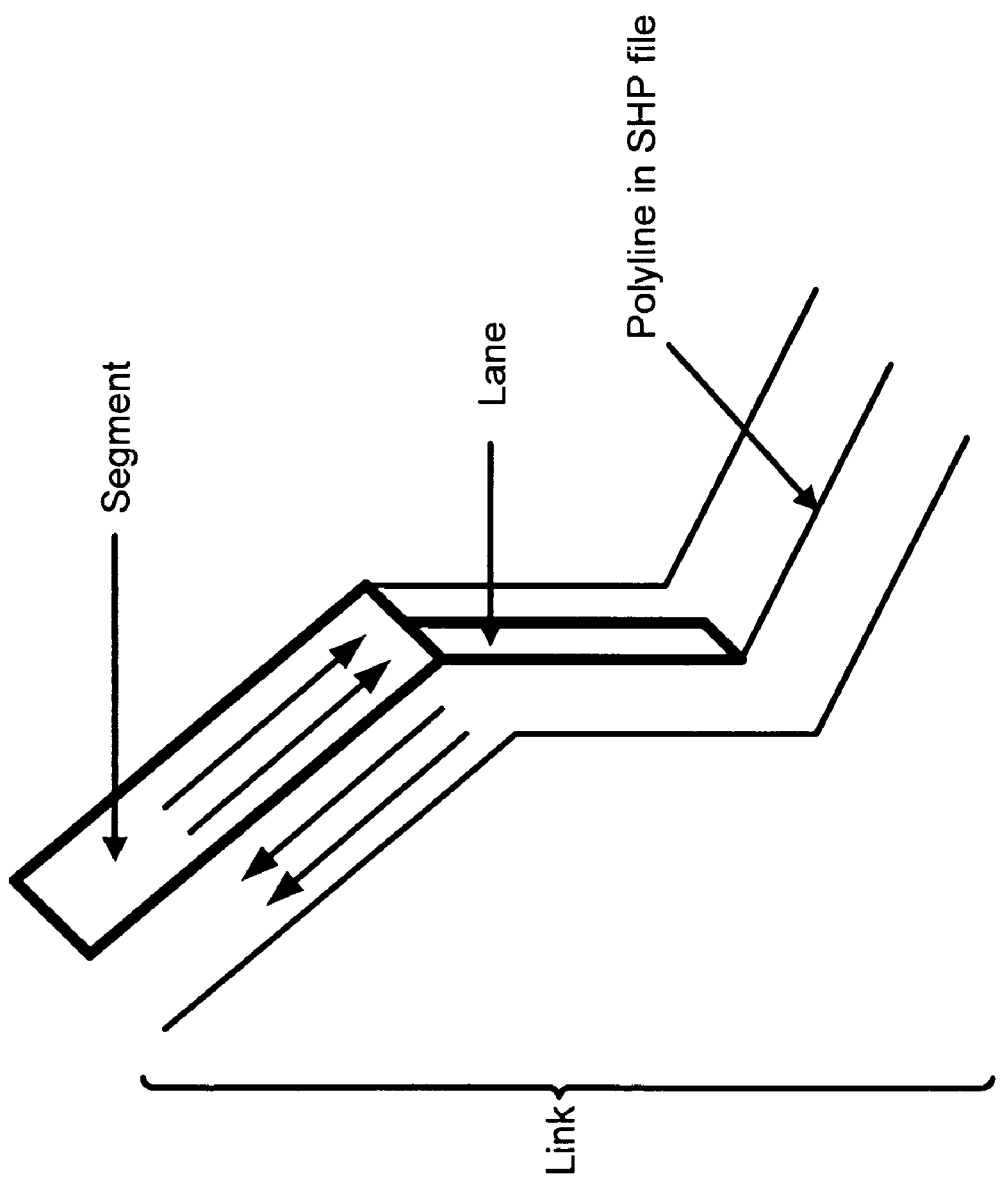
FIG. 28 is a mapping from polyline to link, segment, and lane as simulation input.

According to definition in MITSIMLab, the network characteristics include road links, segments, lanes, and lane connectivity, shown as an example in FIG. 28. One link consists of one or several segments, and each segment has one or more lanes. All these road links, segments and lanes have direction, so if the road is bi-directional, one polyline in the shape file indicates two links with opposite directions. The cell 11 is used for most of the studies in section 8.

7.2 System Embodiment Design

Figure 29:
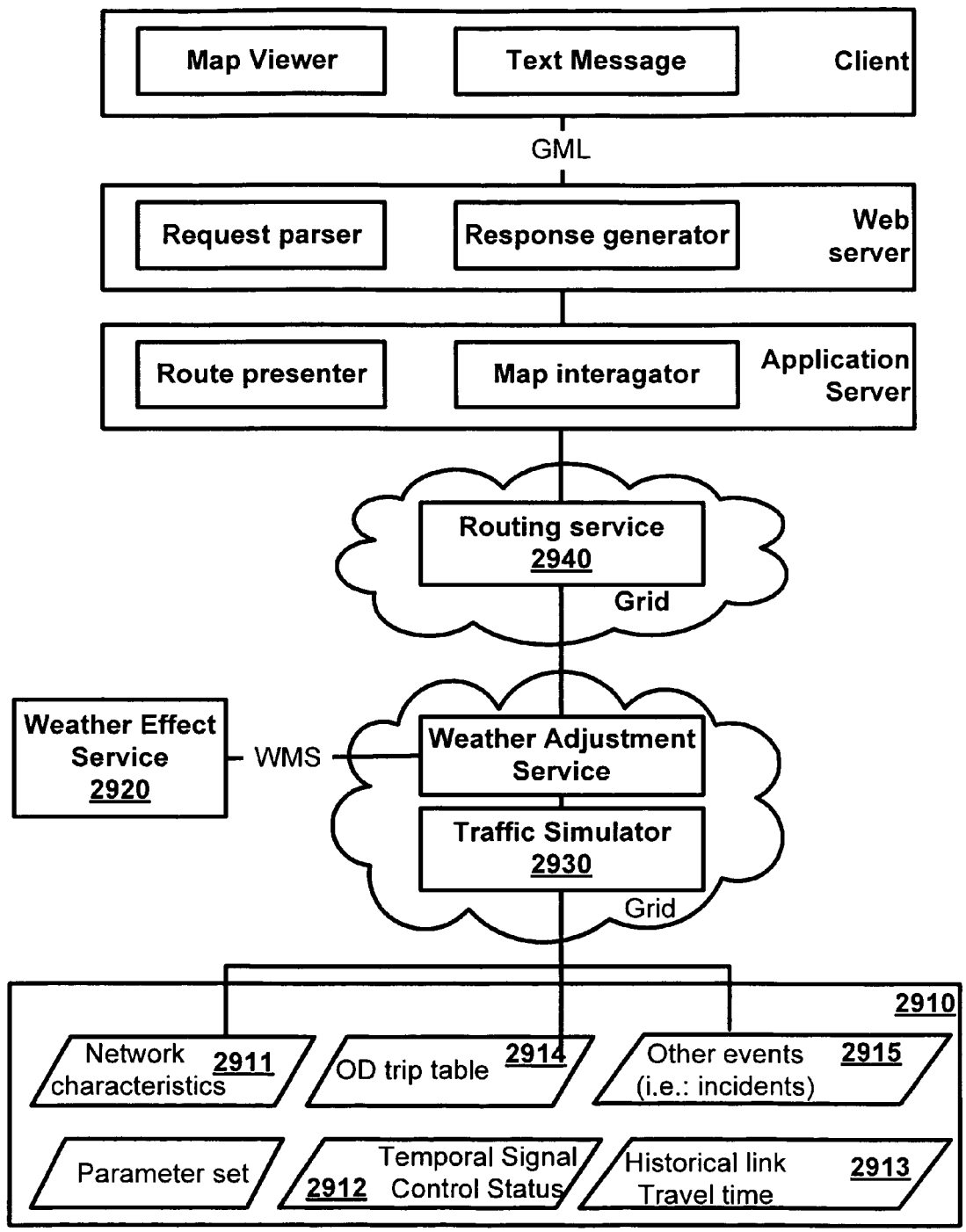
FIG. 29 is a block diagram for an architecture of a near real-time network routing system.

The architecture of the system embodiment used for some of the disclosed experiments is illustrated in FIG. 29. The data portion 2910 involves static network characteristics 2911, temporal signal control status 2912, historical link travel times 2913, an origin-destination table 2914, and other non-recurring events 2915 such as accidents and work zones. Besides the common input for traffic simulators, a real-time weather radar data service 2910 is introduced to test the mechanism for integrating other factors. Due to the occasional radar data delay from this data service, the system is sometimes regarded as near real-time. After acquiring traffic data, the traffic modeler utilizes the Grid platform for the simulation 2930 and routing tasks 2940. As discussed in section 7.1, the simulation area is decomposed into network sections and tasks are distributed to different Grid nodes. These simulators run on the nodes simultaneously and return travel link times for a target time span to every other node, where a global link travel time table is aggregated and maintained. When massive concurrent user requests occur, the computing power of the Grid platform is utilized again by dispatching the routing requests to different computing nodes. Each routing task will be running on a single Grid node and return the fastest paths for one OD pair. When any routing task is complete, the result will be forwarded to an application server and passed to the client side.

7.3 System Implementation
7.3.1 Data Preparation

Traffic network data are generated from ESRI shapefiles (ESRI Data & Maps and StreetMap USA). Since a shapefile does not contain any topological relationships, the ArcGIS Network Analyst is used to generate all the intersection nodes in addition to end nodes. An historical trip table is also generated using its routing functions. For simplicity, the number of lanes per segment is dependent on the speed limit according to its static network characteristics. For example, if the speed limit for a segment is higher than 25 mph and lower than 45 mph, there are two lanes defined for this segment. The required input files for simulations are static network dataset, historical travel times, origin-destination trip table, and simulation master control file.

7.3.2 Grid Enabled Simulation and Routing

Figure 30:
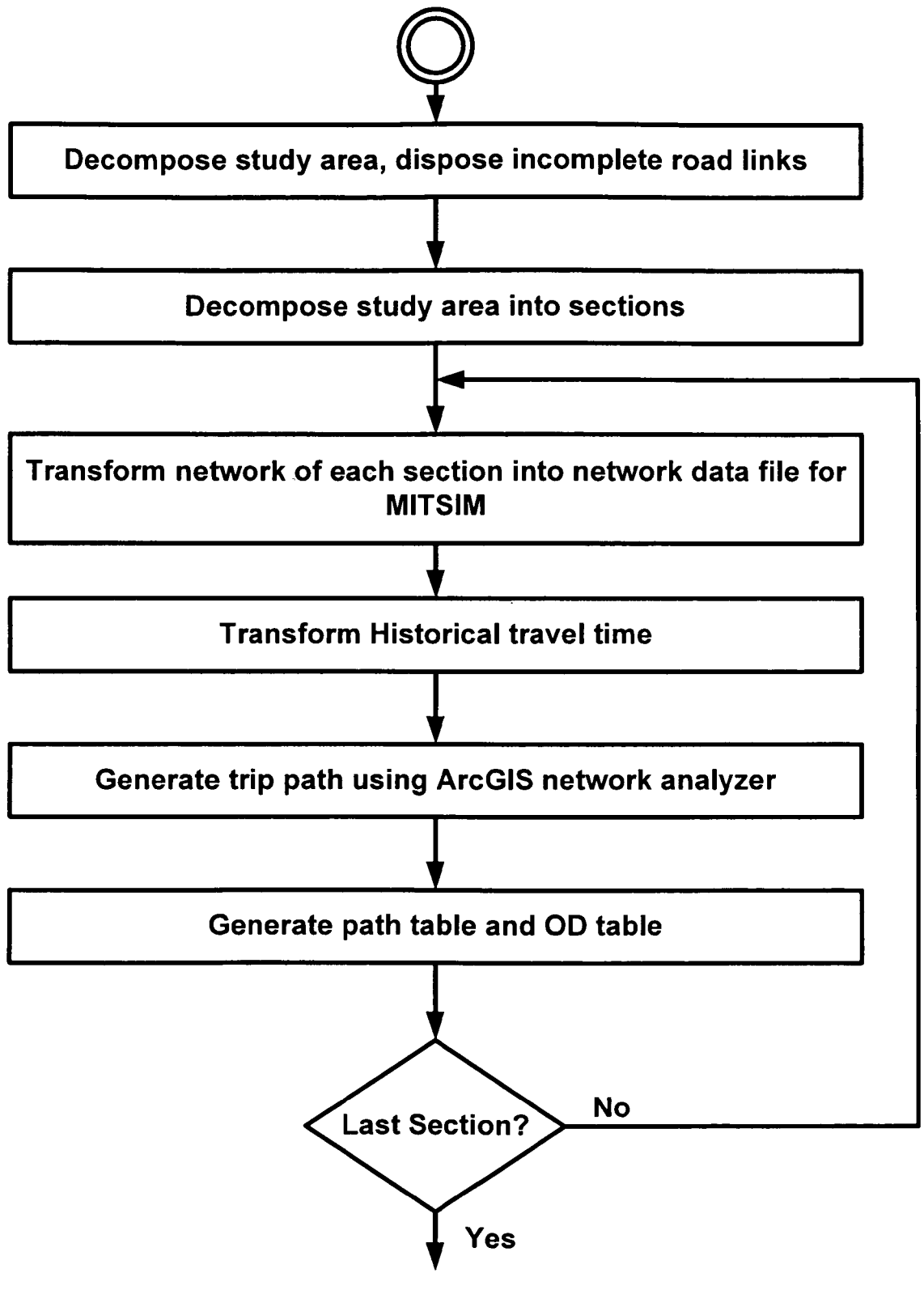
FIG. 30 is a flow diagram showing data preparation work flow for a traffic network simulator.

The Joint Center of Intelligent Spatial Computing (CISC) at George Mason University hosts a Grid-based computing pool with servers, used in the test, illustrated in FIG. 30. After the central manager receives the jobs from users, it passes them to different Grid nodes at the right side of the diagram.

For the test conducted in section 8, different grid platforms were used with 1 CPU, 2 CPU, 4 CPU, 6 CPU, 8 CPU, 12 CPU, 16 CPU, 22 CPUs. The configuration of each platform is illustrated in the table in FIG. 31.

Figure 32:
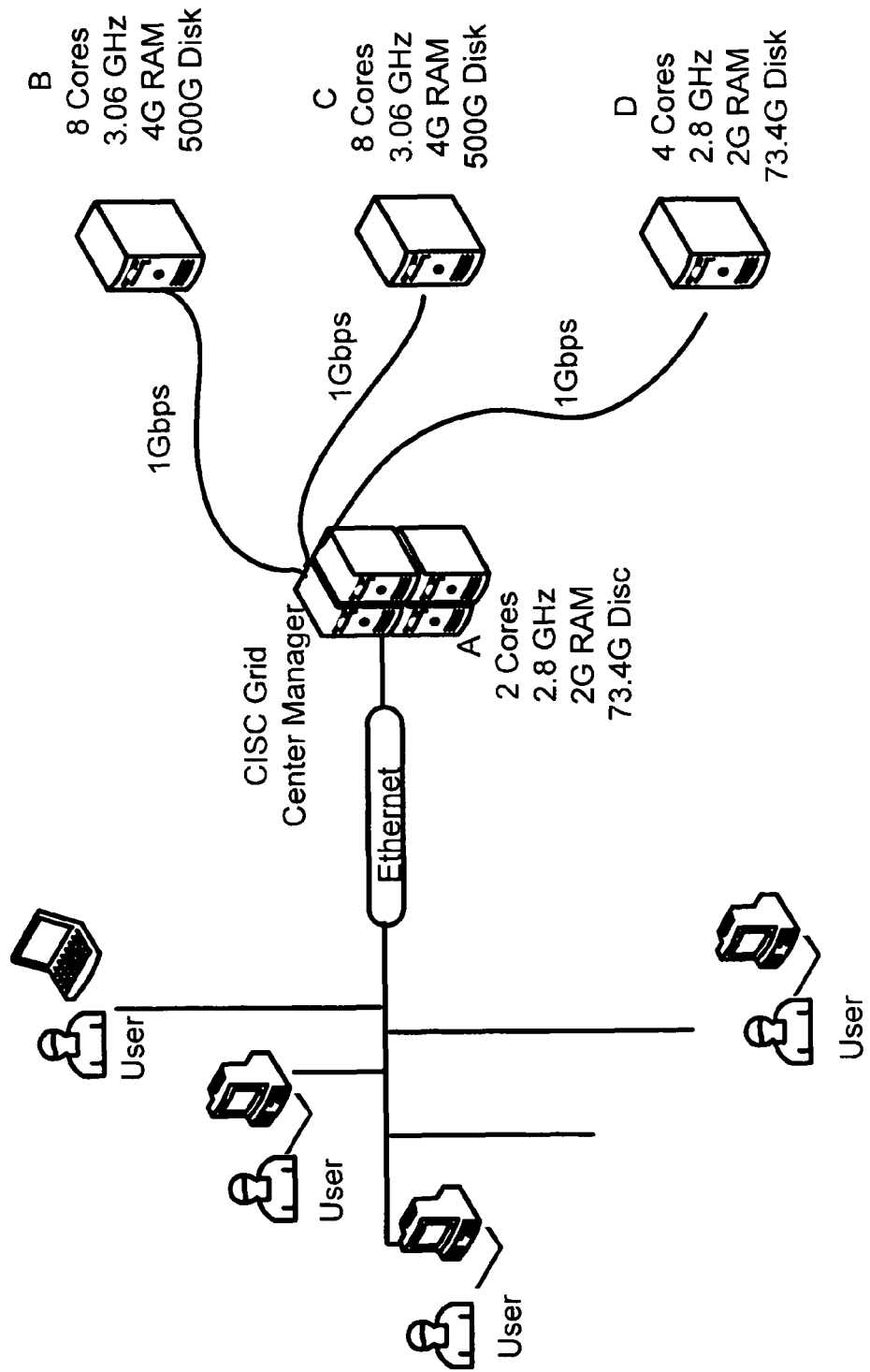
FIG. 32 is a block diagram of a CISC Grid computing pool with servers utilized for test.

FIG. 32 shows a CISC Grid computing pool with servers utilized for test.

As a fully open source simulator, MITSIM is selected and installed on each Grid node so that the core node only needs to distribute the input files, thus communication overhead is reduced. Similarly, the routing model remains the same on each node, and the routing task for each node will also be sent with an OD pair to the Grid nodes and sent back with the routing results only.

7.4 Client User Interaction

Figure 33:
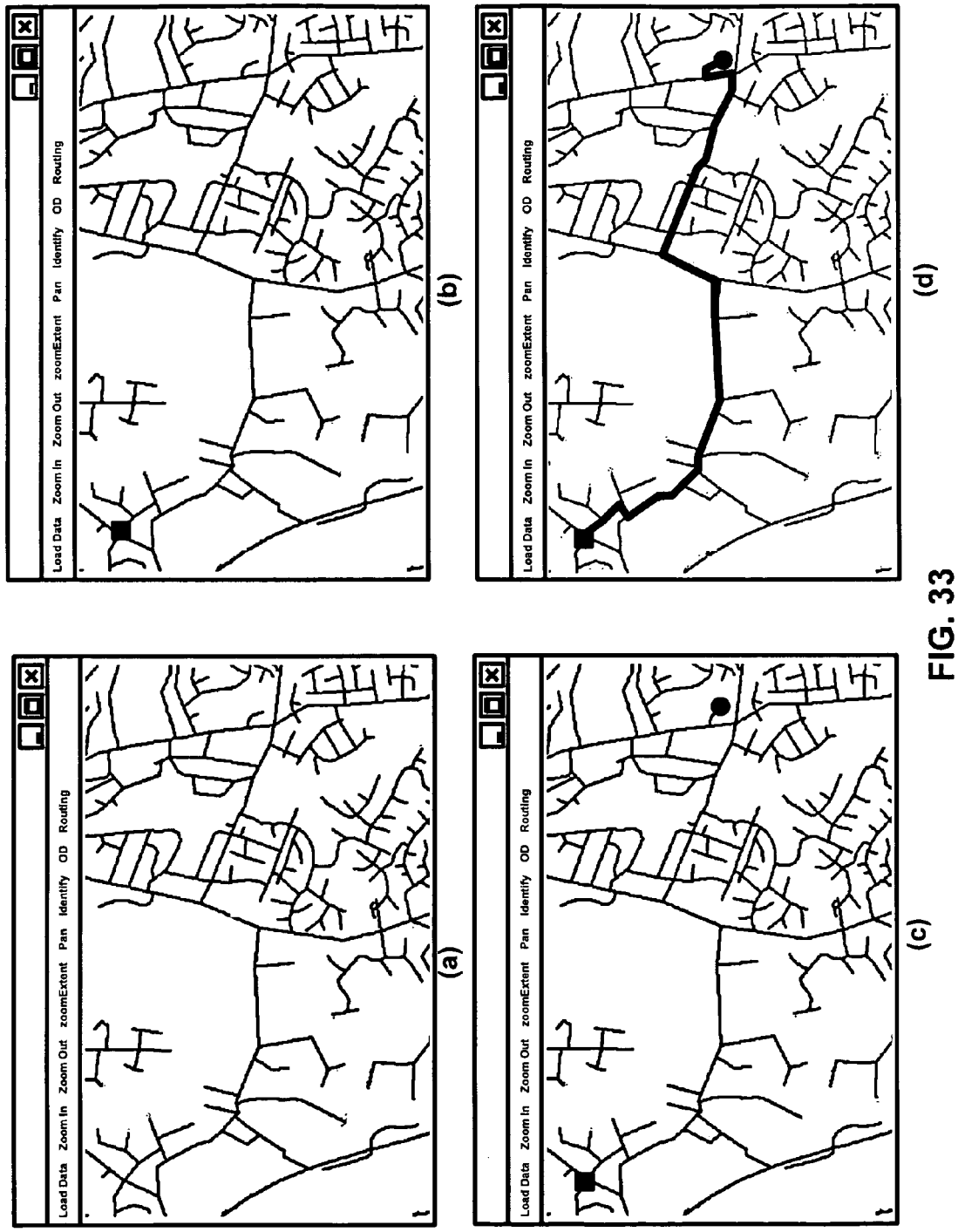
FIG. 33 is a diagram of a graphical user interface.

The interaction between the client application and the server side is illustrated in FIG. 33. The user is able to zoom in on the target area as seen in FIG. 33 (*a*), and click the desired origin point as seen in FIG. 33 (*b*), and the destination point as seen in FIG. 33 (*c*). After clicking the routing function in the menu, the client side fires a request and send it to server side, where time-dependent routing is executed based on the most recent link travel time matrix. After the routing result is generated, the server returns an itinerary to the client side and the result is displayed as seen in FIG. 33 (*d*). The itinerary includes links, junctions (nodes), and estimated travel times for the optimal route according to the departure time and road conditions.

Section 8

Discussion

The experiments on transportation routing for the southwest Washington D.C area are used to illustrate and discuss the results in the following four areas: 1) the space-time network and extended Dijkstra's algorithms; 2) the incorporation of weather information; 3) grid-enabled traffic simulation; and 4) grid-enabled massive concurrent requests for routing. The aspects of improvements, remaining problems, and potential future research are also described.

8.1 Extended Dijkstra's Algorithm Routing Against Space-Time Network

Figure 34:
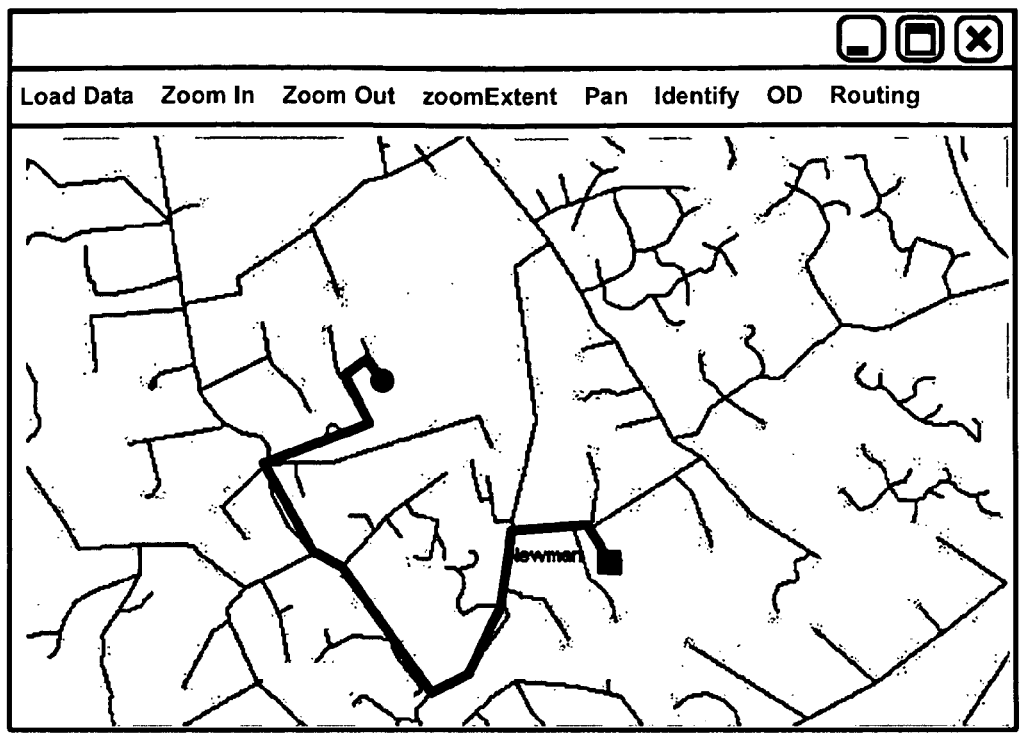
FIG. 34 is a diagram showing a routing with all roads under normal conditions.
Figure 35:
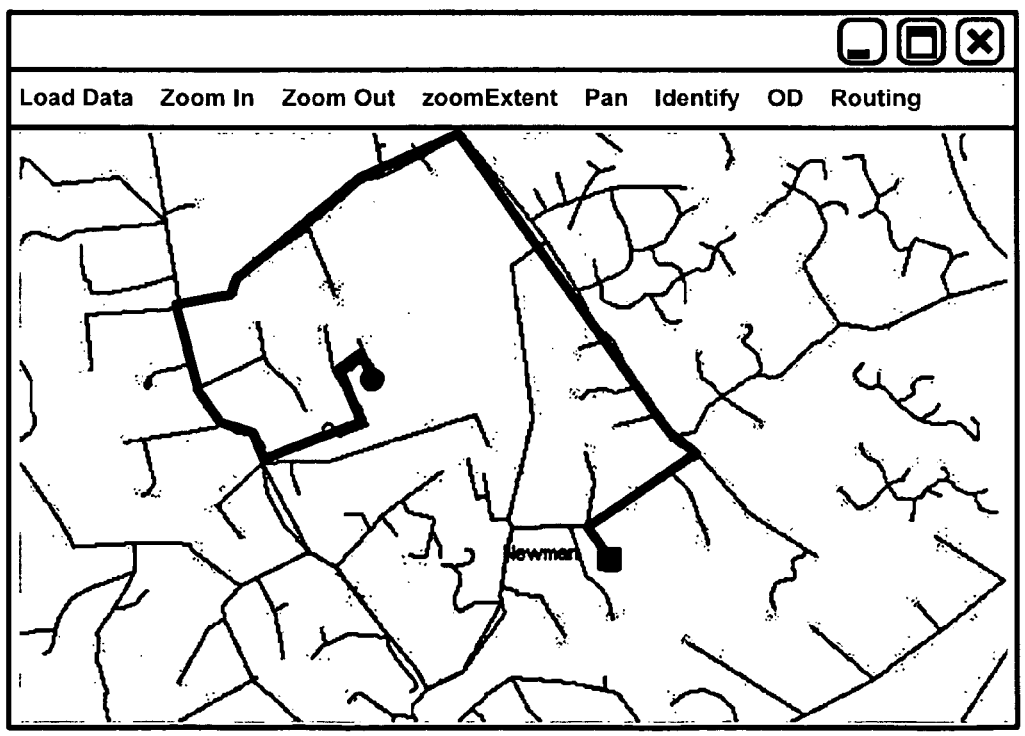
FIG. 35 is a diagram showing a routing with a congested road.

According to the simulation and space-time network described in Section 3, different simulated traffic conditions are used to test the space-time network and extended Dijkstra's algorithm. FIG. 34 shows the shortest travel-time path at time 07:00 am, when the road network is normal. However, when a severe car accident happened in the northern part of Newman road, Clifton, Va. at 07:30 am, congestions occurred on Newman and neighboring roads as a result. The congestion will make the travel time for the path in FIG. 34 much longer than normal. After the simulation accepts the incident input and generates a new link travel time, the routing model will provide the current fastest path based on the space-time network, as illustrated in FIG. 35.

This experiment result illustrates that near real-time routing can improve shortest travel-time routing by integrating near real-time travel information.

8.2 Routing with Weather Information Incorporated

Figure 36:
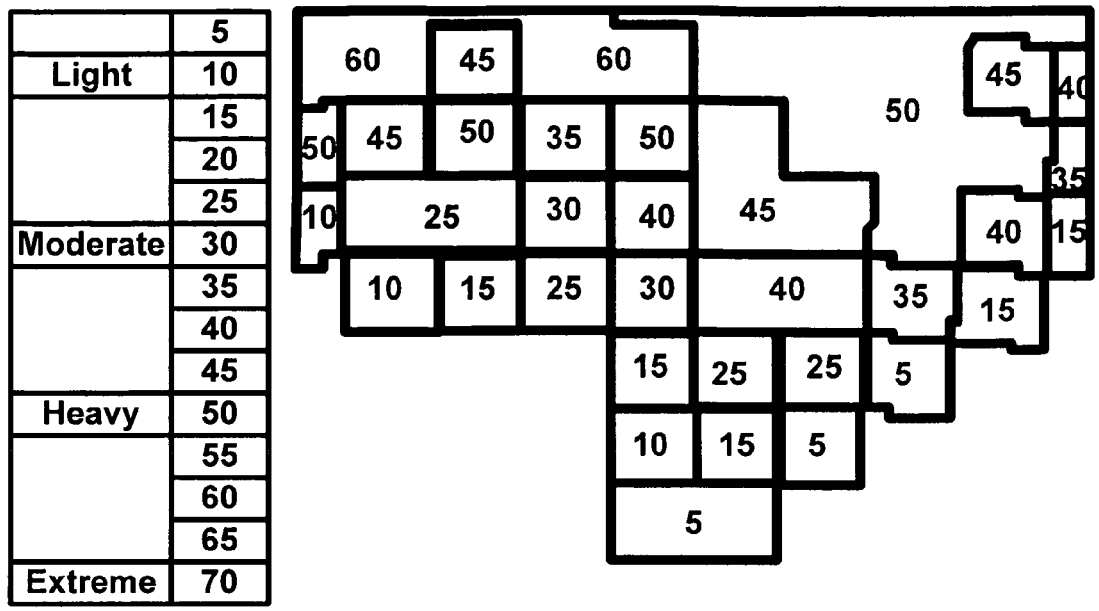
FIG. 36 is a diagram showing a base reflectivity map in precipitation mode.
Figure 37:
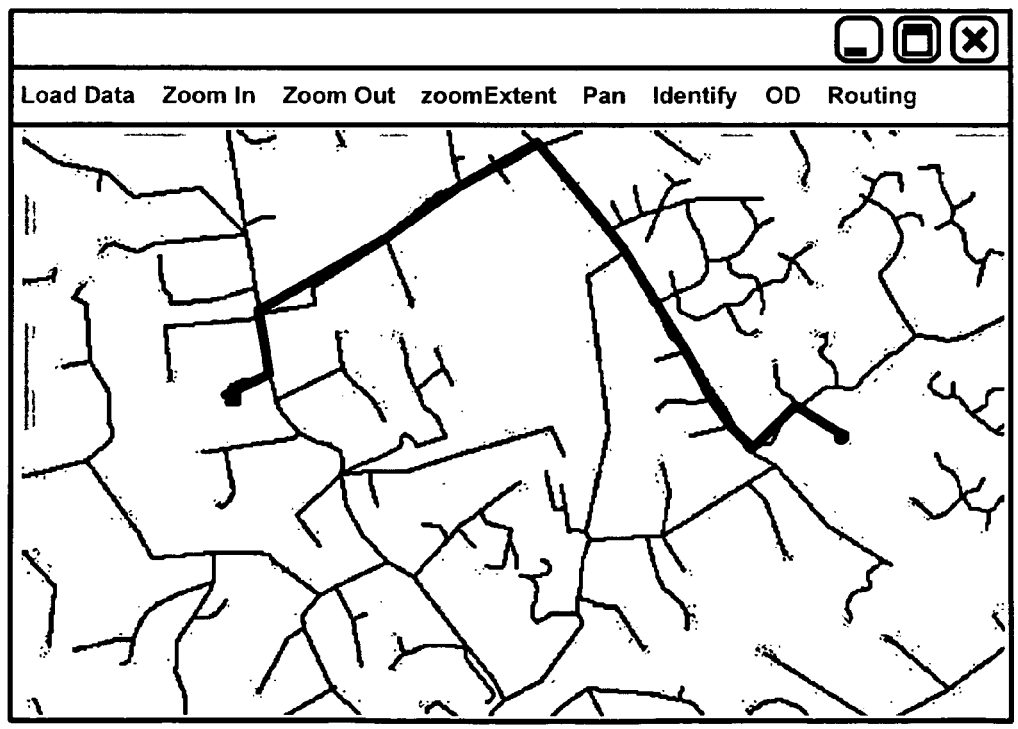
FIG. 37 is a diagram showing a routing result without considering weather impact.
Figure 38:
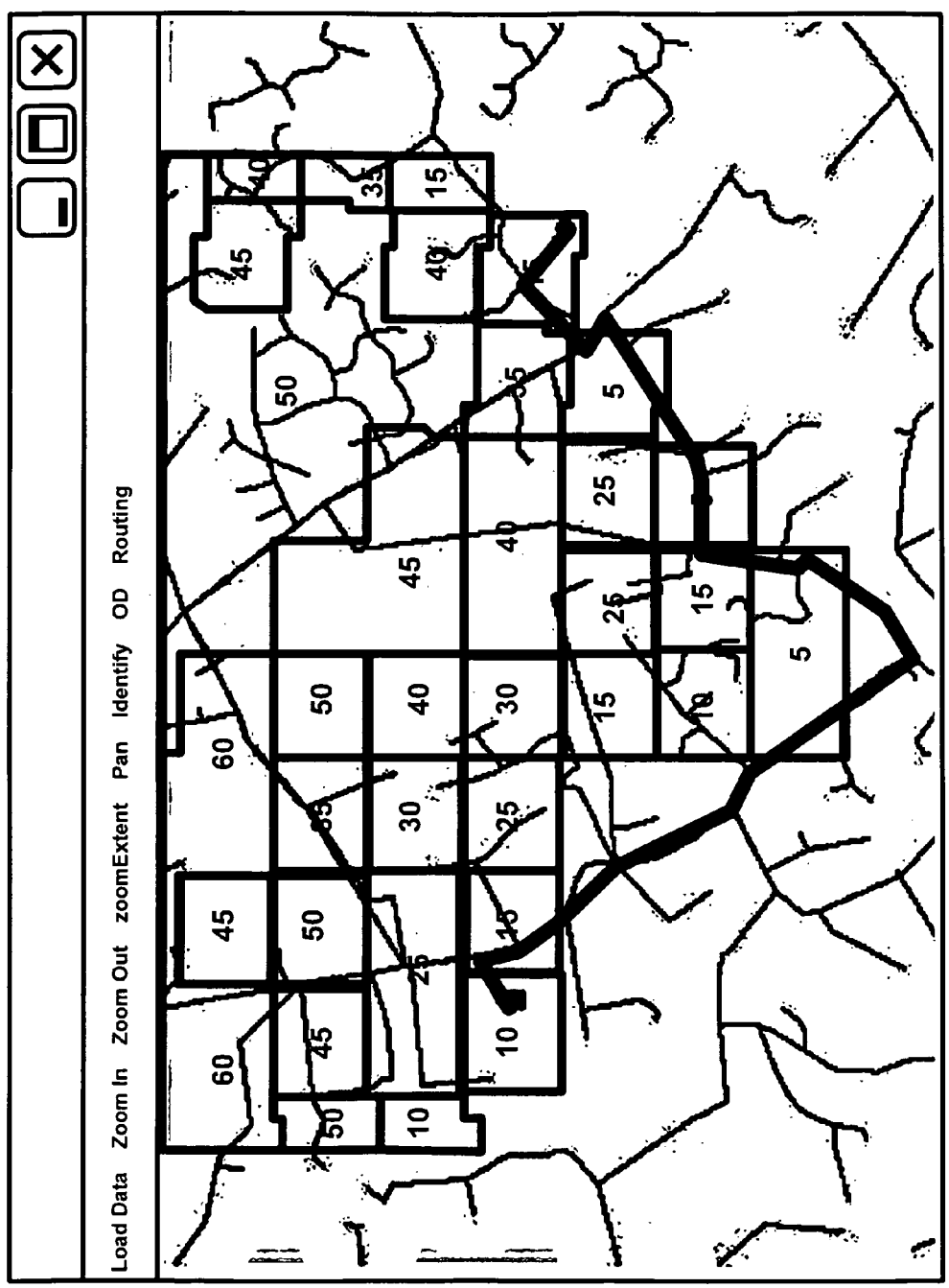
FIG. 38 is a diagram showing a routing result with weather impact considered.

According to the architecture described in Section 4, tests are conducted to illustrate how the system can capture road weather information and update fastest path results. FIG. 36 is the base reflectivity map of the study area where heavy rainfall occurs in the north. FIG. 37 illustrates the path generated from simulated link travel-times without considering weather. Using the weather adjustment service, FIG. 38 illustrates the updated routing results with NEXRAD data incorporated into the space-time network. The IDD system provides current weather information but no forecasting data, which is needed for the space-time network update, so a more accurate routing result can be produced by the system in near real-time if weather forecasting information is incorporated. Therefore, future research can be performed regarding the incorporation of forecasting information with current weather data to fully utilize the capability of the space-time network and the extended Dijkstra's algorithm.

8.3 Grid-Enabled Traffic Simulation

Figure 39:
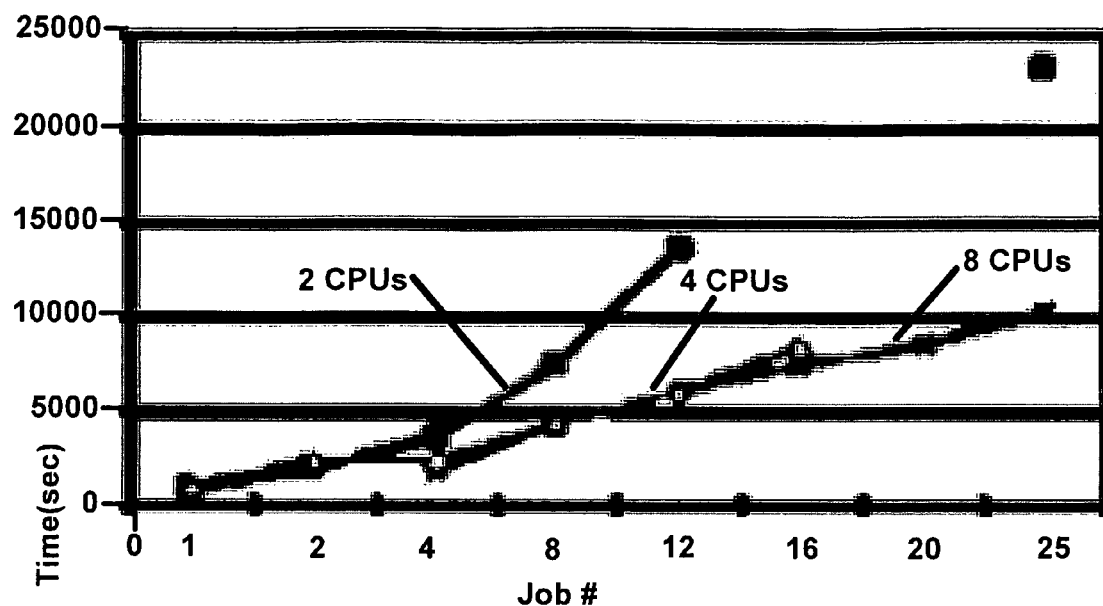
FIG. 39 is a graph showing Grid-enabled simulation time for different number of jobs.
Figure 40:
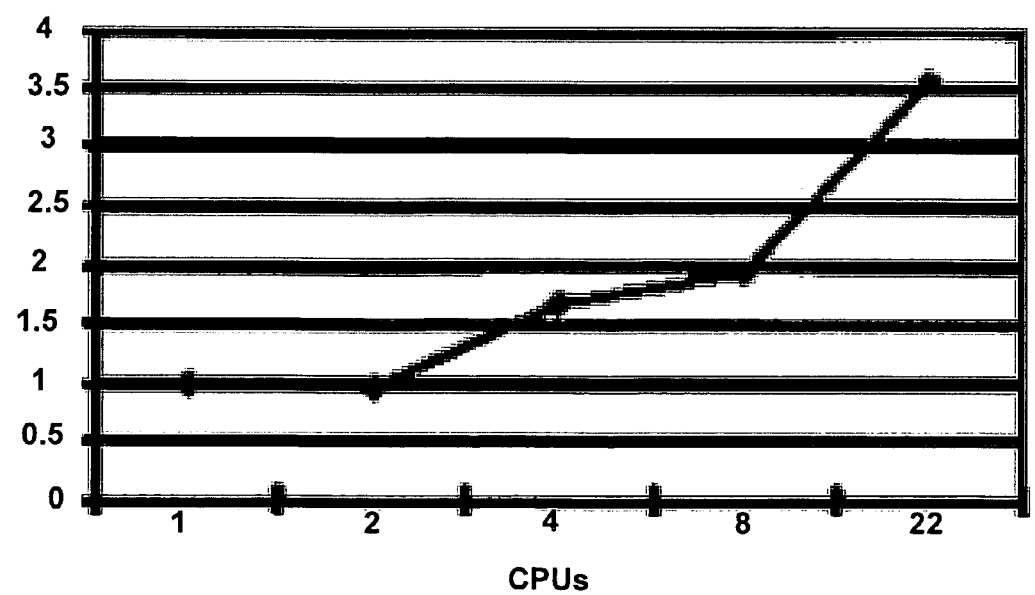
FIG. 40 is a speedup diagram of a Grid-enabled traffic simulation.

Experiments were performed on the grid platform to test the performance of the grid-enabled traffic simulation as discussed in Section 5. FIG. 39 illustrates the test against the grid platform with two, four, and eight CPUs. Job number is increased from one, two, four, eight, twelve, sixteen, twenty to twenty five. The lines show the finish times of different job numbers on different grid configurations of a different number of CPUs. It can be seen that the addition of more CPUs to the grid platform can help to reduce the finish time of the simulation, or that more jobs can be finished within a certain amount of time. For example, within 1000 seconds, the 2-CPU platform can finish 8 jobs, the 4-CPU platform can finish 16 jobs, and the 8-CPU platform can finish approximately 22 jobs. FIG. 39 illustrates that the grid platform can improve the performance of the simulation. FIG. 40 illustrates the acceleration of different grid platforms, and it illustrates that although we see improvement with the grid platform, the utilization of different CPUs is not very efficient.

Figure 41:
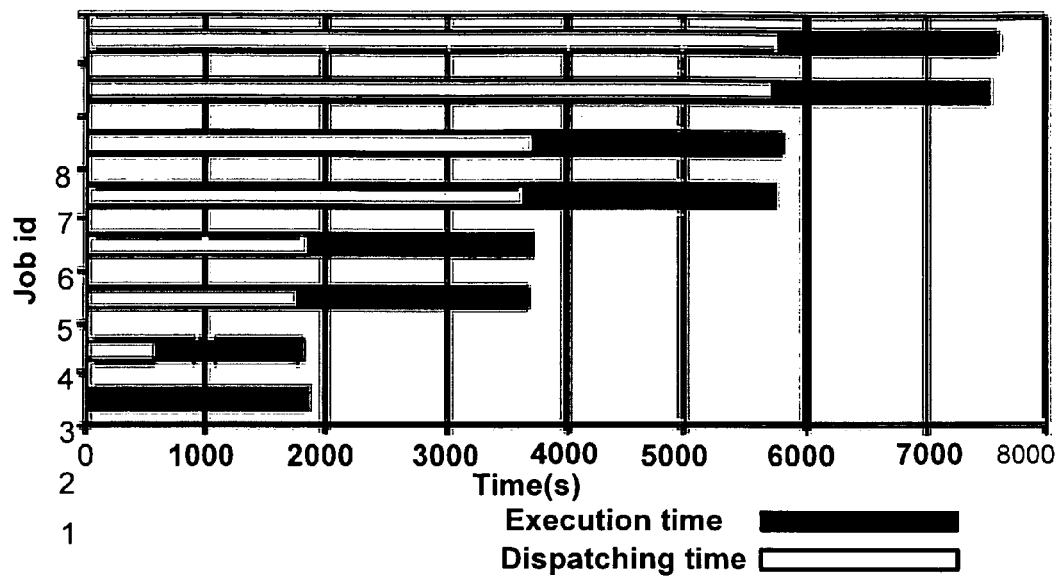
FIG. 41 is a graph showing dispatching and execution time for 8 jobs on a Grid with 4 CPUs.

To understand why the speedup is so low, one of the tests is analyzed to determine the problem. FIG. 41 illustrates the results of 8 jobs submitted to a grid of 4 CPUs. It illustrates that 1) the grid platform is idle for no reason for some of the time, that 2) the dispatch of jobs to different CPUs takes significant time, for example job 2 takes approximately 600 seconds for dispatching, and that 3) the CPUs are not fully utilized for performing the simulation all of the time, for example, there are only 2 CPUs utilized all the time. Therefore, the grid platform may need to be improved to deal with the three tasks.

8.4 Grid-Enabled Routing for Massive Concurrent Users

Figure 42:
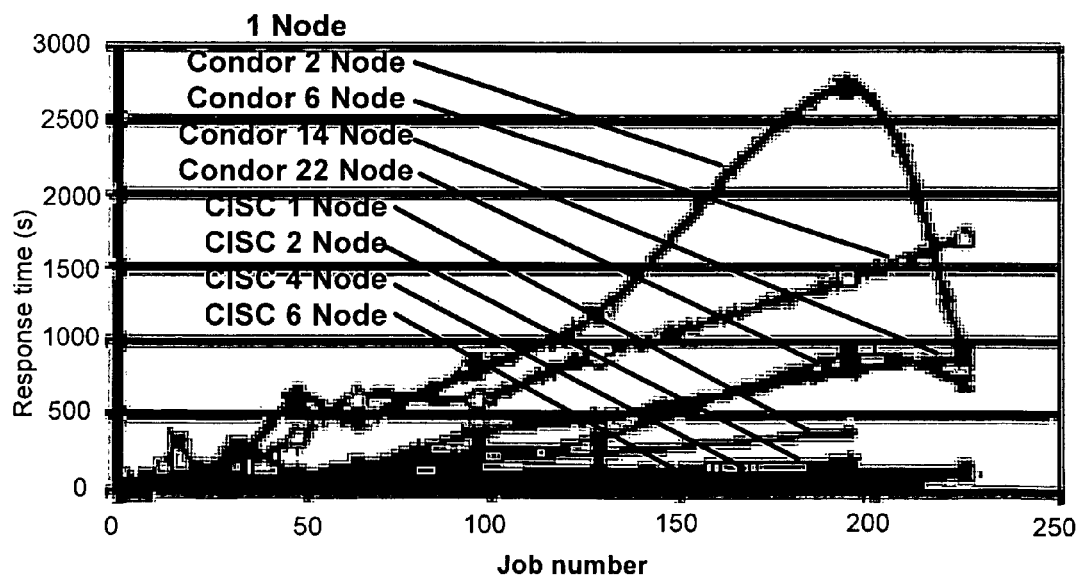
FIG. 42 is a graph showing routing execution times with different numbers of jobs on different platforms.
Figure 43:
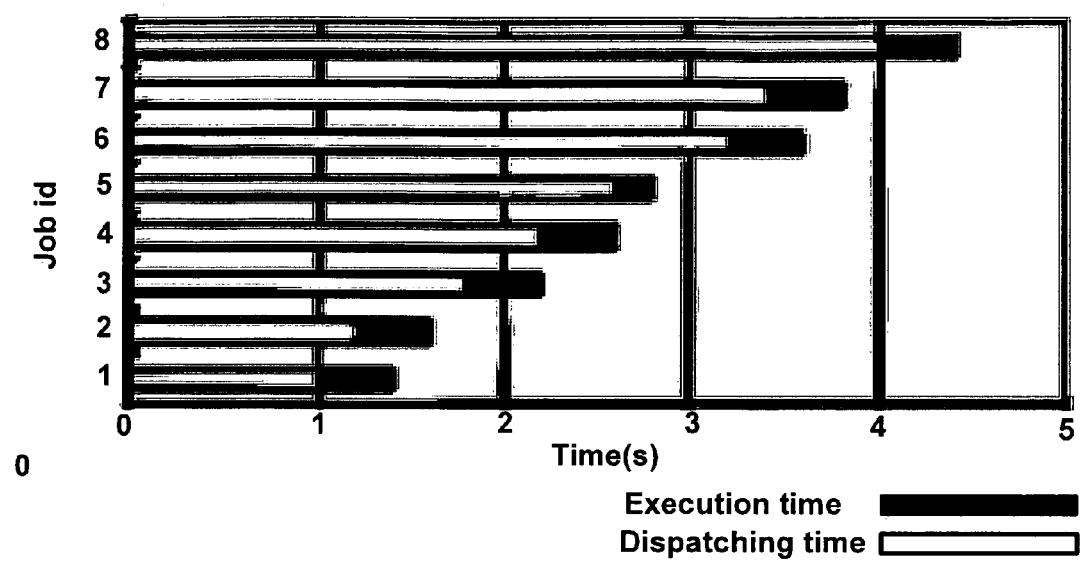
FIG. 43 is a graph showing operation details of 8 concurrent routing requests on a 2-CPU Condor-Grid platform.
Figure 44:
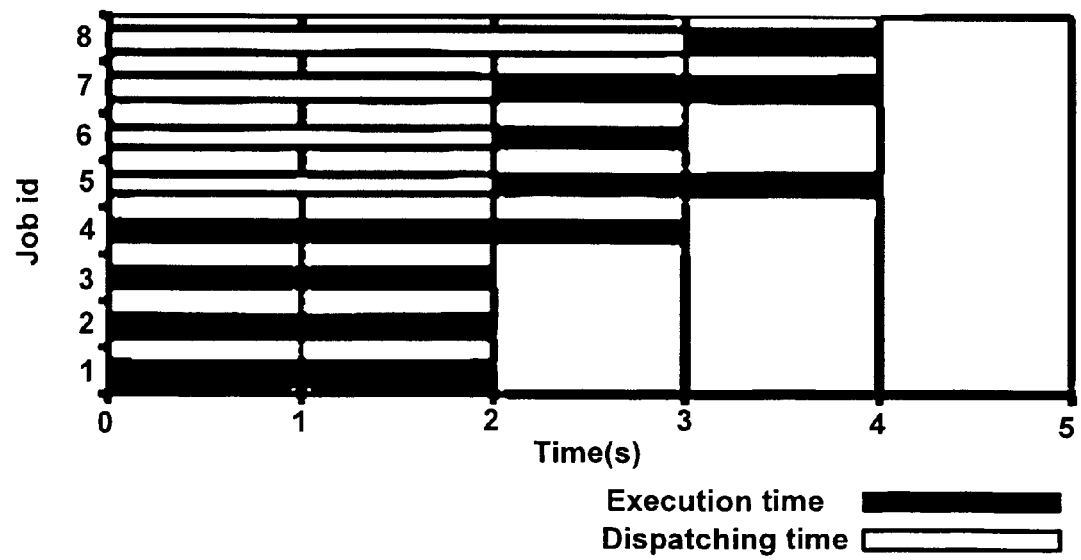
FIG. 44 is a graph showing operation details of 8 concurrent routing requests on a 4-CPU CISC Grid platform.

To test the performance of the grid-enabled routing process for massive concurrent users as discussed in Section 5, experiments were conducted as illustrated in FIG. 42 and FIG. 43. FIG. 43 illustrates the performance of a different number of jobs against different Grid middleware (CISC and Condor) and different number of CPUs (nodes). Two types of the middleware supporting the grid platform are also illustrated. It was found that the Condor grid with 2, 6, 14, and 22 CPUs can not help with the routing performance, the CISC grid (supported by CISC middleware) with one or two CPUs can not help with the performance, but 4 and 6 CPUs can help.

To find out why the Condor grid can not improve the performance, an analysis is shown in FIG. 43 to illustrate the operation of jobs on the platform. It is found that at some times the system is idle, for example, at times around 8-9 seconds and 14-16 seconds. It is also shown that the CPUs are not fully utilized, i.e. only one job is running most of the time. Dispatching jobs to separate CPUs also takes a long time, e.g., the first job starts at the 5th second.

Experiments are executed using the CISC scheduler for 8 concurrent routing requests on a 4-CPU Grid platform. It can be seen that computer resources are much better utilized and job dispatching time has been reduced extensively.

Section 9

Conclusions

In GIS-T, network routing includes static and dynamic traffic information/data input, traffic estimation/prediction, best-path finding, and results dissemination. Inspired by Grid-based cyberinfrastructure, space-time network, and geospatial interoperability, a framework is proposed and tested to address the problems in near real-time routing. The research introduced problems within near real-time routing and applied geospatial Grid computing for transportation network simulation and routing. Interoperable approaches are adopted in this study to enable integration of data input, simulation, routing, and results dissemination through geospatial web services.

To address the time sensitive near real-time routing problem, a space-time network is adopted for describing a spatiotemporal transportation network. The space-time network extended the static network travel time by adding a time dimension to record different travel times at different time intervals. Based on the space-time network, the Dijkstra's algorithm is extended to calculate the shortest travel time path against the space-time network. The data structure and algorithm enables the near real-time routing and can also be used in other relevant space-time network applications.

It is important to integrate various factors into the overall travel time estimation and predication. As an example, near real-time weather information, observed by NEXRAD and then distributed by the UCAR IDD system, is used to demonstrate the near real-time integration of the factors using weather-traffic impact findings.

For both traffic simulation and transportation routing, a Grid platform is utilized to reduce the time needed for simulating a large area and reduce response time for massive concurrent user requests.

The integration of the framework is also addressed through interoperable geospatial web services. The utilization of the interoperable geospatial web services enables the flexible integration of dynamic traffic data, simulation results, and routing services, and also provides open access to the framework/system to clients.

Such a framework has the potential to be integrated with current in-car-GPS, such as the Garmin system, to provide near real-time driving information. Although the research is conducted on road transportation, the principles can also be applied to other transportation routings, such as public transit and multi-model routing.

Additional Embodiments

Figure 45:
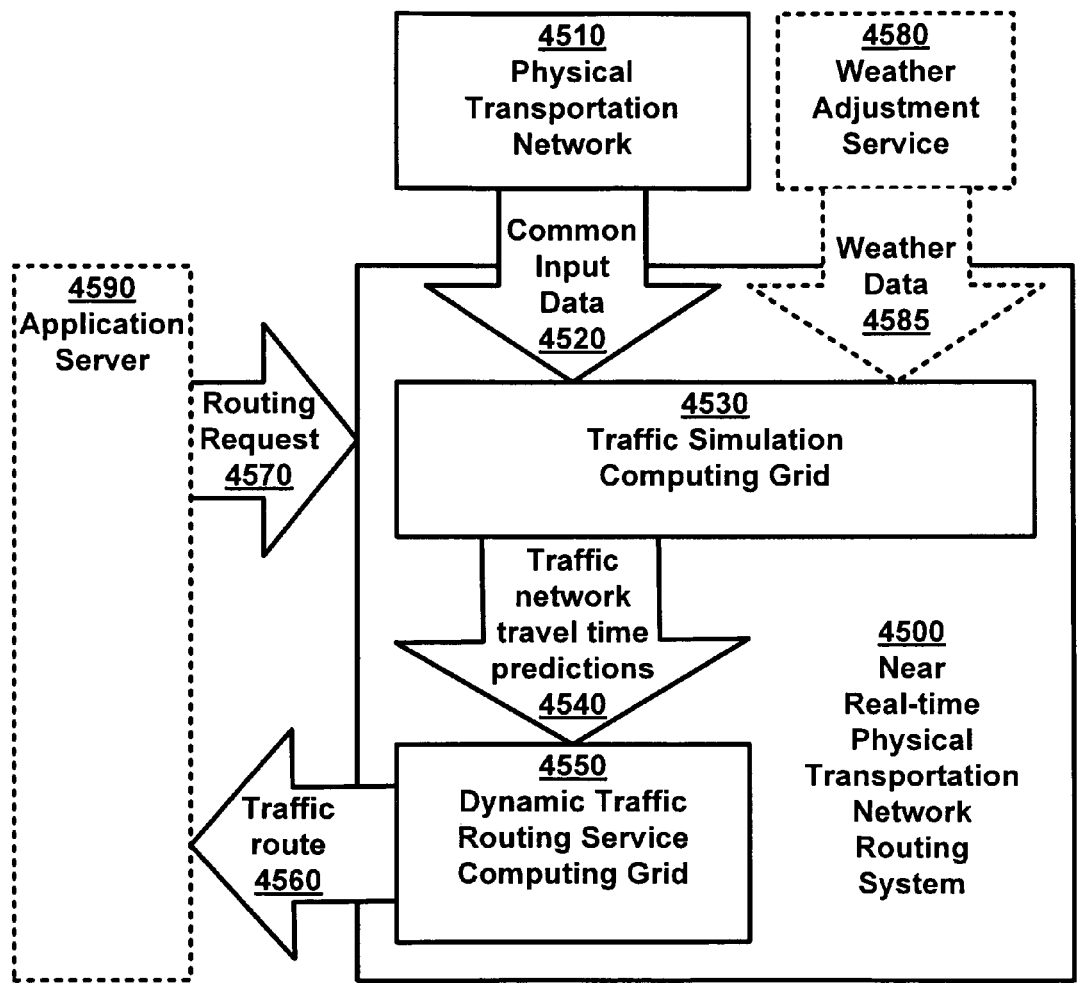
FIG. 45 is a block diagram showing example embodiments of a near real-time physical transportation network routing system.

FIG. 45 shows an example embodiment of a near real-time physical transportation network routing system 4500. As shown, the near real-time physical transportation network routing system 4500 includes a traffic simulation computing grid 4530 and a dynamic traffic routing service computing grid 4550. The traffic simulation computing grid 4530 may be configured to produce traffic network travel time predictions 4540 for a physical transportation network 4510 using a traffic simulation model 4739 and common input data 4520.

The physical network 4510 may be a transportation network such a road or rail system. The physical transportation network 4510 may be divided into a multitude of sections where each of the multitude of sections includes a primary zone and a buffer zone. The primary zone preferably covers at least one of the multitude of road links and the buffer zone preferably covers at least one of the multitude of road links that are adjacent to the primary zone.

Dashed boxes in FIG. 45 through FIG. 49 indicate optional modules that be used in creating differing embodiments. These are shown to illustrate the possibilities in creating new embodiments that may vary from the disclosure, but be equivalent. For example, a weather adjustment service 4580 configured to use weather data 4585 from a weather effect service to update the traffic simulation model 4739 may be added to increase the dynamic accuracy of the traffic travel time predictions 4540.

Additionally, it is envisioned that other components such as an application server 4590 configured to pass one traffic route(s) 4560 to a client may be added. The application server 4590 may passes the traffic route(s) 4560 to the client through a web server. The web server may include a request parser to extract routing requests and a response generator for passing the traffic route(s) 4560 to the client. Of course it is expected that other methods of requesting and receiving routes may be utilized. For example, an road navigation device may be configured to automatically request new routes during a trip to keep a traveled route current.

Figure 46:
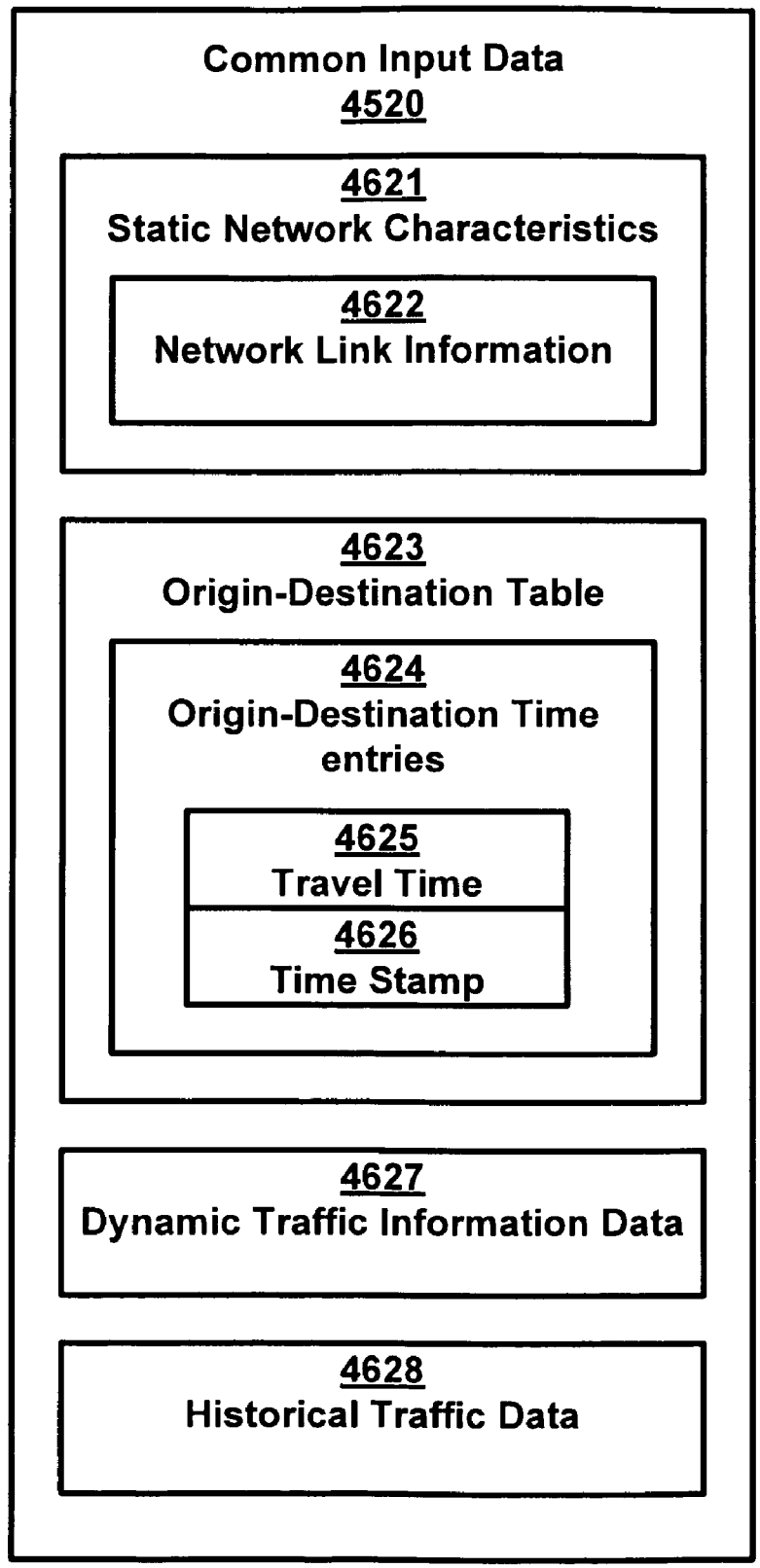
FIG. 46 is a block diagram showing examples of common input data.

FIG. 46 shows examples of common input data 4520. The common input data 4520 may include but not be limited to Static network characteristics 4621, origin-destination table(s) 4623, dynamic traffic information 4627 and historical traffic data 4628. Static network characteristics 4621 may include network link information 4622 related to a multitude of road links. The multitude of road links should cover at least part of the physical transportation network 4510. The origin-destination data table(s) 4624 may include a multitude of origin-destination travel time entries 4624. Each of the multitude of origin-destination travel time entries 4624 may have a travel time 4625 for one of the multitude of road links and a timestamp 4626 associated with the travel time. By associated, we mean the time stamp identifies a temporal period for which the travel time 4625 represents. Dynamic traffic information data 4627 may include data that could cause traffic delays for at least one of the multitude of road links. Examples of such delay could include real-time traffic congestions, accidents, roads maintenance information and other traffic related real-time data. Historical traffic data 4628 may include data related to past traffic conditions for at least one of the multitude of road links. For example, the historical traffic data 4628 may include data from the past day, week, year, etc.

Figure 47:
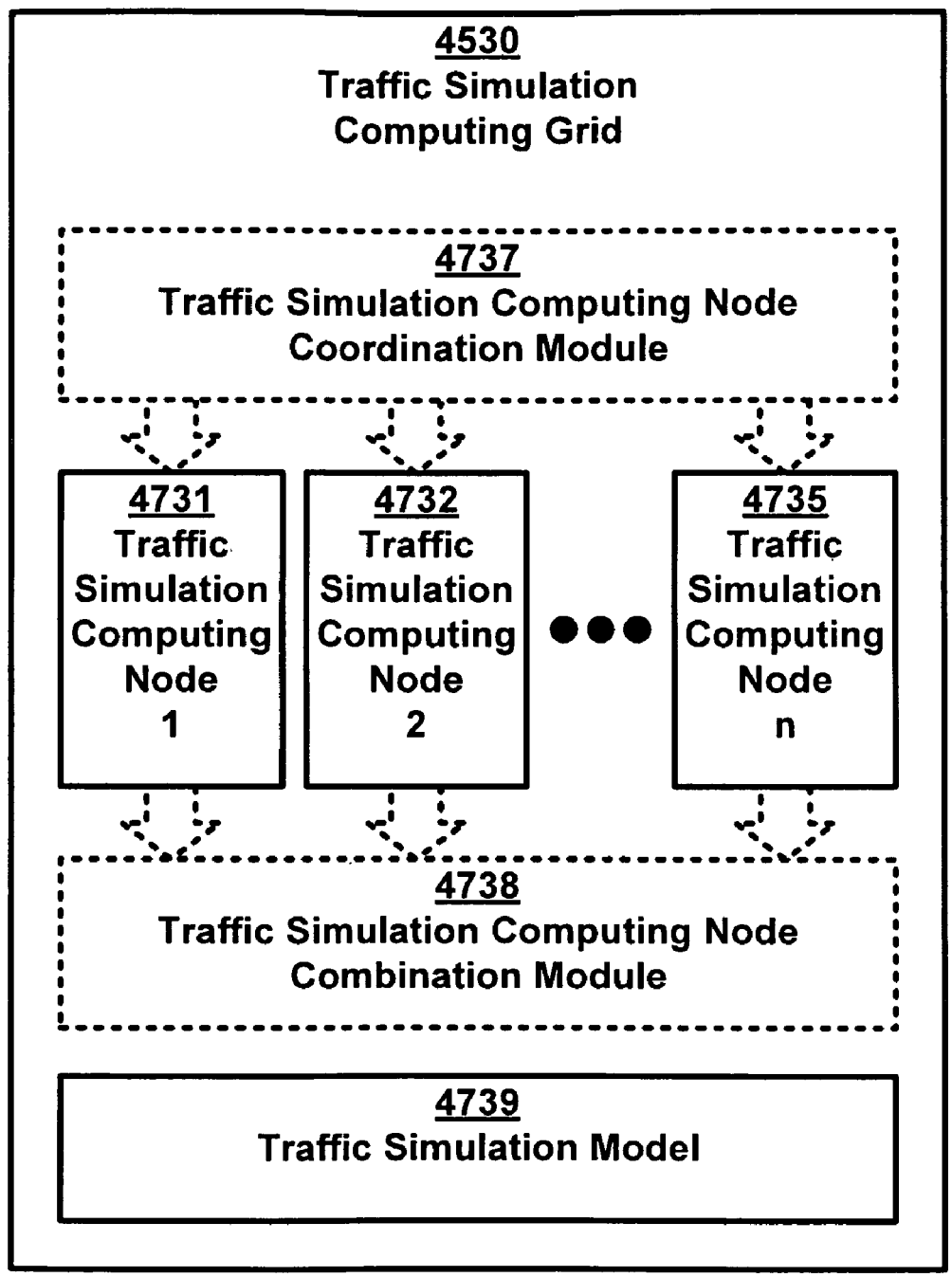
FIG. 47 is a block diagram showing some possible embodiments of a traffic simulation computing grid.

FIG. 47 is a block diagram showing some possible embodiments of the traffic simulation computing grid 4530. The traffic simulation computing grid 4530 may include a multitude of traffic simulation computing nodes (4731, 4732 through 4735). One or more of the traffic simulation computing nodes (4731, 4732 through 4735) may be configured to predict travel times 4540 for road link(s) in the primary zone of a section of interest using: the common input data associated with the primary zone of the section of interest; and the common input data associated with the buffer zone of the section of interest. The predicted travel times 4540 for at least two of the multitude of sections may be predicted using different traffic simulation computing nodes within the multitude of traffic simulation computing nodes (4731, 4732 through 4735).

One may wish to use a traffic simulation computer node coordination module 4737 configured to coordinate the assignment of at least one of the multitude of traffic simulation computing nodes (4731, 4732 through 4735) to at least one of the multitude of sections. Similarly, a traffic simulation computer node combination module 4738 may be configured to combine the results from at least two of the multitude of traffic simulation computing nodes.

Figure 48:
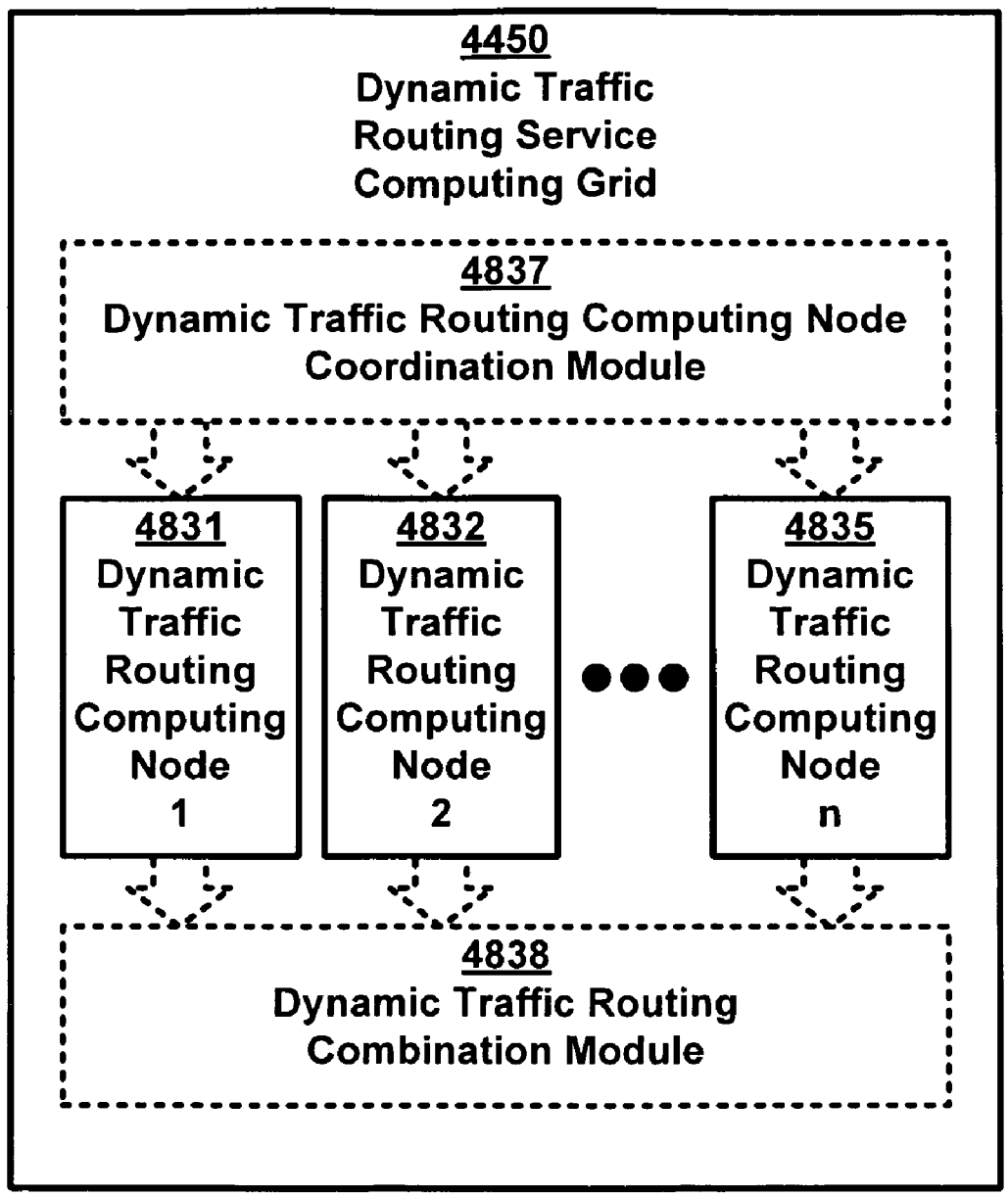
FIG. 48 is a block diagram showing possible embodiments of a dynamic traffic routing service computing grid.

FIG. 48 is a block diagram showing possible embodiments of the dynamic traffic routing service computing grid 4450. The dynamic traffic routing service computing grid 4450 may be configured to generate at least one traffic route 4560 using the traffic network travel time predictions 4540. Each of the at least one traffic route should include an origin and a destination at a particular time. The main component of the dynamic traffic routing service computing grid 4450 is a multitude of dynamic traffic routing computing nodes (4831, 4832 through 4835). These computing nodes may be linked loosely or tightly. By loosely, they could be connected over a longer range link such as the Internet. Tightly linked nodes could coexist in a close configuration passing information over shared storage devices or communicatively using a communications protocol over parallel, serial or other similar connection (i.e. Ethernet, blue tooth, etc.). Optionally, it may be desirable to utilize a dynamic traffic routing computing node coordination module 4837 configured to coordinate at least one of the at least one routing request with at least one of the at least one of the multitude of dynamic traffic routing computing nodes.

The dynamic traffic routing service computing grid utilizes at least one of the multitude of dynamic traffic routing computing nodes to respond to routing requests. The quantity of the at least one of the multitude of dynamic traffic routing computing nodes utilized increases with an increase in the quantity of the at least one routing request. The dynamic traffic routing service computing grid may also use an extended Dijkstra's algorithm when generating traffic route(s). As described earlier and shown in FIG. 5, the extended Dijkstra's algorithm extends the functionality of the Dijkstra's algorithm.

Figure 49:
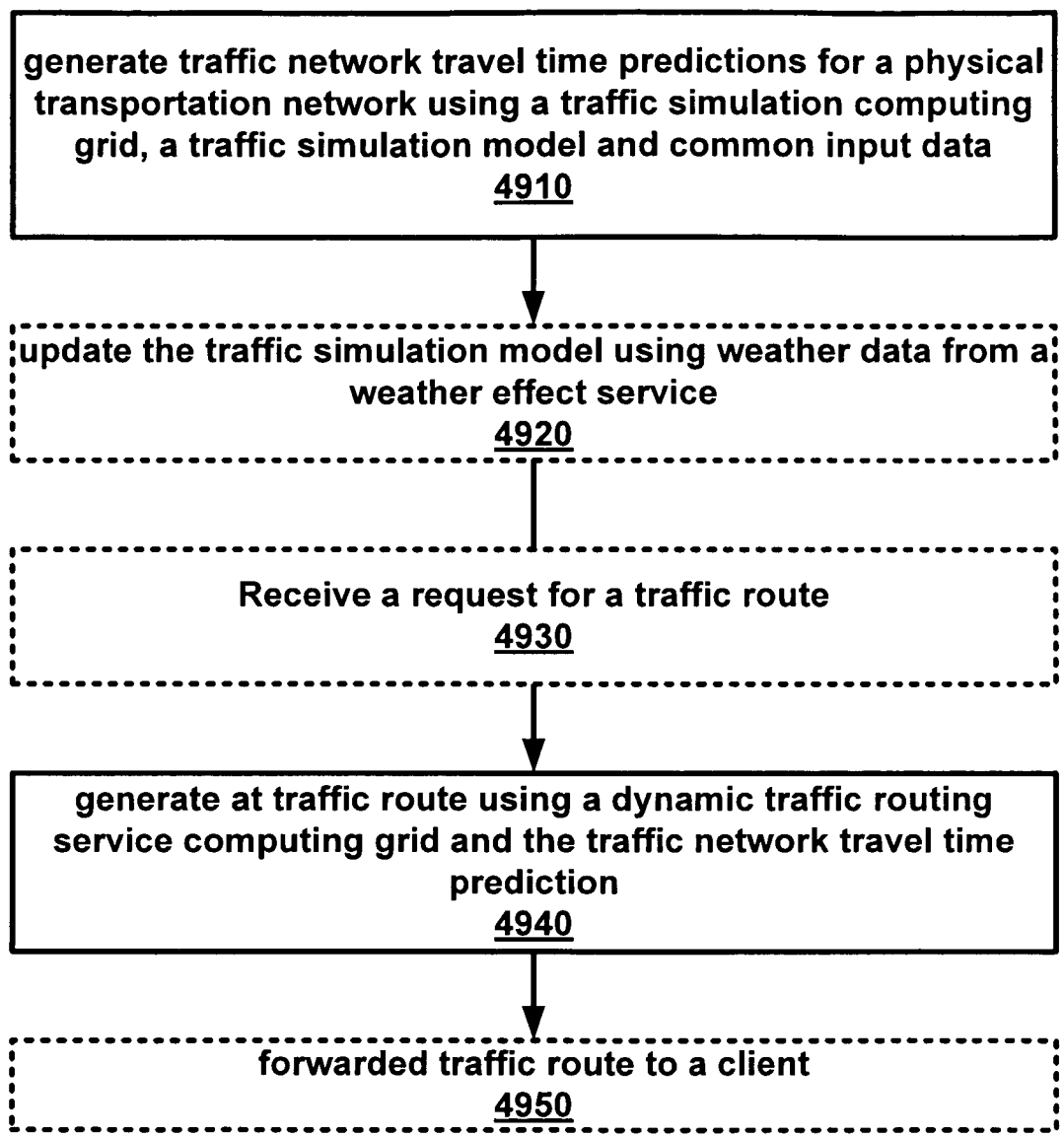
FIG. 49 is a flow diagram showing embodiments a method for performing near real-time physical transportation network routing.

Some embodiments of the present invention may be substantiated as a tangible computer readable media that contains computer readable instructions that when executed by one or more processors causes the one or more processors to perform a method for determining a near real-time physical transportation network route. FIG. 49 is a flow diagram showing embodiments of such methods. As shown, traffic network travel time predictions may be generated for a physical transportation network using a traffic simulation computing grid, a traffic simulation model and common input data at 4910. The traffic simulation computing grid may include traffic simulation computing nodes. The common input data may include static network characteristics, origin-destination data table(s), dynamic traffic information data, and historical traffic data. The static network characteristics may include network link information related to road link(s) that cover at least part of the transportation network. The origin-destination data table may include a multitude of origin-destination travel time entries. Each of the origin-destination travel time entries may have a travel time(s) for road link(s) and a timestamp associated with the travel time. The dynamic traffic information data may include data that could cause traffic delays for at least some of the road link(s). The historical traffic data may include data related to past traffic conditions for the road link(s).

The traffic simulation model may be updated using weather data from a weather effect service at 4920. A 4930, requests for specific travel routes may be received. At 4940, traffic route(s) may be generated using a dynamic traffic routing service computing grid and the traffic network travel time prediction(s). Each of the traffic route(s) may include an origin and a destination at a particular time.

The physical transportation network may be a network of roads and may divided into a multitude of sections. Each of the multitude of sections may include: a primary zone that covers at least one of the multitude of road links; and a buffer zone that covers at least one of the multitude of road links that are adjacent to the primary zone.

The dynamic traffic routing service computing grid may include a multitude of dynamic traffic routing computing nodes. One or more of the traffic simulation computing nodes maybe configured to predict travel times for at least one of the multitude of road links in the primary zone of a section of interest. The configuration may be static or dynamic. In other words, the nodes may be dynamically reconfigured as needed or setup in a static configuration. Similarly, the predicted travel times for at least two of the multitude of sections may be predicted using different traffic simulation computing nodes within the multitude of traffic simulation computing nodes.

At 4950, the traffic route may be forwarded to the client. The client may be any number of devices such as a computer, a mapping device, a cellular phone, a PDS, etc.

In this specification, "a" and "an" and similar phrases are to be interpreted as "at least one" and "one or more."

Many of the elements described in the disclosed embodiments may be implemented as modules. A module is defined here as an isolatable element that performs a defined function and has a defined interface to other elements. The modules described in this disclosure may be implemented in hardware, software, firmware, wetware (i.e hardware with a biological element) or a combination thereof, all of which are behaviorally equivalent. For example, modules may be implemented as a software routine written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that con FIG. connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments.

In addition, it should be understood that any FIGS. which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A near real-time physical transportation network routing system comprising:
   (a) a traffic simulation computing grid configured to produce traffic network travel time predictions for a physical transportation network using a traffic simulation model and common input data, the traffic simulation computing grid including a multitude of traffic simulation computing nodes, the common input data including:
      (1) static network characteristics, the static network characteristics including network link information related to a multitude of road links, the multitude of road links covering at least part of the physical transportation network;
      (2) an origin-destination data table, the origin-destination data table including a multitude of origin-destination travel time entries, each of the multitude of origin-destination travel time entries having:
         (i) a travel time for one of the multitude of road links; and
         (ii) a timestamp associated with the travel time;
      (3) dynamic traffic information data, the dynamic traffic information data including data that could cause traffic delays for at least one of the multitude of road links; and
      (4) historical traffic data, the historical traffic data including data related to past traffic conditions for at least one of the multitude of road links; and
   (b) a dynamic traffic routing service computing grid, the dynamic traffic routing service computing grid configured to generate at least one traffic route using the traffic network travel time predictions, each of the at least one traffic route including an origin and a destination at a particular time, the dynamic traffic routing service computing grid including a multitude of dynamic traffic routing computing nodes.

2. The near real-time physical network routing system according to claim 1, wherein the physical transportation network is divided into a multitude of sections, each of the multitude of sections including:
   (a) a primary zone, the primary zone covering at least one of the multitude of road links; and
   (b) a buffer zone, the buffer zone covering at least one of the multitude of road links that are adjacent to the primary zone.

3. The near real-time physical network routing system according to claim 2, wherein one of the multitude of traffic simulation computing nodes is configured to predict travel times for at least one of the multitude of road links in the primary zone of a section of interest, the section of interest being at least one of the multitude of sections, using:
   (a) the common input data associated with the primary zone of the section of interest; and
   (b) the common input data associated with the buffer zone of the section of interest.

4. The near real-time physical network routing system according to claim 2, wherein predicted travel times for at least two of the multitude of sections are predicted using different traffic simulation computing nodes within the multitude of traffic simulation computing nodes.

5. The near real-time physical network routing system according to claim 2, further including a traffic simulation computer node coordination module configured to coordinate the assignment of at least one of the multitude of traffic simulation computing nodes to at least one of the multitude of sections.

6. The near real-time physical network routing system according to claim 2, further including a traffic simulation computer node combination module configured to combine the results from at least two of the multitude of traffic simulation computing nodes.

7. The near real-time physical network routing system according to claim 1, wherein the dynamic traffic routing service computing grid uses an extended Dijkstra's algorithm when generating the at least one traffic route, the extended Dijkstra's algorithm extending the Dijkstra's algorithm.

8. The near real-time physical network routing system according to claim 1, wherein the dynamic traffic routing service computing grid utilizes at least one of the multitude of dynamic traffic routing computing nodes to respond to at least one routing request.

9. The near real-time physical network routing system according to claim 8, wherein the quantity of the at least one of the multitude of dynamic traffic routing computing nodes utilized increases with an increase in the quantity of the at least one routing request.

10. The near real-time physical network routing system according to claim 8, further in including a dynamic traffic routing computing node coordination module configured to coordinate at least one of the at least one routing request with at least one of the at least one of the multitude of dynamic traffic routing computing nodes.

11. The near real-time physical network routing system according to claim 1, wherein the physical network is a transportation network.

12. The near real-time physical network routing system according to claim 1, further including an application server, the application server configured to pass at least one of the at least one traffic route to a client.

13. The near real-time physical network routing system according to claim 1, further including a weather adjustment service, the weather adjustment service configured to use weather data from a weather effect service to update the traffic simulation model.

14. The near real-time physical network routing system according to claim 1, further including an application server configured to pass the traffic route to the client through a web server, the web server including:
  (a) a request parser; and
  (b) a response generator.

15. A tangible computer readable media, the tangible computer readable media containing a multitude of computer readable instructions that when executed by one or more processors causes the one or more processors to perform a method for determining a near real-time physical transportation network route, the method comprising:
  (a) generating traffic network travel time predictions for a physical transportation network using a traffic simulation computing grid, a traffic simulation model and common input data, the traffic simulation computing grid including a multitude of traffic simulation computing nodes, the common input data including:
    (1) static network characteristics, the static network characteristics including network link information related to a multitude of road links, the multitude of road links covering at least part of the transportation network;
    (2) an origin-destination data table, the origin-destination data table including a multitude of origin-destination travel time entries, each of the multitude of origin-destination travel time entries having:
      (i) a travel time for one of the multitude of road links; and
      (ii) a timestamp associated with the travel time; and
    (3) dynamic traffic information data, the dynamic traffic information data including data that could cause traffic delays for at least one of the multitude of road links; and
    (4) historical traffic data, the historical traffic data including data related to past traffic conditions for at least one of the multitude of road links; and
  (b) generating at least one traffic route using a dynamic traffic routing service computing grid and the traffic network travel time prediction, each of the at least one traffic route including an origin and a destination at a particular time, the dynamic traffic routing service computing grid including a multitude of dynamic traffic routing computing nodes.

16. The tangible computer readable media according to claim 15, wherein the physical transportation network is divided into a multitude of sections, each of the multitude of sections including:
  (a) a primary zone, the primary zone covering at least one of the multitude of road links; and
  (b) a buffer zone, the buffer zone covering at least one of the multitude of road links that are adjacent to the primary zone.

17. The tangible computer readable media according to claim 16, wherein one of the multitude of traffic simulation computing nodes is configured to predict travel times for at least one of the multitude of road links in the primary zone of a section of interest, the section of interest being at least one of the multitude of sections, using:
  (a) the common input data associated with the primary zone of the section of interest; and
  (b) the common input data associated with the buffer zone of the section of interest.

18. The tangible computer readable media according to claim 16, wherein predicted travel times for at least two of the multitude of sections are predicted using different traffic simulation computing nodes within the multitude of traffic simulation computing nodes.

19. The tangible computer readable media according to claim 15, wherein the dynamic traffic routing service computing grid uses an extended Dijkstra's algorithm when generating the at least one traffic route, the extended Dijkstra's algorithm extending the Dijkstra's algorithm.

20. The tangible computer readable media according to claim 15, wherein the physical network is a transportation network.

21. The tangible computer readable media according to claim 15, further including to update the traffic simulation model using weather data from a weather effect service.

22. The tangible computer readable media according to claim 15, wherein the at least one traffic route is generated and forwarded to a client in response to a client request.

* * * * *